(12) United States Patent
Uchimura

(10) Patent No.: US 9,800,855 B2
(45) Date of Patent: Oct. 24, 2017

(54) REPRODUCTION DEVICE, REPRODUCTION METHOD, AND RECORDING MEDIUM

(71) Applicant: SONY CORPORATION, Tokyo (JP)

(72) Inventor: Kouichi Uchimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/913,346

(22) PCT Filed: Aug. 7, 2014

(86) PCT No.: PCT/JP2014/070890
§ 371 (c)(1),
(2) Date: Feb. 19, 2016

(87) PCT Pub. No.: WO2015/025726
PCT Pub. Date: Feb. 26, 2015

(65) Prior Publication Data
US 2016/0212399 A1 Jul. 21, 2016

(30) Foreign Application Priority Data

Aug. 20, 2013 (JP) .................................. 2013-170505

(51) Int. Cl.
*G11B 20/10* (2006.01)
*H04N 9/82* (2006.01)
*H04N 5/85* (2006.01)
*H04N 5/20* (2006.01)
*H04N 5/445* (2011.01)
(Continued)

(52) U.S. Cl.
CPC ........... *H04N 9/8238* (2013.01); *G11B 20/10* (2013.01); *G11B 27/105* (2013.01);
(Continued)

(58) Field of Classification Search
None
See application file for complete search history.

(56) References Cited

U.S. PATENT DOCUMENTS

2009/0046207 A1* 2/2009 Salvucci ................. G06T 9/001
348/663
2010/0118119 A1* 5/2010 Newton ............... H04N 13/007
348/42
(Continued)

FOREIGN PATENT DOCUMENTS

JP 2007-257641 A 10/2007
JP 2007-534238 A 11/2007
(Continued)

OTHER PUBLICATIONS

Sally Hattori, et al.; Title: "Signalling of Luminance Dynamic Range in Tone mapping information SEI"; Document : JCTV-J0149; Joint Collaborative team on Video Coding (JCT-VC) of ITU-T SG 16 WP 3 and ISO/IEC JTC 1/SC 29/WG 11; 10th meeting: Stockholm, SE, Jul. 11-20, 2012, p. 1-7.

*Primary Examiner* — Eileen Adams
(74) *Attorney, Agent, or Firm* — Chip Law Group

(57) ABSTRACT

The present technology relates to a reproduction device, a reproduction method, and a recording medium, which are capable of displaying closed captions having a wide dynamic range of luminance at appropriate brightness. HDR closed captions serving as closed captions of a second luminance range that is different from and larger than a first luminance range, tone_mapping_info including HDR information indicating characteristics of luminance of the HDR closed captions, and tone_mapping_info serving as tone mapping definition information used when luminance conversion from the HDR closed captions to STD closed captions serving as closed captions of the first luminance range are recorded on an optical disc. The present technology can be applied to a recording medium on which closed captions are recorded.

14 Claims, 42 Drawing Sheets

(51) Int. Cl.
- *H04N 21/426* (2011.01)
- *H04N 21/431* (2011.01)
- *H04N 21/488* (2011.01)
- *G11B 27/10* (2006.01)
- *G11B 27/32* (2006.01)
- *H04N 19/70* (2014.01)

(52) U.S. Cl.
CPC ............ *G11B 27/329* (2013.01); *H04N 5/20* (2013.01); *H04N 5/44508* (2013.01); *H04N 5/85* (2013.01); *H04N 19/70* (2014.11); *H04N 21/42646* (2013.01); *H04N 21/4318* (2013.01); *H04N 21/4884* (2013.01); *G11B 2220/2541* (2013.01); *H04N 2005/44526* (2013.01)

(56) References Cited

U.S. PATENT DOCUMENTS

2012/0120312 A1\* 5/2012 Yamasaki .......... H04N 5/44504
348/461
2012/0259994 A1\* 10/2012 Gillies ................ H04L 12/1881
709/231

FOREIGN PATENT DOCUMENTS

| JP | 2009-058692 A | 3/2009 |
| JP | 2009-089209 A | 4/2009 |
| JP | 2009-524371 A | 6/2009 |
| WO | 2012/027405 A | 3/2012 |
| WO | 2012-147010 A | 11/2012 |

\* cited by examiner

FIG. 7

| | | Descriptor |
|---|---|---|
| 1: | tone_mapping_info(payloadSize) { | |
| 2: |   tone_map_id | ue(v) u(32) |
| 3: |   tone_map_cancel_flag | u(1) |
| 4: |   if(!tone_map_cancel_flag) { | |
| 5: |     tone_map_persistence_flag | u(1) |
| 6: |     coded_data_bit_depth | u(8) |
| 7: |     target_bit_depth | u(8) |
| 8: |     tone_map_model_id | ue(v) u(8) |
| 9: |     if(tone_map_model_id==0) { | |
| 10: |       min_value | u(32) |
| 11: |       max_value | u(32) |
| 12: |     }else if(tone_map_model_id==1) { | |
| 13: |       sigmoid_midpoint | u(32) |
| 14: |       sigmoid_width | u(32) |
| 15: |     }else if(tone_map_model_id==2) { | |
| 16: |       for(i=0; i<(1<<target_bit_depth); i++) | |
| 17: |         start_of_coded_interval[i] | u(v) u(256) |
| 18: |     else if(tone_map_model_id==3) { | |
| 19: |       num_pivots | u(16) |
| 20: |       for(i=0; i<num_pivots; i++) { | |
| 21: |         coded_pivot_value[i] | u(v) u(256) |
| 22: |         target_pivot_value[i] | u(v) u(256) |
| 23: |       } | |
| 24: |     }else if(tone_map_model_id==4) { | |
| 25: |       camera_iso_speed_idc | u(8) |
| 26: |       if(camera_iso_speed_idc==EXTENDED_ISO) | |
| 27: |         camera_iso_speed_value | u(32) |
| 28: |       exposure_index_idc | u(8) |
| 29: |       if(exposure_index_idc==EXTENDED_ISO) | |
| 30: |         exposure_index_value | u(32) |
| 31: |       exposure_compensation_value_sign_flag | u(1) |
| 32: |       exposure_compensation_value_numerator | u(16) |
| 33: |       exposure_compensation_value_denom_idc | u(16) |
| 34: |       ref_screen_luminance_white | u(32) |
| 35: |       extended_range_white_level | u(32) |
| 36: |       nominal_black_level_code_value | u(16) |
| 37: |       nominal_white_level_code_value | u(16) |
| 38: |       extended_white_level_code_value | u(16) |
| 39: |     } | |
| 40: |   } | |
| 41: | } | |

FIG. 8

```
(tone_map_model_id=0)
    min_value
    max_value (tone_map_model_id=2)
    for(i=0; i<(1<<target_bit_depth); i++){
        start_of_coded_interval[i]

(tone_map_model_id=3)
    num_pivots
    for(i=0; i<num_pivots; i++){
        coded_pivot_value[i]
        target_pivot_value[i]
    }

(tone_map_model_id=4)
    camera_iso_speed_idc
    if(camera_iso_speed_idc==EXTENDED_ISO)
        camera_iso_speed_value
    exposure_index_idc
    if(exposure_index_idc==EXTENDED_ISO)
        exposure_index_value
    exposure_compensation_value_sign_flag
    exposure_compensation_value_numerator
    exposure_compensation_value_denom_idc
    ref_screen_luminance_white
    extended_range_white_level
    nominal_black_level_code_value
    nominal_white_level_code_value
    extended_white_level_code_value
```

ANY ONE OF THREE TYPES IS USED AS tone mapping DEFINITION INFORMATION FOR STD-HDR CONVERSION OR tone mapping DEFINITION INFORMATION FOR HDR-STD CONVERSION

USE AS HDR INFORMATION

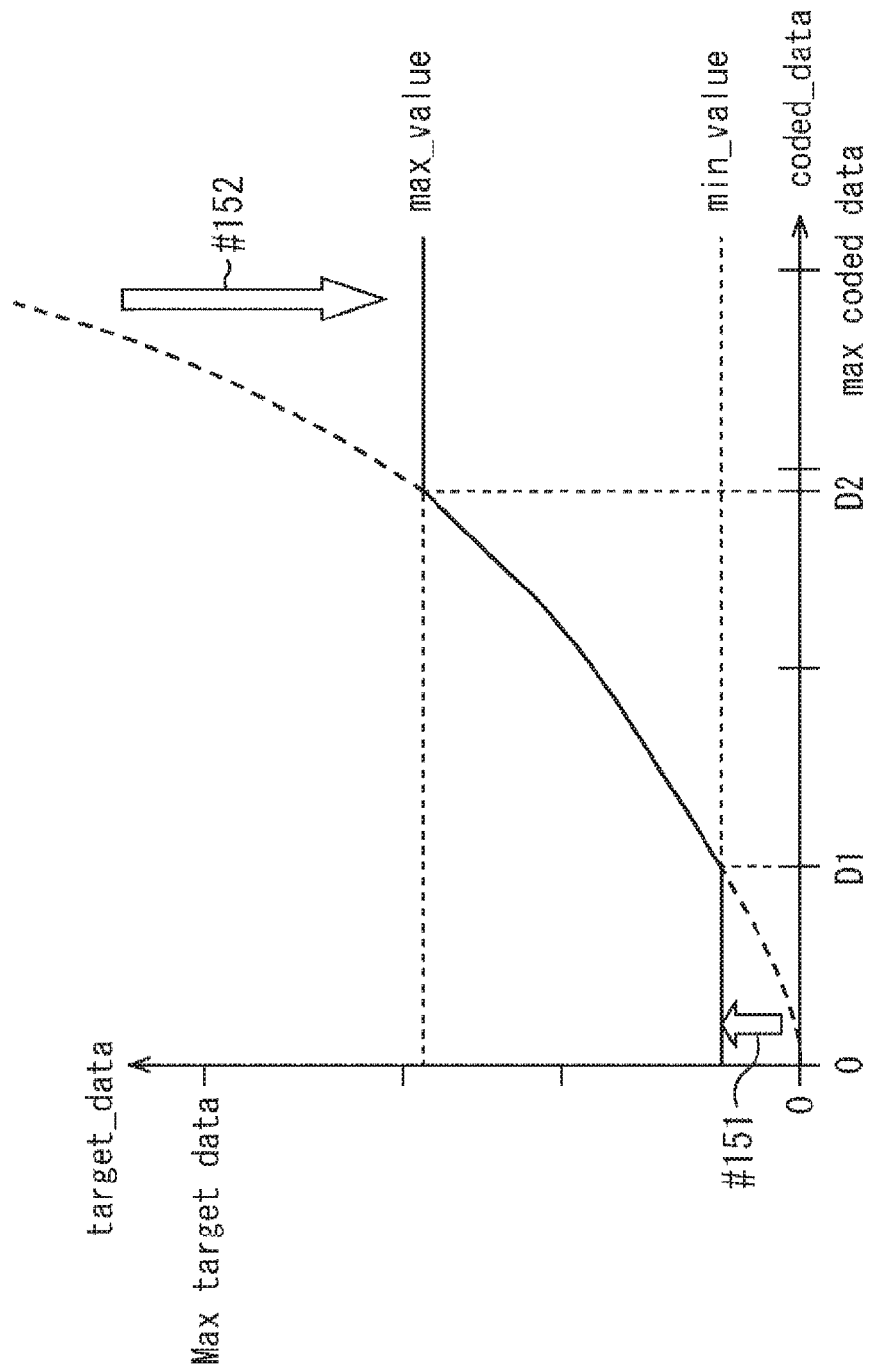

FIG. 13

|   | Descriptor |
|---|---|
| 1: user_data_unregistered(payloadSize) { | |
| 2: uuid_iso_iec_11578 | 128 uimsbf |
| 3: type_indicator | 32 uimsbf |
| 4: if(type_indicator==0x4741 3934 ) { | |
| 5: number_of_tone_mapping_info_ref | unsigned int(32) |
| 6: for (i=0; i<number_of_tone_mapping_info; i++) | |
| 7: { | |
| 8: tone_mapping_info_ref | 8bit uismbf |
| 9: } | |
| 10: cc_data() | |
| 11: } | |
| 12: else{ | |
| 13: padding_word payloadSize*8-160 | |
| 14: } | |
| 15: } | |

FIG. 17

```
1: STN_table() {
2:   length 16 uimsbf
3:   reserved_for_future_use 16 bslbf
4:   number_of_primary_video_stream_entries 8 uimsbf
5:   number_of_primary_audio_stream_entries 8 uimsbf
6:   number_of_PG_textST_stream_entries 8 uimsbf
7:   number_of_IG_stream_entries 8 uimsbf
8:   number_of_secondary_audio_stream_entries 8 uimsbf
9:   number_of_secondary_video_stream_entries 8 uimsbf
10:  number_of_P_P_PG_textST_stream_entries_plus 8 uimsbf
11:  primary_video_tone_mapping_flag 1
12:  PG_text_ST_tone_mapping_flag 1
13:  IG_tone_mapping_flag 1
14:  secondary_video_tone_mapping_flag 1
15:  reserved_for_future_use 36bits
16:  If(video_tone_mapping_flag == 0)
17:  {
18:    for (primary_video_stream_id=0;
19:    primary_video_stream_id<
20:    number_of_primary_video_stream_entries;
21:    primary_video_stream_id++){
22:    stream_entry()
23:    stream_attributes()
24:  }
25:  else
26:  {
27:    for (primary_video_stream_id=0;
28:    primary_video_stream_id<
29:    number_of_primary_video_stream_entries;
30:    primary_video_stream_id++){
31:    stream_entry()
32:    stream_attributes()
33:    number_of_tone_mapping_info_ref 8uimsbf
34:    for(i = 0; I < number_of_tone_mapping_info_ref; i++)
35:    {
36:      tone_mapping_info_ref    8uimsbf
37:    }
38:  }
39:  }
40:  If(PG_text_ST_tone_mapping_flag == 0)
41:  for (PG_textST_stream_id=0;
42:  PG_textST_stream_id<number_of_PG_textST_stream_entries
43:  +number_of_PiP_PG_textST_stream_entries_plus;
44:  PG_textST_stream_id++){
45:  stream_entry()
46:  stream_attributes()
47:  }

48:  else
49:  {
50:    for (PG_textST_stream_id=0;
51:    PG_textST_stream_id<number_of_PG_textST_stream_entries
52:    +number_of_PiP_PG_textST_stream_entries_plus;
53:    PG_textST_stream_id++){
54:    stream_entry()
55:    stream_attributes()
56:    number_of_tone_mapping_info_ref 8uimsbf
57:    for(i = 0; I < number_of_tone_mapping_info_ref; i++)
58:    {
59:      tone_mapping_info_ref    8uimsbf
60:    }
61:    }
62:  }
63:  If(IG_tone_mapping_flag == 0)
64:  {
65:    for(IG_stream_id=0;
66:    IG_stream_id<number_of_IG_stream_entries;
67:    IG_stream_id++){
68:    stream_entry()
69:    stream_attributes()
70:  }
71:  }
72:  else
73:  {
74:    for(IG_stream_id=0;
75:    IG_stream_id<number_of_IG_stream_entries;
76:    IG_stream_id++){
77:    stream_entry()
78:    stream_attributes()
79:    number_of_tone_mapping_info_ref 8uimsbf
80:    for(i = 0; I < number_of_tone_mapping_info_ref; i++)
81:    {
82:      tone_mapping_info_ref    8uimsbf
83:    }
84:    }
85:  }
86:  If(secondary_video_tone_mapping_flag == 0)
87:  {
88:    for (secondary_video_stream_id=0;
89:    secondary_video_stream_id <
90:    number_of_secondary_video_stream_entries;
91:    secondary_video_stream_id++){
92:    stream_entry()
93:    stream_attributes()
94:    comb_info_Secondary_video_Secondary_audio()
95:    comb_info_Secondary_video_PiP_PG_textST()
96:    }
97:  else
98:  {
99:    for (secondary_video_stream_id=0;
100:   secondary_video_stream_id <
101:   number_of_secondary_video_stream_entries;
102:   secondary_video_stream_id++){
103:   stream_entry()
104:   stream_attributes()
105:   number_of_tone_mapping_info_ref 8uimsbf
106:   for(i = 0; I < number_of_tone_mapping_info_ref; i++)
107:   {
108:     tone_mapping_info_ref    8uimsbf
109:   }
110:   comb_info_Secondary_video_Secondary_audio()
111:   comb_info_Secondary_video_PiP_PG_textST()
112: }
```

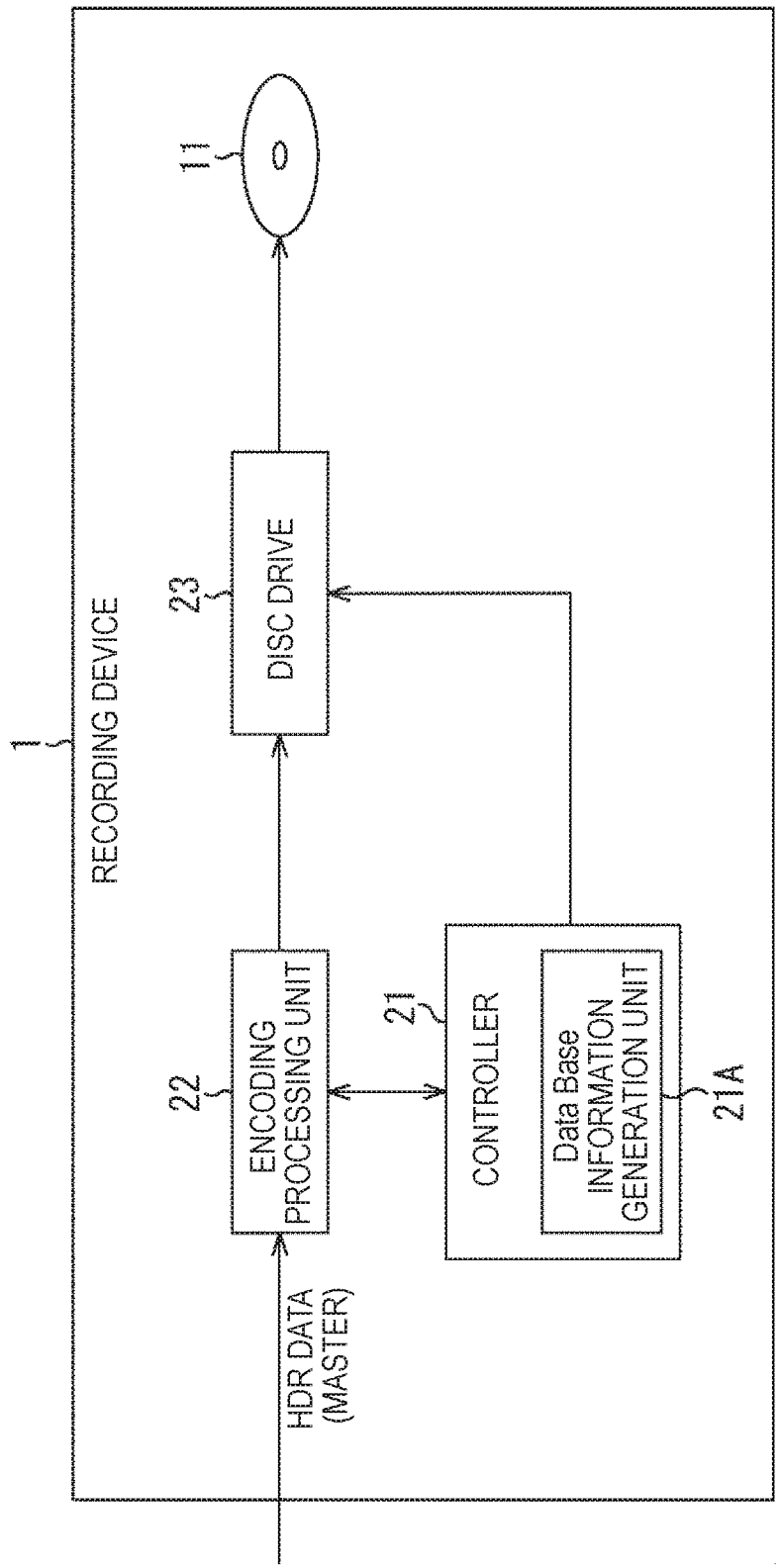

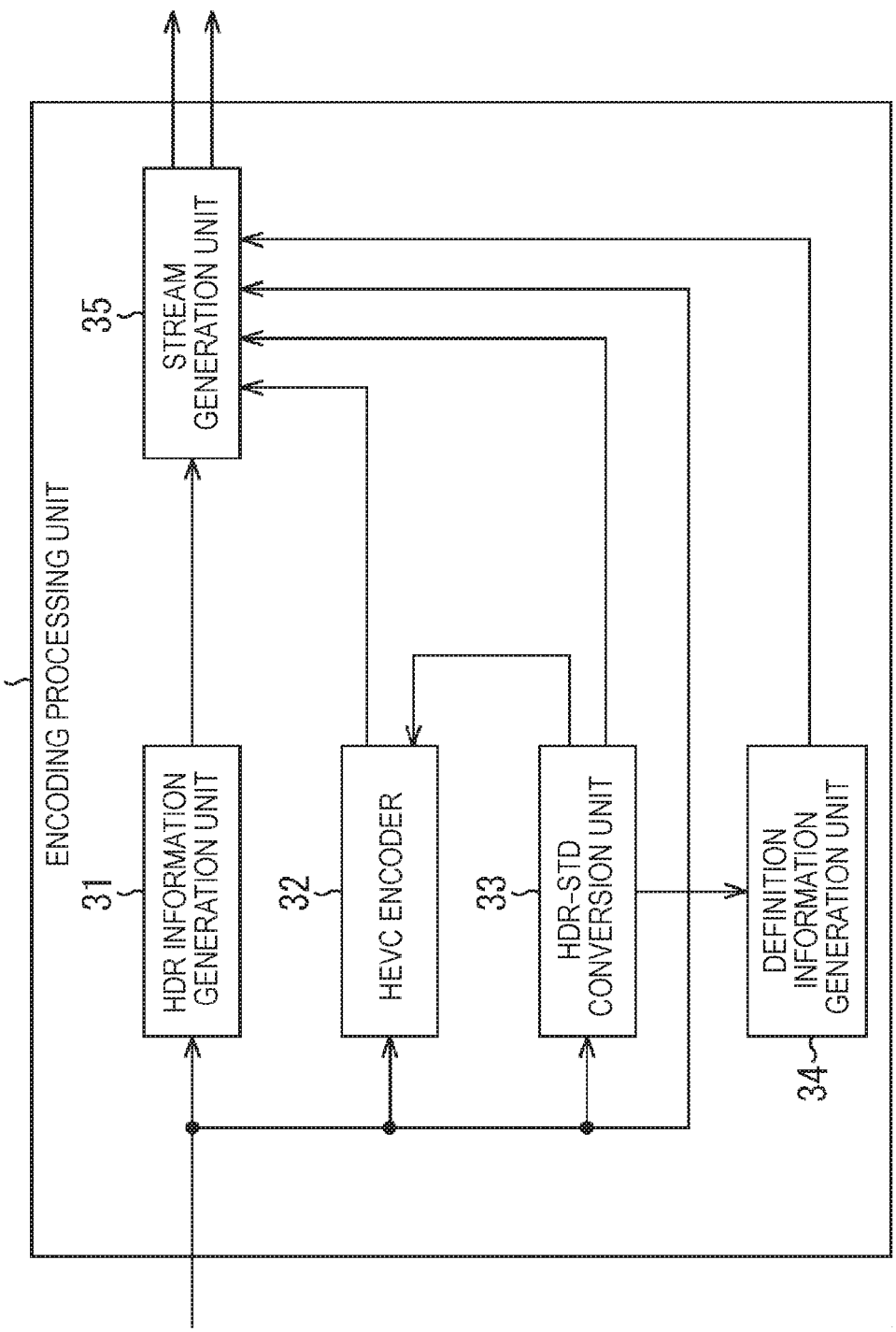

FIG. 33

```
 1: Tone_map()
 2: {
 3:   length 32bits
 4:   number_of_tone_mapping_info 32bits
 5:   reserved 64bits
 6:   for(i=0;i<number_of_tone_mapping_info;i++)
 7:   {
 8:     tone_mapping_info()
 9:   }
10:   reserved 64bits
11: }
```

REPRODUCTION DEVICE, REPRODUCTION METHOD, AND RECORDING MEDIUM

TECHNICAL FIELD

The present technology relates to a reproduction device, a reproduction method, and a recording medium, and more particularly, to a reproduction device, a reproduction method, and a recording medium, which are capable of displaying closed captions having a wide dynamic range of luminance at appropriate brightness.

BACKGROUND ART

Recording media for content such as movies include a Blu-ray (a registered trademark) disc (hereinafter, referred to appropriately as a "BD"). In the past, authoring of closed captions recorded on a BD has been performed under the assumption that they will be viewed on a monitor having standard luminance (100 nit=100 cd/m$^2$).

CITATION LIST

Patent Literature

Patent Literature 1: JP 2009-58692A
Patent Literature 2: JP 2009-89209A

SUMMARY OF INVENTION

Technical Problem

Meanwhile, in recent years, with the development of display technology such as organic electroluminescence (EL) displays and liquid crystal displays (LCDs), monitors having luminance brighter than the standard luminance have been commercially available. There is a demand for closed captions capable of utilizing performance of monitors having a wide dynamic range.

The present technology was made in light of the foregoing, and it is desirable to display closed captions having a wide dynamic range of luminance at appropriate brightness.

Solution to Problem

According to an aspect of the present technology, there is provided a reproduction device including: a reading unit configured to read an extended closed caption serving as a closed caption of a second luminance range that is different from and larger than a first luminance range, HDR information indicating a characteristic of luminance of the extended closed caption, and luminance conversion definition information used when luminance conversion from the extended closed caption to a standard closed caption serving as a closed caption of the first luminance range is performed from a recording medium on which the extended closed caption, the HDR information, and the luminance conversion definition information are recorded; a conversion unit configured to convert the extended closed caption into the standard closed caption based on the luminance conversion definition information; and an output unit configured to output the extended closed caption and the HDR information to a display device capable of displaying the extended closed caption and output the standard closed caption converted by the conversion unit to a display device incapable of displaying the extended closed caption.

A reproduction method according to the first aspect of the present technology corresponds to the reproduction device according to the first aspect of the present technology.

According to the first aspect of the present technology, an extended closed caption serving as a closed caption of a second luminance range that is different from and larger than a first luminance range, HDR information indicating a characteristic of luminance of the extended closed caption, and luminance conversion definition information used when luminance conversion from the extended closed caption to a standard closed caption serving as a closed caption of the first luminance range is performed are read from a recording medium on which the extended closed caption, the HDR information, and the luminance conversion definition information are recorded; the extended closed caption is converted into the standard closed caption based on the luminance conversion definition information; and the extended closed caption and the HDR information is output to a display device capable of displaying the extended closed caption and the converted standard closed caption is output to a display device incapable of displaying the extended closed caption.

According to a second aspect of the present technology, there is provided a recording medium on which are recorded: an extended closed caption serving as a closed caption of a second luminance range that is different from and larger than a first luminance range; HDR information indicating a characteristic of luminance of the extended closed caption; and luminance conversion definition information used when luminance conversion from the extended closed caption to a standard closed caption serving as a closed caption of the first luminance range is performed. A reproduction device configured to reproduce the recording medium performs a process of reading the extended closed caption, the HDR information, and the luminance conversion definition information from the recording medium, converting the extended closed caption into the standard closed caption based on the luminance conversion definition information, and outputting the extended closed caption and the HDR information to a display device capable of displaying the extended closed caption and outputting the converted standard closed caption to a display device incapable of displaying the extended closed caption.

In a second aspect of the present technology, extended closed captions serving as closed captions of a second luminance range that is different from and larger than a first luminance range, HDR information indicating characteristics of luminance of the extended closed captions, and luminance conversion definition information used when luminance conversion from the extended closed captions to standard closed captions serving as closed captions of the first luminance range is performed are recorded.

According to a third aspect of the present technology, there is provided a reproduction device including: a reading unit configured to read a standard closed caption serving as a closed caption of a first luminance range, HDR information indicating a characteristic of luminance of an extended closed caption serving as a closed caption of a second luminance range that is different from and larger than the first luminance range, and luminance conversion definition information used when luminance conversion from the standard closed caption to the extended closed caption is performed from a recording medium on which the standard closed caption, the HDR information, and the luminance conversion definition information are recorded; a conversion unit configured to convert the standard closed caption into the extended closed caption based on the luminance conversion definition information; and an output unit configured to output the extended closed caption converted by the conversion unit and the HDR information to a display device capable of displaying the extended closed caption and output the standard closed caption to a display device incapable of displaying the extended closed caption.

A reproduction method according to the third aspect of the present technology corresponds to the reproduction device according to the third aspect of the present technology.

According to the third aspect of the present technology, a standard closed caption serving as a closed caption of a first luminance range, HDR information indicating a characteristic of luminance of an extended closed caption serving as a closed caption of a second luminance range that is different from and larger than the first luminance range, and luminance conversion definition information used when luminance conversion are read from the standard closed caption to the extended closed caption is performed from a recording medium on which the standard closed caption, the HDR information, and the luminance conversion definition information are recorded; the standard closed caption is converted into the extended closed caption based on the luminance conversion definition information; and the converted extended closed caption and the HDR information are output to a display device capable of displaying the extended closed caption and the standard closed caption is output to a display device incapable of displaying the extended closed caption.

According to a fourth aspect of the present technology, there is provided a recording medium on which are recorded: a standard closed caption serving as a closed caption of a first luminance range; HDR information indicating a characteristic of luminance of an extended closed caption serving as a closed caption of a second luminance range that is different from and larger than the first luminance range; and luminance conversion definition information used when luminance conversion from the standard closed caption to the extended closed caption is performed. A reproduction device configured to reproduce the recording medium performs a process of reading the standard closed caption, the HDR information, and the luminance conversion definition information from the recording medium, converting the standard closed caption into the extended closed caption based on the luminance conversion definition information, and outputting the converted extended closed caption and the HDR information to a display device capable of displaying the extended closed caption and outputting the standard closed caption to a display device incapable of displaying the extended closed caption.

In a fourth aspect of the present technology, standard closed captions serving as closed captions of a first luminance range, HDR information indicating characteristics of luminance of extended closed captions serving as closed captions of a second luminance range that is different from and larger than the first luminance range, and luminance conversion definition information used when luminance conversion from the standard closed captions to the extended closed captions is performed are recorded.

Advantageous Effects of Invention

According to the present technology, it is possible to display closed captions having a wide dynamic range of luminance at appropriate brightness.

BRIEF DESCRIPTION OF DRAWINGS

FIG. 7 is a diagram illustrating the syntax of tone_mapping_info.

FIG. 8 is a diagram illustrating an example of information used as definition information of tone mapping and HDR information.

FIG. 9 is a diagram illustrating an example of a tone curve shown by Tone_mapping_info of tone_map_model_id=0.

FIG. 13 is a diagram illustrating a syntax of a user data unregistered SEI message.

FIG. 17 is a diagram illustrating the syntax of STN_table.

FIG. 18 is a block diagram illustrating a configuration example of a recording device of the first embodiment of the recording and reproduction system to which the present technology is applied.

FIG. 19 is a block diagram illustrating a configuration example of an encoding processing unit in FIG. 18.

FIG. 33 is a diagram illustrating the syntax of a Tone_map stream.

DESCRIPTION OF EMBODIMENTS

First Embodiment (Configuration Example of First Embodiment of Recording and Reproduction System)

Figure 1:
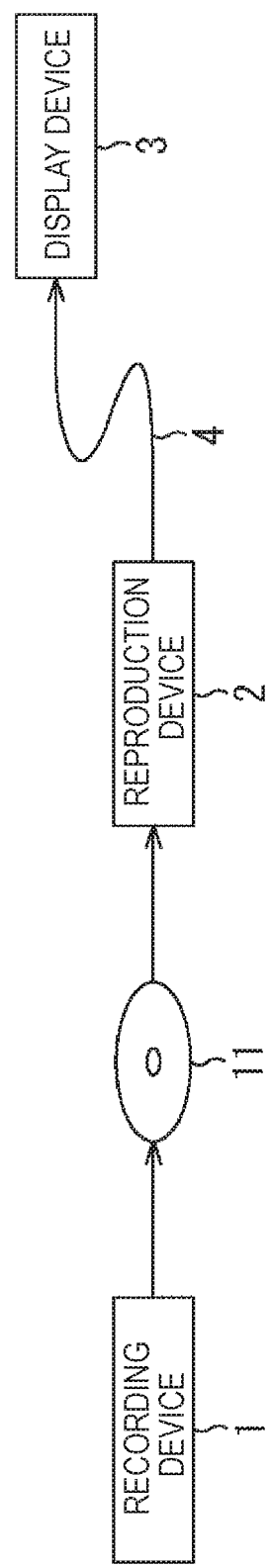
FIG. 1 is a diagram illustrating a configuration example of a first embodiment of a recording and reproduction system to which the present technology is applied.

FIG. 1 is a diagram illustrating a configuration example of a first embodiment of a recording and reproduction system to which the present technology is applied.

The recording and reproduction system in FIG. 1 is configured to include a recording device 1, a reproduction device 2, and a display device 3. The reproduction device 2 and the display device 3 are connected via a High Definition Multimedia Interface (HDMI: registered trademark) cable 4. The reproduction device 2 and the display device 3 may be connected via a cable of another standard or may be connected via wireless communication.

The recording device 1 records content and the reproduction device 2 reproduces the content. Supply of the content from the recording device 1 to the reproduction device 2 is performed using an optical disc 11. The optical disc 11 is, for example, a disc on which content is recorded in a Blu-ray (registered trademark) Disc Read-Only (BD-ROM) format.

The recording of content on the optical disc 11 may be performed in another format such as BD-R or -RE. The supply of content from the recording device 1 to the reproduction device 2 may also be performed using a removable medium other than the optical disc, such as a memory card on which a flash memory is mounted, or may also be performed through network delivery.

When the optical disc 11 is a BD-ROM disc, the recording device 1 is, for example, a device used by a content author. The optical disc 11 on which the content is recorded by the recording device 1 will be assumed to be supplied to the reproduction device 2 in the following description. However, in practice, optical discs are copied based on a master photograph record on which the content is recorded by the recording device 1 and the optical disc 11 which is one of the optical discs is supplied to the reproduction device 2.

At least one High Dynamic Range (HDR) video which is a video with a dynamic range equal to or greater than a dynamic range (luminance range) displayable on a monitor of standard luminance is input to the recording device 1. The standard luminance is, for example, 100 cd/m$^2$ (=100 nits).

HDR closed captions (extended closed captions) serving as closed captions having a dynamic range equal to or larger than a dynamic range that can be displayed by a monitor having the standard luminance are input to the recording device 1. Hereinafter, when it is unnecessary to particularly distinguish an HDR video and HDR closed captions from each other, they are referred to collectively as "HDR data."

The recording device 1 encodes an input master HDR video without change, that is, encodes a video having a dynamic range equal to or larger than a dynamic range that can be displayed by the monitor having the standard luminance without change, and records the encoded video on the optical disc 11 in a BD format. The recording device 1 records input master HDR closed captions, that is, closed captions having a dynamic range equal to or larger than the dynamic range that can be displayed by the monitor having the standard luminance, on the optical disc 11 in the BD format without change.

In this case, HDR information indicating a luminance feature of the master HDR data and low-conversion information used when the HDR data is converted into STD data are also recorded on the optical disc 11.

STD data is a general term for an STD video (standard video) serving as a video having the dynamic range that can be displayed by the monitor having the standard luminance and STD closed captions serving as closed captions having that dynamic range. When the dynamic range of the STD data is assumed to be 0% to 100%, the dynamic range of the HDR data is indicated as a range of 0% to 101% or more such as 0% to 500% or 0% or 1000%.

The recording device 1 converts the input master HDR data into the STD data. Then, the recording device 1 encodes the STD video obtained as a result of conversion, that is, the video having the dynamic range that can be displayed by the monitor having the standard luminance, and records the encoded video on the optical disc 11 in the BD format. Further, the recording device 1 records the STD closed captions obtained as a result of conversion, that is, the closed captions having the dynamic range that can be displayed by the monitor having the standard luminance, on the optical disc 11 in the BD format. In this case, HDR information and high-conversion information used when the STD data is converted into the HDR data are recorded on the optical disc 11 as well.

An HDR video recorded by the recording device 1 or an STD video obtained by converting the HDR video is, for example, a video with a so-called 4K resolution such as a horizontal×vertical resolution of 4096×2160 or 3840×2160 pixels. As a video encoding scheme, for example, a High Efficiency Video Coding (HEVC) scheme is used.

In the HEVC scheme, information indicating the luminance feature of data of an HDR image and information used when the data of the HDR image is converted into data of an STD image or conversion of the data of the STD image into the data of the HDR image can be set in supplemental enhancement information (SEI). Thus, in the first embodiment, the HDR information and either of the low-conversion information and the high-conversion information are set to and recorded in the SEI of a video stream serving as an HEVC stream of a video. In the HEVC scheme, since arbitrary data can be arranged as the SEI, the closed captions are also set to and recorded in the SEI of the video stream.

The reproduction device 2 communicates with the display device 3 via the HDMI cable 4 to acquire information regarding display performance of the display device 3. The reproduction device 2 specifies that the display device 3 is a device including an HDR monitor which is a monitor capable of displaying HDR data or a device including an STD monitor which is a monitor capable of displaying only STD data.

The reproduction device 2 drives a drive and reads a video stream recorded on the optical disc 11 to perform decoding.

For example, when the data obtained through the decoding is HDR data and the display device 3 includes the HDR monitor, the reproduction device 2 outputs the HDR data obtained through the decoding to the display device 3. In this case, the reproduction device 2 outputs the HDR information to the display device 3 along with the HDR data.

On the other hand, when the data obtained through the decoding is the HDR data and the display device 3 includes the STD monitor, the reproduction device 2 converts the HDR data obtained through the decoding into STD data and outputs the STD data. The conversion of the HDR data into the STD data is performed using the low-conversion information recorded on the optical disc 11.

When the data obtained through the decoding is STD data and the display device 3 includes the HDR monitor, the reproduction device 2 converts the STD data obtained through the decoding into HDR data and outputs the HDR data to the display device 3. The conversion of the STD data into the HDR data is performed using the high-conversion information recorded on the optical disc 11. In this case, the reproduction device 2 outputs the HDR information to the display device 3 along with the HDR data.

On the other hand, when the data obtained through the decoding is STD data and the display device 3 includes the STD monitor, the reproduction device 2 outputs the STD data obtained through the decoding to the display device 3.

The display device 3 receives the STD data or the HDR data transmitted from the reproduction device 2 and displays a video on the monitor based on the STD data or the HDR data.

For example, when the HDR information is transmitted, the display device 3 recognizes that the data transmitted along with the HDR information from the reproduction device 2 is the HDR data. As described above, the HDR information is transmitted along with the HDR data to the display device 3 including the HDR monitor.

In this case, the display device 3 displays the video of the HDR data according to a feature designated by the HDR information. That is, when the monitor of the display device 3 is a monitor with a dynamic range of 0% to 500% and the dynamic range of the HDR data is designated as a predetermined feature of 0% to 500% by the HDR information, the display device 3 adjusts luminance in the range of 0% to 500% according to the predetermined feature and displays the video.

When the luminance feature of the master HDR data is configured to be designated, a content author can display a video with intended luminance.

In general, a display device such as a TV recognizes data input from the outside as data with a dynamic range of 0% to 100%. When the monitor of the display device has a broader dynamic range than the dynamic range of 0% to 100%, the display device expands luminance according to the feature of the monitor by itself and displays the video. By designating the luminance feature and adjusting the luminance of the HDR data according to the designated feature, it is possible to prevent luminance adjustment not intended by the author from being performed on the display device side.

In general, a reproduction device outputting data to a display device such as a TV converts luminance according to a feature of a transmission path, and then outputs data. A display device receiving the data converts the luminance of the received data according to a feature of a monitor and displays a video. By outputting the HDR data from the reproduction device 2 to the display device 3 without performing the conversion of the luminance in the reproduction device 2, it is possible to reduce a number of times the luminance is converted, and thus a video with luminance closer to the master can be displayed on the display device 3.

On the other hand, when the HDR information is not transmitted, the display device 3 recognizes that the data transmitted from the reproduction device 2 is the STD data and displays the video of the STD data. The fact that the STD data is transmitted from the reproduction device 2 means that the display device 3 is a device that includes the STD monitor.

When audio data is recorded on the optical disc 11 by the recording device 1, the audio data is also transmitted from the reproduction device 2. The display device 3 outputs audio from a speaker based on the audio data transmitted from the reproduction device 2.

Hereinafter, a mode in which the master HDR data is recorded on the optical disc 11 without conversion is referred to as mode-i. In the case of mode-i, the HDR information and the low-conversion information are recorded on the optical disc 11.

Further, a mode in which the master HDR data is converted into the STD data and is recorded on the optical disc 11 is referred to as mode-ii. In the case of mode-ii, the HDR information and the high-conversion information are recorded on the optical disc 11.

(Signal Processing in Mode-i)

Figure 2:
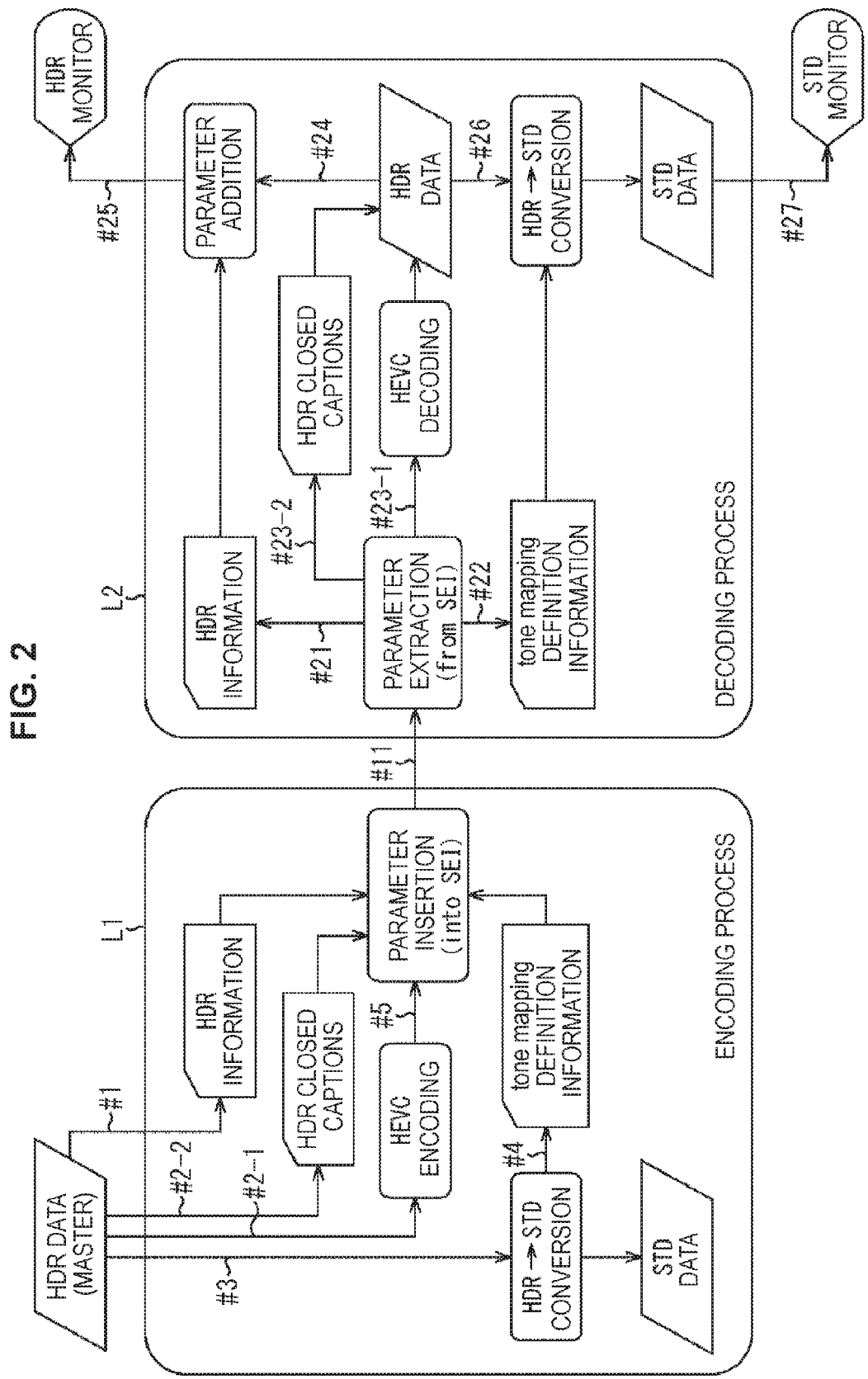
FIG. 2 is a diagram illustrating an example of signal processing in mode-i.

FIG. 2 is a diagram illustrating an example of signal processing in mode-i.

A process on the left side indicated by a solid line L1 is an encoding process performed in the recording device 1 and a process on the right side indicated by a solid line L2 is a decoding process performed in the reproduction device 2.

When the master HDR data is input, the recording device 1 detects the luminance of the master HDR data and generates the HDR information as indicated by the point of arrow #1. The recording device 1 encodes the master HDR video in accordance with the HEVC scheme to generate coded data, as indicated by the point of arrow #2-1.

The recording device 1 converts the master HDR data into the STD data, as indicated by the point of arrow #3. A video of the STD data obtained through the conversion is displayed on a monitor (not illustrated). The conversion of the HDR data into the STD data is performed while the author confirms the video of the STD after the conversion with his or her eyes and adjusts a conversion parameter appropriately.

Based on the adjustment by the author, the recording device 1 generates tone mapping definition information for HDR-STD conversion which is low-conversion information, as indicated by the point of arrow #4.

The tone mapping definition information is information defining a correspondence relation between each luminance value in a dynamic range such as a range of 0% to 400% broader than a standard dynamic range and each luminance value in a dynamic range such as a range of 0% to 100% which is the standard dynamic range.

The recording device 1 generates a video stream by inserting the HDR information and the tone mapping definition information into the encoded data of the HDR video as the SEI as indicated by the point of arrow #5 and inserting the master HDR closed captions into the encoded data of the HDR video as the SEI as indicated by the point of arrow #2-2. The recording device 1 records the generated video stream on the optical disc 11 in the BD format, and provides the video stream to the reproduction device 2 as indicated by arrow #11.

As described above, the HDR information, the tone mapping definition information for HDR-STD conversion, and the HDR closed captions are inserted into the video stream using the SEI and provided to the reproduction device 2.

The reproduction device 2 reads the video stream from the optical disc 11, and extracts the HDR information, the tone mapping definition information for HDR-STD conversion, and the HDR closed captions from the SEI of the video stream as indicated by the points of arrows #21, #22, and #23-2.

The reproduction device 2 decodes the encoded data included in the video stream according to the HEVC scheme, and generates the HDR video as indicated by the point of arrow #23-1. When the display device 3 includes the HDR monitor, the reproduction device 2 adds the HDR information to the HDR data as indicated by the point of arrow #24, and outputs the resulting data to the display device 3 as indicated by the point of arrow #25.

On the other hand, when the display device 3 includes the STD monitor, the reproduction device 2 converts the HDR data into the STD data using the tone mapping definition information for HDR-STD conversion extracted from the video stream as indicated by the point of arrow #26. The reproduction device 2 outputs the STD data obtained by the conversion to the display device 3 as indicated by the point of arrow #27.

As described above, the HDR data is output to the display device 3 including the HDR monitor together with the HDR information. The HDR data is converted into the STD data and then output to the display device 3 including the STD monitor.

Figure 3:
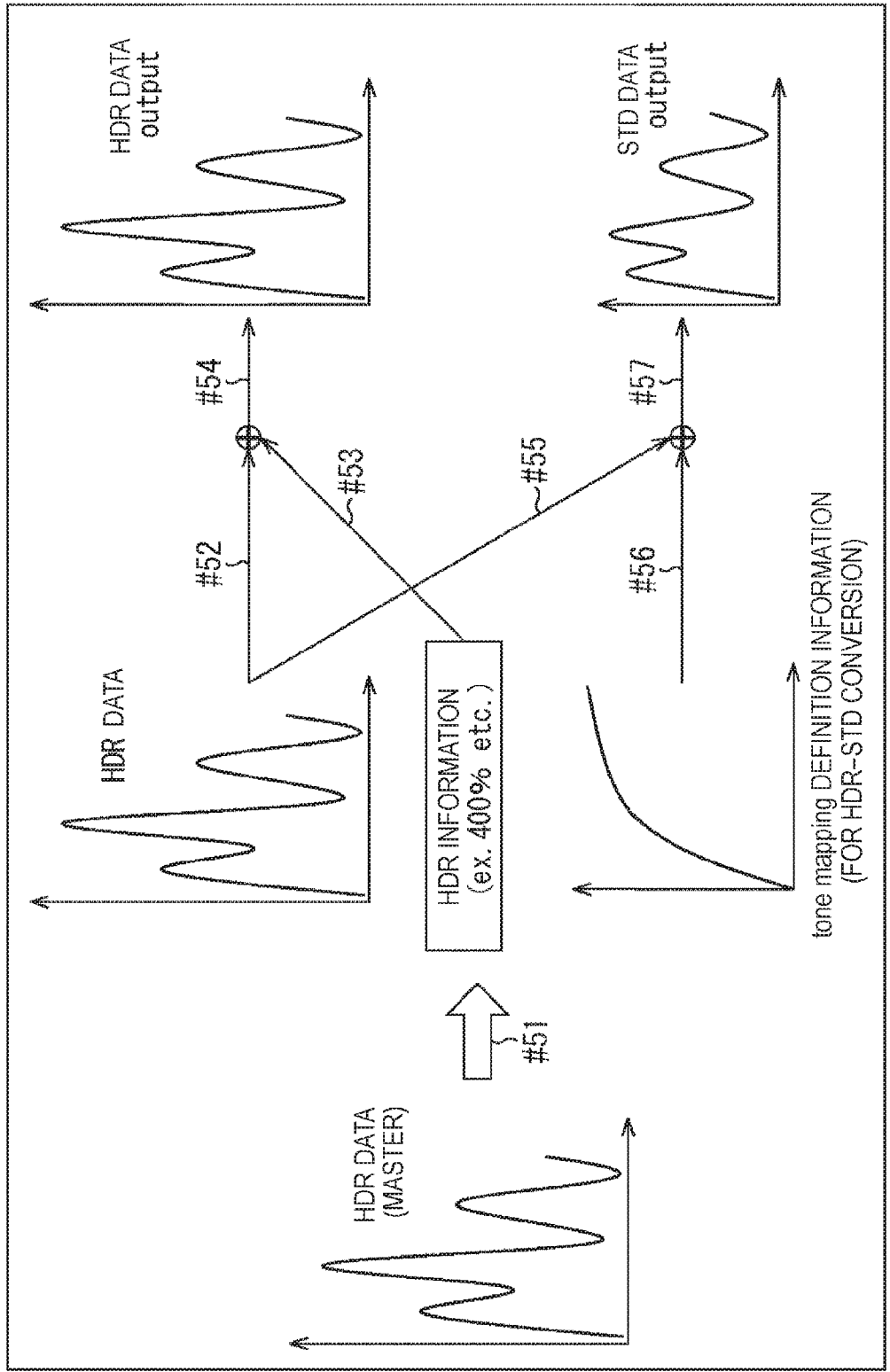
FIG. 3 is a diagram illustrating the flow of a signal processed in mode-i.

FIG. 3 is a diagram illustrating the flow of a process from input of the master HDR data to the recording device 1 to output of the data from the reproduction device 2.

As indicated by the point of white arrow #51, the master HDR data is supplied to the reproduction device 2 along with the tone mapping definition information for the HDR-STD conversion and the HDR information generated by the recording device 1 based on the master HDR data. The HDR information includes information indicating that the dynamic range is expanded to, for example, the range of 0% to 400%.

When the display device 3 includes the HDR monitor, the HDR information is added to the HDR data obtained through the decoding, as indicated by the points of arrows #52 and #53 in the reproduction device 2. The HDR data to which the HDR information is added is output to the display device 3, as indicated by the point of arrow #54.

On the other hand, when the display device 3 includes the STD monitor, the HDR data obtained through the decoding is converted into the STD data using the tone mapping definition information for the HDR-STD conversion, as indicated by the points of arrows #55 and #56, in the reproduction device 2. The STD data obtained through the conversion is output to the display device 3, as indicated by the point of arrow #57. In FIG. 3, each of the amplitude of a waveform indicating the HDR data and the amplitude of a waveform indicating the STD data indicates a dynamic range.

In this way, in mode-i, the master HDR data is recorded as the HDR data without conversion on the optical disc 11. According to the performance of the display device 3 which is an output destination, switching is performed between the addition of the HDR information and the output of the HDR data obtained through the decoding without conversion, and the conversion of the HDR data into the STD data and the output of the STD data.

(Signal Processing in Mode-ii)

Figure 4:
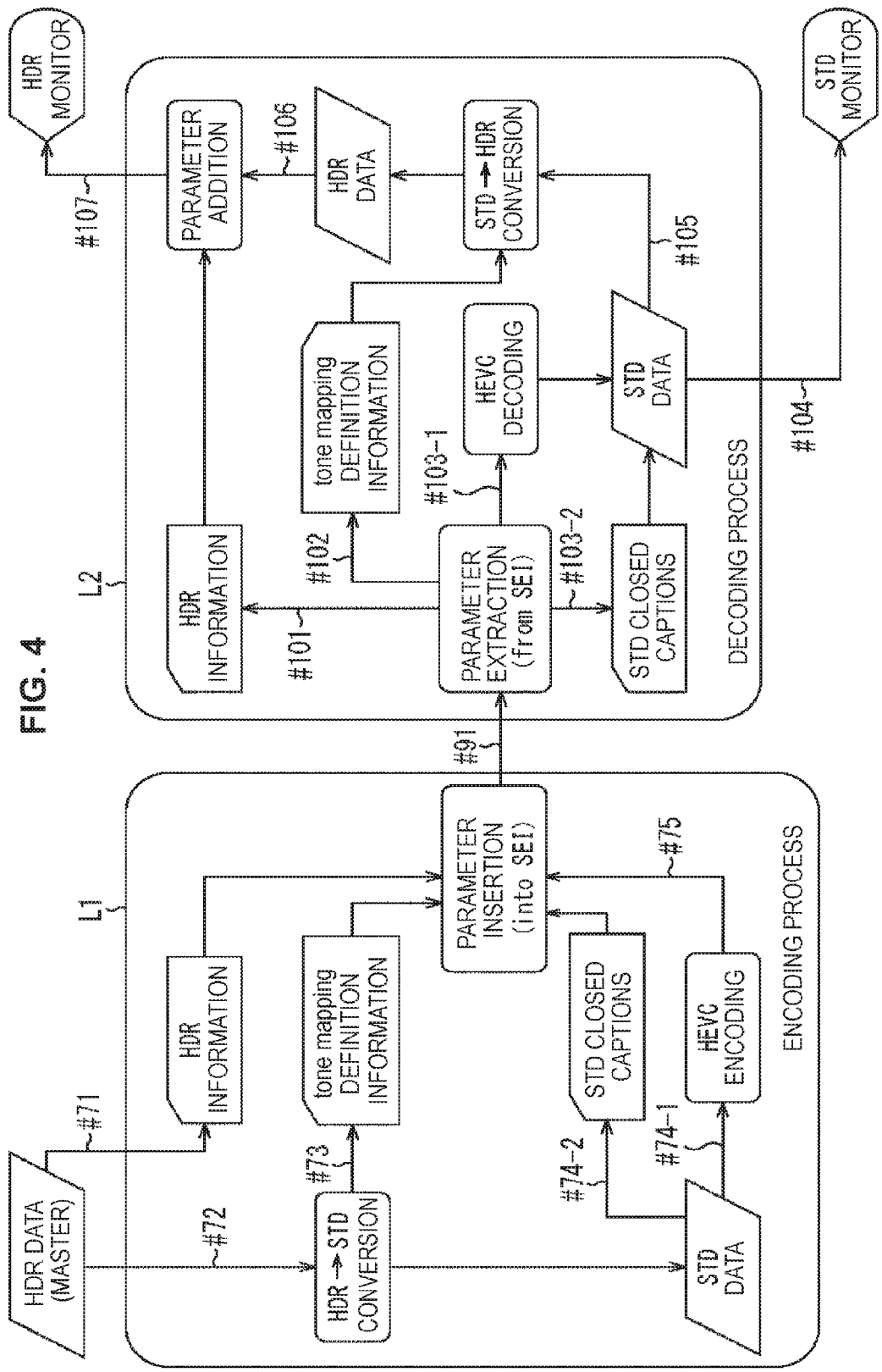
FIG. 4 is a diagram illustrating an example of signal processing in mode-ii.

FIG. 4 is a diagram illustrating an example of signal processing in mode-ii.

When the master HDR data is input, the recording device 1 detects the luminance of the master HDR data and generates the HDR information, as indicated by the point of arrow #71.

The recording device 1 converts the master HDR data into the STD data, as indicated by the point of arrow #72. The video of the STD data obtained through the conversion is displayed on the monitor (not illustrated).

Based on the adjustment by the author, the recording device 1 generates tone mapping definition information for STD-HDR conversion which is high-conversion information, as indicated by the point of arrow #73.

The recording device 1 encodes the STD video of the STD data according to the HEVC scheme, and generates encoded data as indicated by the point of arrow #74-1.

The recording device 1 inserts the HDR information and the tone mapping definition information into the encoded data of the STD video as the SEI as indicated by the point of arrow #75, and inserts the STD closed captions of the STD data into the encoded data of the STD video as the SEI as indicated by the point of arrow #74-2. The recording device 1 records the video stream generated as the result on the optical disc 11 in the BD format, and provides the video stream to the reproduction device 2 as indicated by the point of arrow #91.

As described above, the HDR information, the tone mapping definition information for STD-HDR conversion, and the STD closed captions are inserted into the video stream using the SEI and provided to the reproduction device 2.

The reproduction device 2 reads the video stream from the optical disc 11, and extracts the HDR information, the tone mapping definition information for STD-HDR conversion, and the STD closed captions from the SEI of the video stream as indicated by the points of arrows #101, #102, and #103-2.

The reproduction device 2 decodes the encoded data included in the video stream in accordance with the HEVC scheme to generate the STD video, as indicated by the point of arrow #103-1. When the display device 3 includes the STD monitor, the reproduction device 2 outputs the STD data to the display device 3, as indicated by the point of arrow #104.

On the other hand, when the display device 3 includes the HDR monitor, the reproduction device 2 converts the STD data into the HDR data using the tone mapping definition information for the STD-HDR conversion extracted from the video stream, as indicated by the point of arrow #105. The reproduction device 2 adds the HDR information to the HDR data obtained through the conversion, as indicated by the point of arrow #106, and outputs the HDR data to the display device 3, as indicated by the point of arrow #107.

In this way, after the STD data is converted into the HDR data, the HDR data is output to the display device 3 including the HDR monitor along with the HDR information. The STD data is output to the display device 3 including the STD monitor without conversion.

Figure 5:
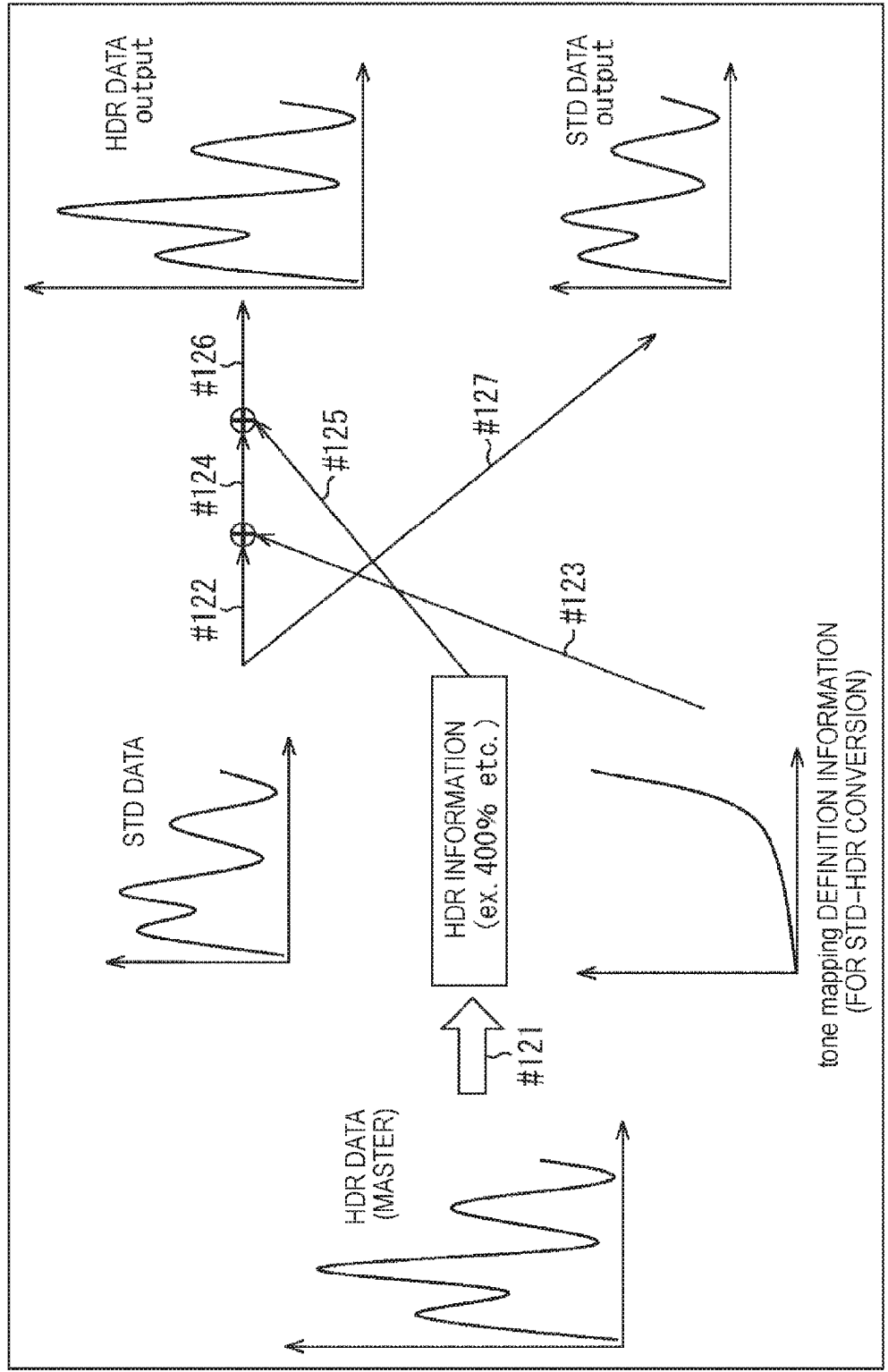
FIG. 5 is a diagram illustrating the flow of a signal processed in mode-ii.

FIG. 5 is a diagram illustrating the flow of a process from input of the master HDR data to the recording device 1 to output of the data from the reproduction device 2.

As indicated by the point of white arrow #121, after the master HDR data is converted into the STD data, the STD data is supplied to the reproduction device 2 along with the tone mapping definition information for the STD-HDR conversion and the HDR information generated in the recording device 1 based on the master HDR data.

When the display device 3 includes the HDR monitor, the STD data obtained through the decoding is converted into the HDR data using the tone mapping definition information for the STD-HDR conversion, as indicated by the points of arrows #122 and #123 in the reproduction device 2. The HDR data obtained by converting the STD data is added to the HDR information, as indicated by the points of arrows #124 and #125, and the HDR data is output to the display device 3, as indicated by the point of arrow #126.

On the other hand, when the display device 3 includes the STD monitor, the STD data obtained through the decoding is output to the display device 3, as indicated by the point of arrow #127, in the reproduction device 2.

In this way, in mode-ii, the master HDR data is converted into the STD data to be recorded on the optical disc 11. According to the performance of the display device 3 which is an output destination, switching is performed between the conversion of the STD data obtained through the decoding into the HDR data and the addition and output of the HDR information, and the output of the STD data without conversion.

The details of the configurations and operations of the recording device 1 and the reproduction device 2 described above will be described below.

Here, the video stream will be described.

(Configuration Example of Video Stream)

Figure 6:
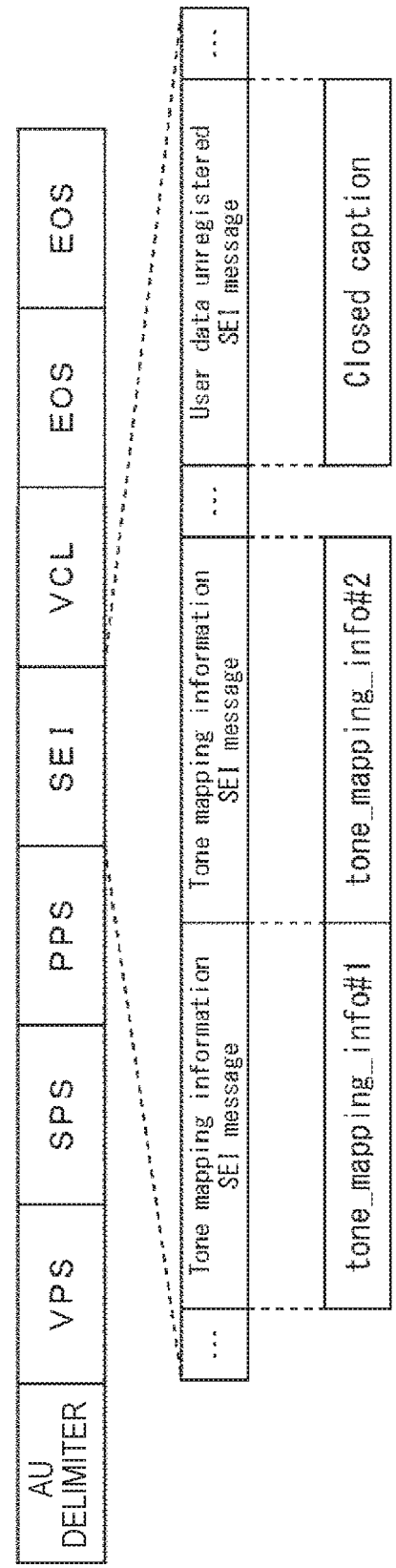
FIG. 6 is a diagram illustrating a configuration example of a video stream.

FIG. 6 is a diagram illustrating a configuration example of the video stream.

A video stream is configured to include an access unit which is a collection of network abstraction layer (NAL) units. One access unit includes video data of one picture.

As illustrated in FIG. 6, one access unit is configured to include an access unit delimiter (AU delimiter), a video parameter set (VPS), a sequence parameter set (SPS), a picture parameter set (PPS), an SEI, a video coding layer (VCL), an end of sequence (EOS), and an end of stream (EOS).

The AU delimiter indicates the beginning of an access unit. The VPS includes metadata indicating the content of a video stream. The SPS includes information, such as a picture size and a coding tree block (CTB) size, which is necessarily referred to in a decoding process for a sequence by an HEVC decoder. The PPS includes information which is necessarily referred to by the HEVC decoder in order to perform a decoding process for a picture. The VPS, the SPS, and the PPS are used as header information.

The SEI is auxiliary information including, for example, information related to timing information and random access of each picture. The HDR information and the tone mapping definition information are included in a tone mapping information SEI message serving as one of SEIs as tone_mapping_info. tone_mapping_info is allocated identification information identifying tone_mapping_info. In the present specification, tone_mapping_info whose identification information is i is referred to as tone_mapping_info#i. The closed captions are included in a user data unregistered SEI message serving as one of SEIs.

The VCL is encoded data of 1 picture. The end of sequence (EOS) indicates an end position of a sequence and the end of video stream (EOS) indicates an end position of a stream.

(tone_mapping_info)

FIG. 7 is a diagram illustrating the syntax of tone_mapping_info.

The brightness or color of a video obtained by performing decoding using tone_mapping_info is converted according to the performance of a monitor which is a video output destination. A line number and a colon (:) on the left side of FIG. 7 are shown for convenience of the description and are not included in the syntax. The same also applies to FIGS. 13, 17, and 33 to be described below. Main information included in tone_mapping_info will be described.

In the 2nd line, tone_map_id is identification information of tone_mapping_info. In the 8th line, tone_map_model_id indicates a model of a tone map used for conversion.

In the recording device 1, at least one piece of tone_mapping_info in which one value among 0, 2, and 3 is set as tone_map_model_id and one piece of tone_mapping_info in which a value of 4 is set as tone_map_model_id are generated.

As illustrated in FIG. 8, tone_mapping_info in which one value among 0, 2 and 3 is set as tone_map_model_id is used as the tone mapping definition information for HDR-STD conversion or STD-HDR conversion. Information included in tone_mapping_info in which a value of 4 is set as tone_map_model_id is used as the HDR information.

In FIG. 7, 9th to 11th lines are a description of tone_map_model_id=0. In the case of tone_map_model_id=0, min_value and max_value are described.

FIG. 9 is a diagram illustrating an example of a tone curve shown by tone_mapping_info of tone_map_model_id=0.

In FIG. 9, the horizontal axis represents coded_data (RGB value before conversion) and the vertical axis represents target_data (RGB value after conversion). When the tone curve in FIG. 9 is used, an RGB value equal to or less than D1 is converted into an RGB value indicated by min_value, as indicated by white arrow #151. Further, an RGB value equal to or greater than D2 is converted into an RGB value indicated by max_value, as indicated by white arrow #152.

Here, tone_mapping_info of tone_map_model_id=0 is used as the tone mapping definition information for HDR-STD conversion. When tone_mapping_info of tone_map_model_id=0 is used, luminance equal to or greater than max_value and equal to or less than min_value (luminance expressed by an RGB value) is lost, but a load on the conversion process is lightened.

15th to 17th lines of FIG. 7 indicate a description related to tone_map_model_id=2. In the case of tone_map_model_id=2, start_of_coded_interval[i] of the number of max_target_data indicating a step function is described. start_of_coded_interval[i] indicates a start position of an interval that is equal to or larger than coded_data converted into i of target_data and smaller than i+1 of target_data.

The number of bits of start_of_coded_interval[i] may be a variable value decided according to coded_data_bit_depth in a 6th line or a fixed value (for example, 256 bits). In the case of the variable value, the number of bits can be reduced to be smaller than in the case of the fixed value.

Figure 10:
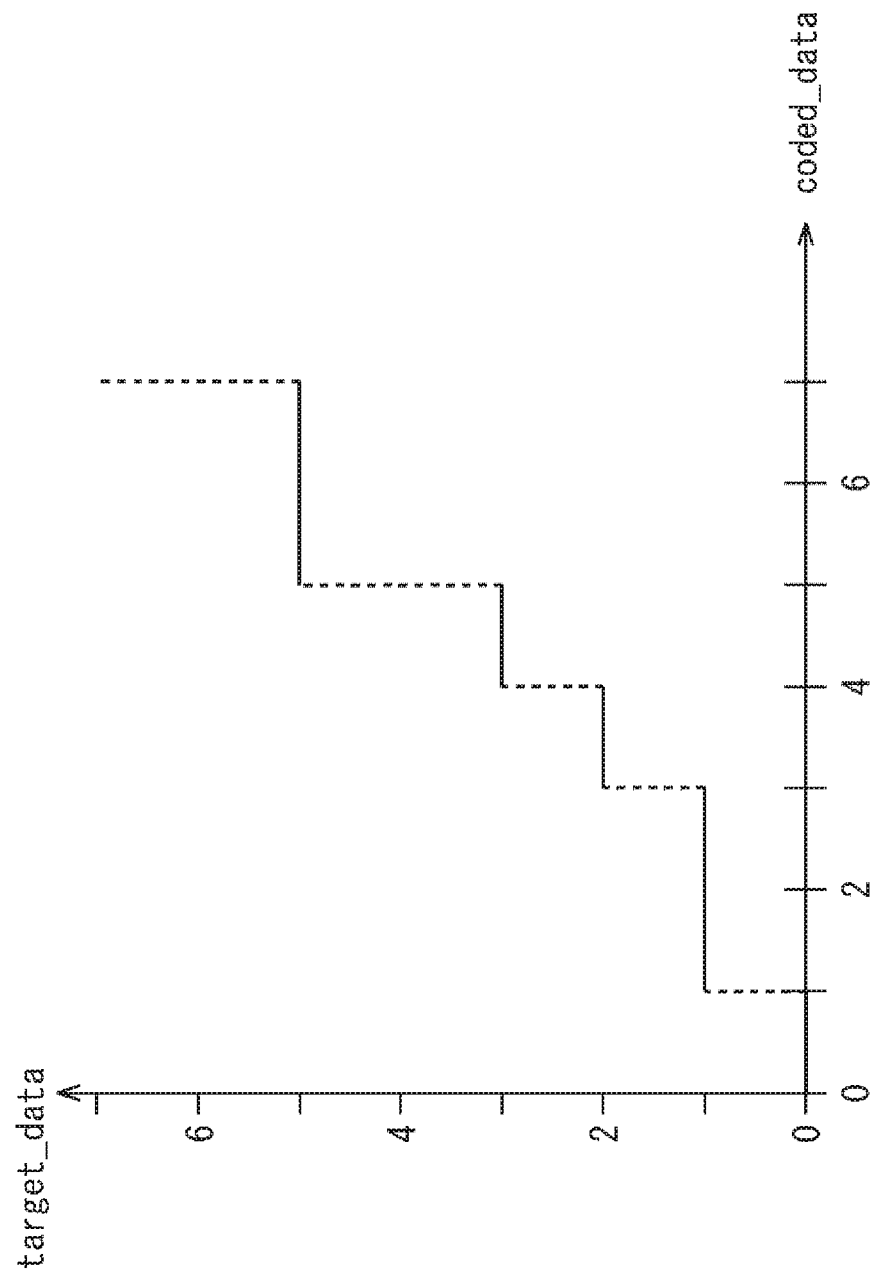
FIG. 10 is a diagram illustrating an example of a step function shown by Tone_mapping_info of tone_map_model_id=2.

FIG. 10 is a diagram illustrating an example of a step function shown by tone_mapping_info of tone_map_model_id=2.

In the example of FIG. 10, start_of_coded_interval[i] (i=0, 1, 2, 3, 4, 5, 6, and 7) is 0, 1, 3, 4, 5, 5, 7, and 7. Thus, a coded_data-target_data conversion table that indicates a value of target_data to coded_data in order starting from 0 of coded_data is 0, 1, 1, 2, 3, 5, and 5. Accordingly, when the step function of FIG. 1 is used, for example, coded_data=5 is converted into target_data=3.

Here, tone_mapping_info of tone_map_model_id=2 is used as the tone mapping definition information for STD-HDR conversion or HDR-STD conversion. Further, since tone_mapping_info of tone_map_model_id=2 has a large amount of data, it is necessary to perform convolution to a coded_data-target_data conversion table at the time of generation, but a load of the conversion process is light.

18th to 23rd lines of FIG. 7 indicate a description related to tone_map_model_id=3. In the case of tone_map_model_id=3, a number of coded_pivot_value[i] and target_pivot_value[i] that indicate a polygonal line function are described and are designated by num_pivots are described. coded_pivot_value[i] indicates coded_data of an i-th pivot, and target_pivot_value[i] indicates target_data of an i-th pivot.

The number of bits of coded_pivot_value[i] and target_pivot_value[i] may be a variable value decided according to coded_data_bit_depth in the 6th line or a fixed value (for example, 256 bits). In the case of the variable value, the number of bits can be reduced to be smaller than in the case of the fixed value.

Figure 11:
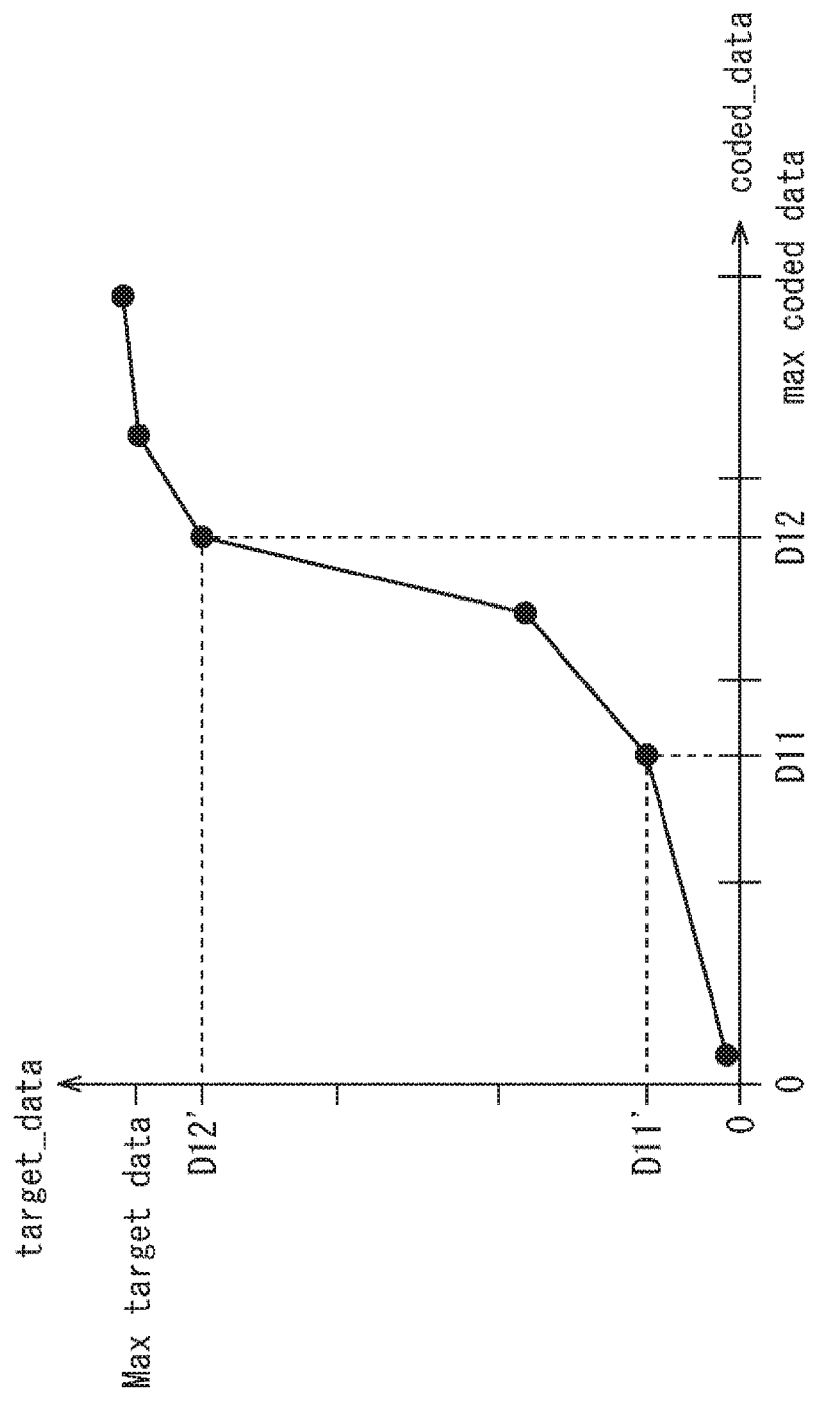
FIG. 11 is a diagram illustrating an example of a polygonal line function shown by Tone_mapping_info of tone_map_model_id=3.

FIG. 11 is a diagram illustrating an example of a polygonal line function shown by tone_mapping_info of tone_map_model_id=3.

In the example of FIG. 11, coded_pivot_value[1] of a 1st pivot is D11, and target_pivot_value[1] is D11'. coded_pivot_value[3] of a 3rd pivot is D12, and target_pivot_value[3] is D12'. Accordingly, when the polygonal line function in FIG. 11 is used, for example, coded_data=D11 is converted into target_data=D11' and coded_data=D12 is converted into target_data=D12'. Here, tone_mapping_info of tone_map_model_id=3 is used as the tone mapping definition information for STD-HDR conversion or HDR-STD conversion.

In this way, tone_mapping_info in which one value among 0, 2, and 3 is set as tone_map_model_id is used as the tone mapping definition information for STD-HDR conversion or HDR-STD conversion and is transmitted from the recording device 1 to the reproduction device 2.

In FIG. 7, 24th to 39th lines are a description of tone_map_model_id=4. Of the information regarding tone_map_model_id=4, ref_screen_luminance_white, extended_range_white_level, nominal_black_level_code_value, nominal_white_level_code_value, and extended_white_level_code_value are parameters included in the HDR information.

Figure 12:
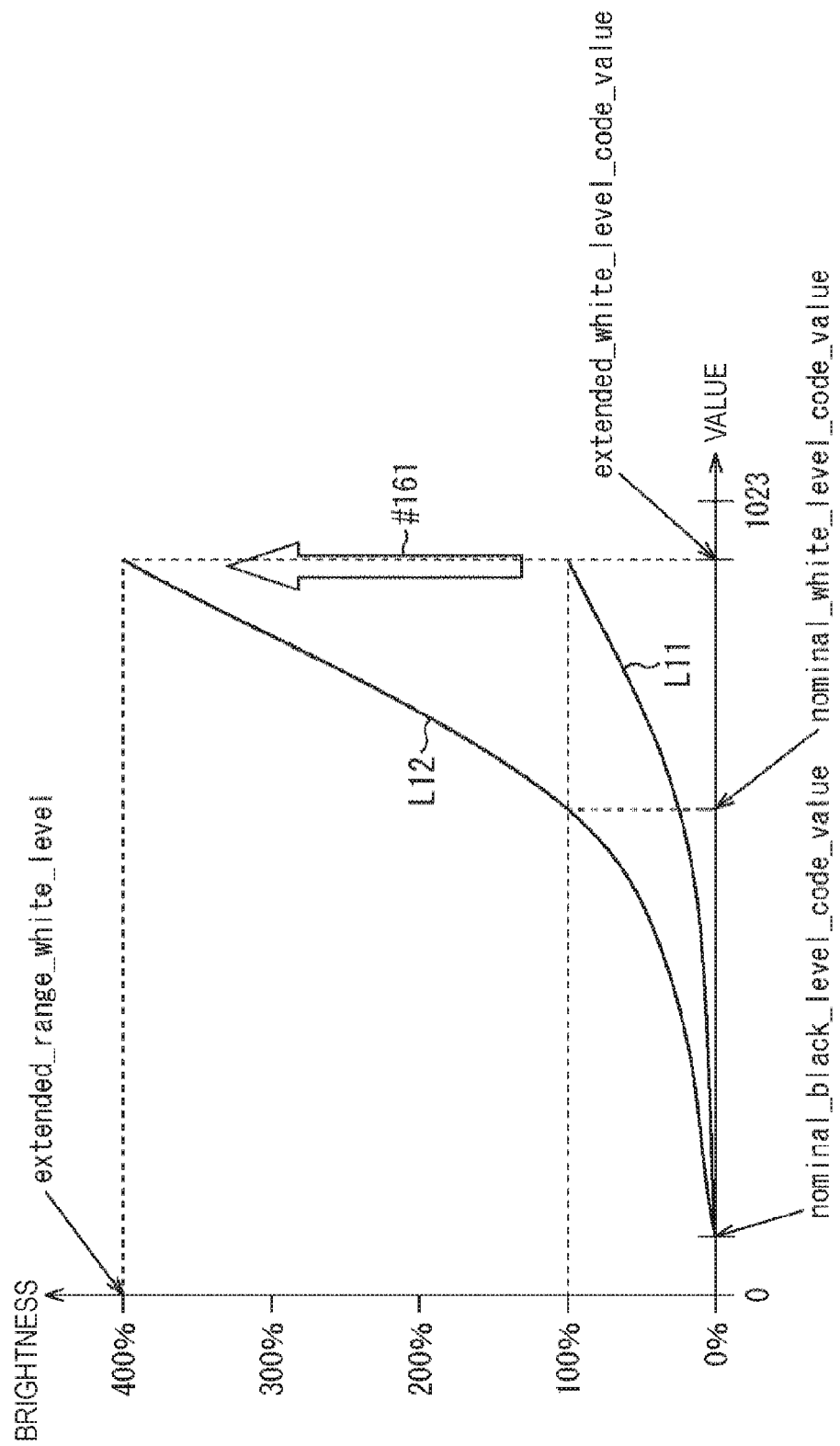
FIG. 12 is a diagram illustrating an example of each piece of information included in the HDR information.

FIG. 12 is a diagram illustrating an example of each piece of information included in the HDR information.

In FIG. 12, the horizontal axis represents a luminance value. When a bit length is 10 bits, the luminance value is a value of 0 to 1023. In FIG. 12, the vertical axis represents brightness. A curved line L11 indicates a relation between a luminance value and brightness in a monitor with standard luminance. A dynamic range of the monitor with the standard luminance is a range of 0% to 100%.

Here, ref_screen_luminance_white indicates the brightness ($cd/m^2$) of a standard monitor. Further, extended_range_white_level indicates the brightness of a dynamic range after extension. In the case of the example of FIG. 12, 400 is set as a value of extended_range_white_level.

Here, nominal_black_level_code_value indicates a luminance value of black (brightness of 0%) and nominal_white_level_code_value indicates a luminance value of white (brightness of 100%) in the monitor with the standard luminance. Further, extended_white_level_code_value indicates a luminance value of white in the dynamic range after extension.

In the case of the example of FIG. 12, the dynamic range of 0% to 100% is extended to a dynamic range of 0% to 400% according to the value of extended_range_white_level, as indicated by white arrow #161. A luminance value corresponding to brightness of 400% is designated by extended_white_level_code_value.

The luminance feature of the HDR data is a feature indicated by a curved line L12 in which the values of nominal_black_level_code_value, nominal_white_level_code_value, and extended_white_level_code_value are respectively brightness of 0%, 100%, and 400%.

In this way, the luminance feature of the master HDR data is indicated by tone_mapping_info in which the value of 4 is set as tone_map_model_id and is transmitted from the recording device 1 to the reproduction device 2.

(User Data Unregistered SEI Message)

FIG. 13 is a diagram illustrating a syntax of a user data unregistered SEI message in which the closed captions are arranged.

typ_indicator in a 3rd line is information identifying content of data arranged in the user data unregistered SEI message. When the closed captions are arranged, typ_indicator is 0x47413934 indicating the closed captions.

Further, when typ_indicator is 0x47413934 indicating the closed captions, information related to tone_mapping_info of the closed captions and the closed captions are described as illustrated in 4th to 11th lines.

Specifically, number_of_tone_mapping_info_ref in a 5th line indicates the number of tone_mapping_info of the closed captions. tone_mapping_info_ref in an 8th line is tone_map_id of each tone_mapping_info of the closed captions. cc_data in a 10th line is closed captions corresponding to one picture. cc_data is data that conforms to Digital Television (DTV) Closed Captioning, Line 21 Data Services, or the like.

Here, the BD-ROM format will be described.

(Management Structure of AV Stream in BD-ROM Format)

Figure 14:
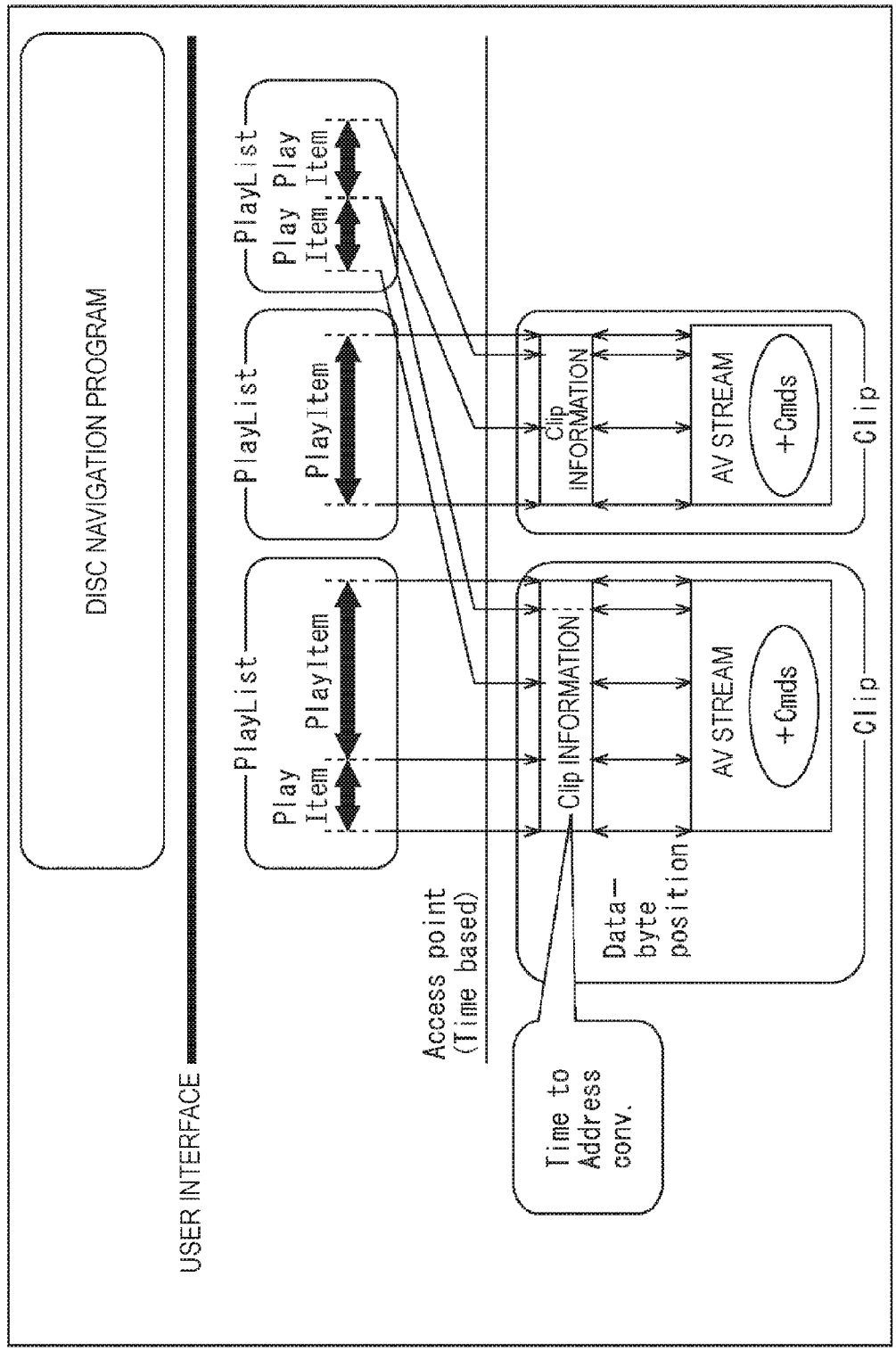
FIG. 14 is a diagram illustrating an example of a management structure of an AV stream in a BD-ROM format.

FIG. 14 is a diagram illustrating an example of a management structure of an AV stream in a BD-ROM format.

The management of an AV stream including a video stream is performed using two layers of PlayList and Clip. The AV stream is recorded not only on the optical disc 11 but also on a local storage of the reproduction device 2.

A pair of one AV stream and Clip Information which is information pertaining to the AV stream is managed as one object. A pair of AV stream and Clip Information is referred to as Clip.

The AV stream is developed on a time axis and an access point of each Clip is designated in PlayList mainly with a time stamp. Clip Information is used, for example, to search for an address at which decoding is to start in the AV stream.

PlayList is a collection of reproduction sections of an AV stream. One reproduction section in the AV stream is referred to as PlayItem. PlayItem is expressed with a pair of IN point and OUT point of a reproduction section on the time axis. As illustrated in FIG. 14, PlayList is configured to include one PlayItem or a plurality of PlayItems.

The first PlayList from the left side of FIG. 14 is configured to include two PlayItems. The first half portion and the second half portion of the AV stream included in the left Clip are referred to by the two PlayItems.

The second PlayList from the left side is configured to include one PlayItem and the entire AV stream included in the right Clip is referred to by the PlayList.

The third PlayList from the left side is configured to include two PlayItems. A certain portion of the AV stream included in the left Clip and a certain portion of the AV stream included in the right Clip are referred to by the two PlayItems.

For example, the left PlayItem included in the first PlayList from the left side is designated as a reproduction target by a disc navigation program, the first half portion of the AV stream included in the left Clip referred to by the PlayItem is reproduced. In this way, PlayList is used as reproduction management information to manage reproduction of the AV stream.

A reproduction path which is a reproduction path of at least one PlayList in PlayList and is made in accordance with at least the one PlayList is referred to as Main Path. A reproduction path which is a reproduction path of at least one SubPlayItem in PlayList and is made in accordance with at least the one SubPlayItem in parallel with Main Path is referred to as Sub Path.

(Structure of Main Path and Sub Path)

Figure 15:
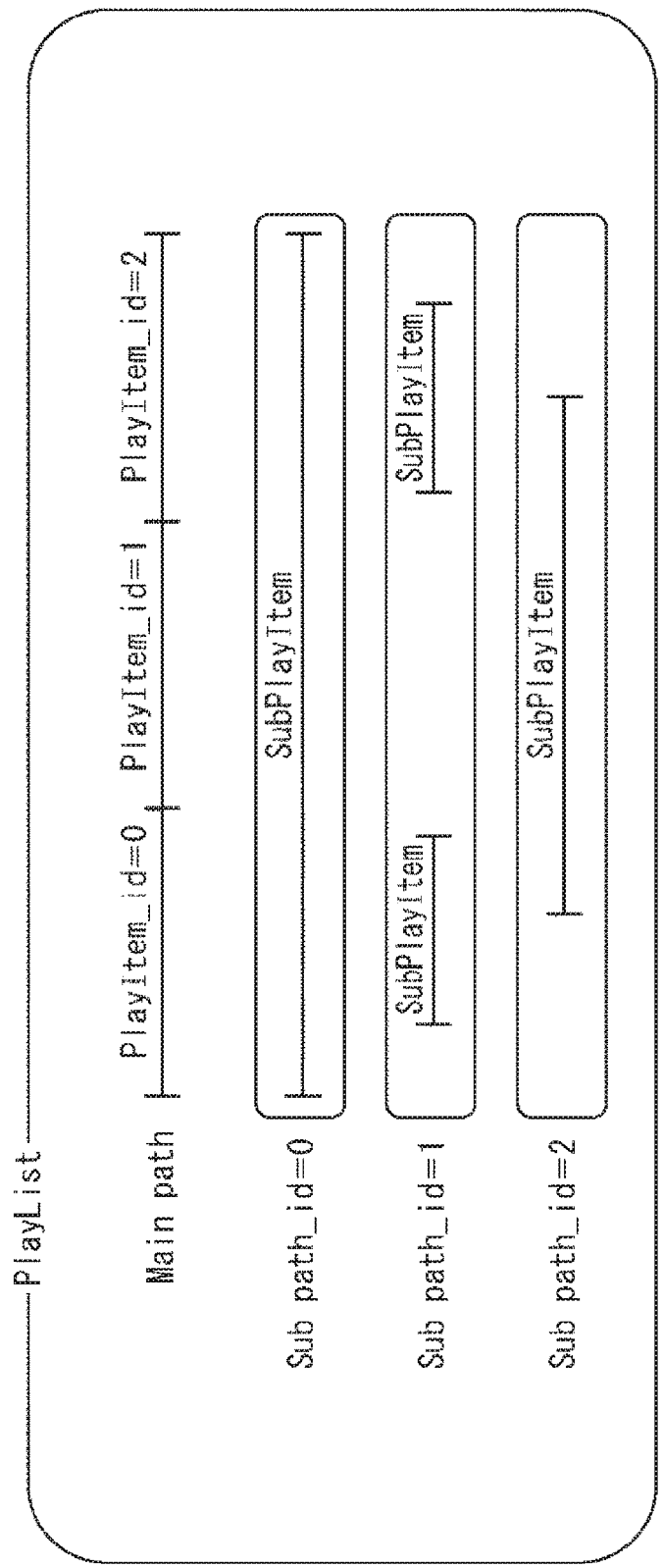
FIG. 15 is a diagram illustrating the structure of Main Path and Sub Path.

FIG. 15 is a diagram illustrating the structure of Main Path and Sub Path.

PlayList includes one Main Path and at least one Sub Path. PlayList in FIG. 15 includes one Main Path and three Sub Paths which are Main Path and Sub Paths of three PlayItems and are made in accordance with the three PlayItems.

In PlayItems forming Main Path, IDs are each set sequentially from the beginning. In Sub Paths, IDs of Subpath_id=0, Subpath_id=1, and Subpath_id=2 are set sequentially from the beginning.

In the example of FIG. 15, one SubPlayItem is included in Sub Path of Subpath_id=0 and two SubPlayItems are included in Sub Path of Subpath_id=1. One SubPlayItem is included in Sub Path of Subpath_id=2.

An AV stream referred to by one PlayItem includes at least a video stream of a main video. The AV stream may include or may not include at least one audio stream reproduced at the same timing as (synchronized with) the video stream of the main video included in the AV stream.

The AV stream may include or may not include at least one video stream of a sub-video reproduced in synchronization with the video stream of the main video included in the AV stream.

The AV stream may include or may not include at least one PG stream which is a stream of subtitle data (Presentation Graphic (PG)) of a bit map reproduced in synchronization with the video stream of the main video included in the AV stream.

The AV stream may include or may not include at least one Text_ST stream which is a stream of text data (Text-ST) of subtitles reproduced in synchronization with the video stream of the main video included in the AV stream.

The AV stream may include or may not include at least one IG stream which is a stream of image data (Interactive Graphic (IG)) of a menu button reproduced in synchronization with the video stream of the main video included in the AV stream.

The video stream of the main video, and the audio stream, the video stream of the sub-video, the PG stream, the Text-ST stream, and the IG stream reproduced in synchronization with the video stream of the main video are multiplexed to the AV stream referred to by one PlayItem.

One SubPlayItem refers to, for example, a video stream, an audio stream, a PG stream, a Text-ST stream, an IG stream, or the like different from the AV stream referred to by PlayItem.

In this way, the AV stream is reproduced using PlayList and Clip Information. PlayList and Clip Information including the information regarding the reproduction of the AV stream are appropriately referred to Data Base information.

(Management Structure of File of Optical Disc 11)

Figure 16:
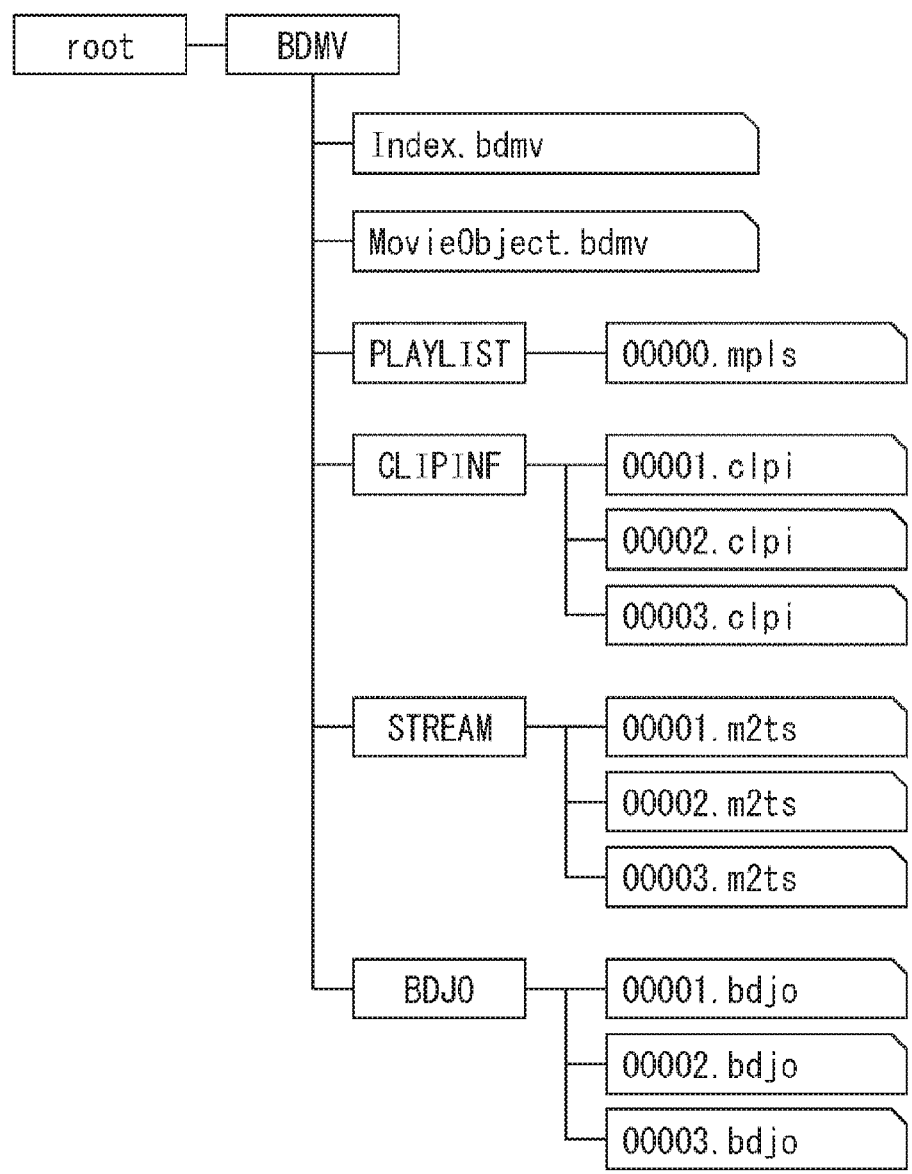
FIG. 16 is a diagram illustrating an example of a management structure of a file.

FIG. 16 is a diagram illustrating an example of a management structure of a file recorded on the optical disc 11.

Each file recorded on the optical disc 11 is hierarchically managed by a directory structure. One root directory is created on the optical disc 11.

A BDMV directory is placed under the root directory.

Under the BDMV directory, an Index file which is a file in which a name "Index.bdmv" is set and a MovieObject file which is a file in which a name "MovieObject.bdmv" are set.

In the Index file, for example, a list of title numbers recorded on the optical disc 11, and kinds of objects and object numbers executed in correspondence to the title numbers are described. As the kinds of objects, there are two kinds of a movie object (Movie Object) and a BDJ object (BDJ object).

The movie object is an object in which a navigation command of reproduction or the like of a playlist is described. The BDJ object is an object in which a BDJ application is described. In a MovieObject file, a movie object is described.

Under the BDMV directory, a PLAYLIST directory, a CLIPINF directory, a STREAM directory, a BDJO directory, and the like are provided.

In the PLAYLIST directory, PlayList files in which PlayList is described are stored. In each PlayList file, a name in which a 5-digit number and an extension ".mpls" are combined is set. In one Playlist file illustrated in FIG. 16, a file name "00000.mpls" is set.

In the CLIPINF directory, Clip Information files in which Clip Information is described are stored. In each Clip Information file, a name in which a 5-digit number and an extension ".clpi" are combined is set. In three Clip Information files in FIG. 16, file names "00001.clpi," "00002.clpi," and "00003.clpi" are set.

In the STREAM directory, stream files are stored. In each stream file, a name in which a 5-digit number and an extension ".m2ts" are combined is set. In three stream files in FIG. 16, file names "00001.m2ts," "00002.m2ts," and "00003.m2ts" are set.

The Clip Information file and the stream file in which the same 5-digit number is set in the file name are files forming one Clip. When the stream file "00001.m2ts" is reproduced, the Clip Information file "00001.clpi" is used. When the stream file "00002.m2ts" is reproduced, the Clip Information file "00002.clpi" is used.

In the BDJO directory, BDJ object files in which a BDJ object is described are stored. In each BDJ object file, a name in which a 5-digit number and an extension ".bdjo" are combined is set. In three stream files in FIG. 16, file names "00001.bdjo," "00002.bdjo," and "00003.bdjo" are set.

Here, main description of the syntax of each file will be described.

(Syntax of Playlist File)

FIG. 17 is a diagram illustrating the syntax of STN_table of PlayItem of a playlist file.

STN_table includes information regarding the AV stream referred to by PlayItem. When there is Sub Path reproduced in association with PlayItem, information regarding the AV stream referred by SubPlayItem forming the Sub Path.

number_of_primary_video_stream_entries in a 4th line indicates the number of video streams of a main video included (registered) in STN_table as entries. primary_video_tone_mapping_flag in an 11th line indicates whether or not a main video is associated with tone_mapping_info.

As illustrated in a 33rd line, when primary_video_tone_mapping_flag is 1, number_of_tone_mapping_info_ref indicating the number of tone_mapping_info of a main video is described in STN_table.

Further, as illustrated in 34th to 37th lines, when primary_video_tone_mapping_flag is 1, tone_mapping_info_ref indicating tone_map_id of tone_mapping_info of a main video is described in STN_table.

As described above, in the STN_table, a video is associated with tone_mapping_info of the video. Thus, the reproduction device 2 can select tone_mapping_info of a video from tone_mapping_info inserted into the SEI of the video stream based on STN_table and use tone_mapping_info for reproduction of the video.

Here, the configuration of each device will be described.

(Configuration of Recording Device 1)

FIG. 18 is a block diagram illustrating a configuration example of the recording device 1.

The recording device 1 is configured to include a controller 21, an encoding processing unit 22, and a disc drive 23. The master HDR data is input to the encoding processing unit 22.

The controller 21 is configured to include a central processing unit (CPU), a read-only memory (ROM), and a random access memory (RAM). The controller 21 executes a predetermined program to control an operation of the entire recording device 1.

In the controller 21, a Data Base information generation unit 21A is implemented by executing a predetermined program. The Data Base information generation unit 21A describes the number of tone_mapping_info of a video supplied from the encoding processing unit 22 as number_of_tone_mapping_info_ref of a main video of STN_table (FIG. 17) of PlayList, and describes tone_map_id as tone_mapping_info_ref. The Data Base information generation unit 21A generates PlayList and Clip Information serving as Data Base information by describing various kinds of information as described above, and outputs PlayList and Clip Information to the disc drive 23.

The encoding processing unit 22 encodes the master HDR data. The encoding processing unit 22 outputs a video stream obtained by encoding the master HDR data to the disc drive 23. The encoding processing unit 22 supplies the number of tone_mapping_info and tone_map_id of a video to the controller 21.

The disc drive 23 records a file storing the Data Base information supplied from the controller 21 and the video stream supplied from the encoding processing unit 22 on the optical disc 11 according to the directory structure of FIG. 16.

(Configuration Example of Encoding Processing Unit 22)

FIG. 19 is a block diagram illustrating a configuration example of the encoding processing unit 22 of FIG. 18.

The encoding processing unit 22 is configured with an HDR information generation unit 31, an HEVC encoder 32, an HDR-STD conversion unit 33, a definition information generation unit 34, and a stream generation unit 35.

The HDR information generation unit 31 detects luminance of the input master HDR data and generates HDR information including each piece of information described with reference to FIG. 12. The HDR information generation unit 31 outputs the generated HDR information to the stream generation unit 35.

When the recording mode is mode-i, the HEVC encoder 32 encodes the input master HDR video in accordance with the HEVC scheme. When the recording mode is mode-ii, the HEVC encoder 32 encodes the STD video supplied from the HDR-STD conversion unit 33 in accordance with the HEVC scheme. The HEVC encoder 32 outputs the encoded data of the HDR video or the encoded data of the STD data to the stream generation unit 35.

The HDR-STD conversion unit 33 converts the input master HDR data into the STD data. The conversion performed by the HDR-STD conversion unit 33 is appropriately performed according to conversion parameters input by the author. The HDR-STD conversion unit 33 outputs, to the definition information generation unit 34, information indicating a correspondence relation between input data and output data in which RGB signals of the HDR data are set as the input data and RGB signals of the STD data are set as the output data.

(Signal Processing by HDR-STD Conversion Unit 33)

Figure 20:
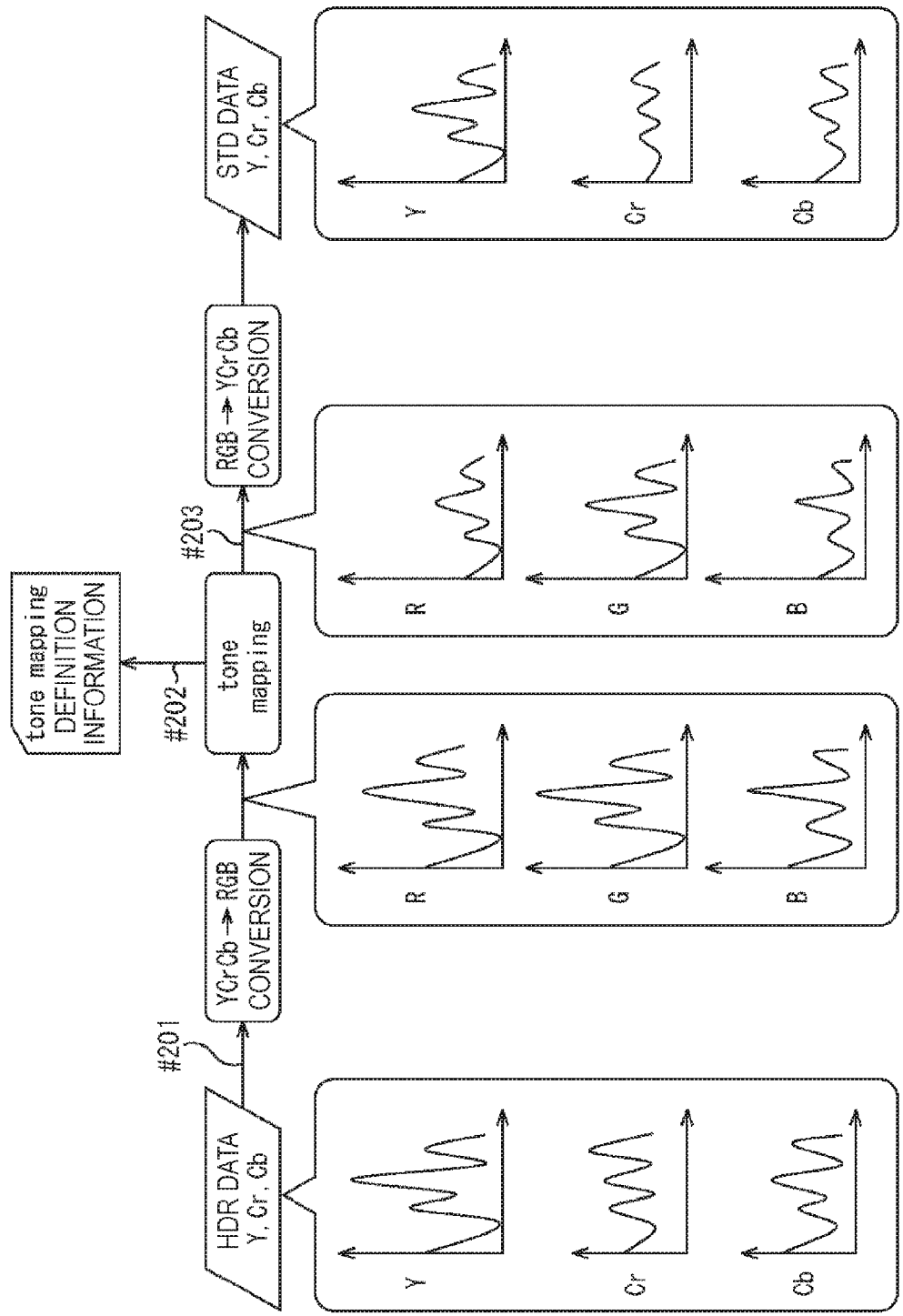
FIG. 20 is a block diagram illustrating an example of signal processing by an HDR-STD conversion unit.

FIG. 20 is a diagram illustrating an example of signal processing by the HDR-STD conversion unit 33.

As indicated by the point of arrow #201, the HDR-STD conversion unit 33 converts YCrCb signals of the input master HDR data into RGB signals and performs conversion (tone mapping) on each of the RGB signals to convert each of the RGB signals into each of the RGB signals of the STD data.

The HDR-STD conversion unit 33 outputs, to the definition information generation unit 34, information indicating a correspondence relation between the RGB signals of the HDR data, which is the input data, and the RGB signals of the STD data, which is the output data. The information output to the definition information generation unit 34 is used to generate the tone mapping definition information, as indicated by the point of arrow #202.

The HDR-STD conversion unit 33 converts the RGB signals of the STD data into the YCrCb signals, as indicated by the point of arrow #203, and outputs the YCrCb signals.

Figure 21:
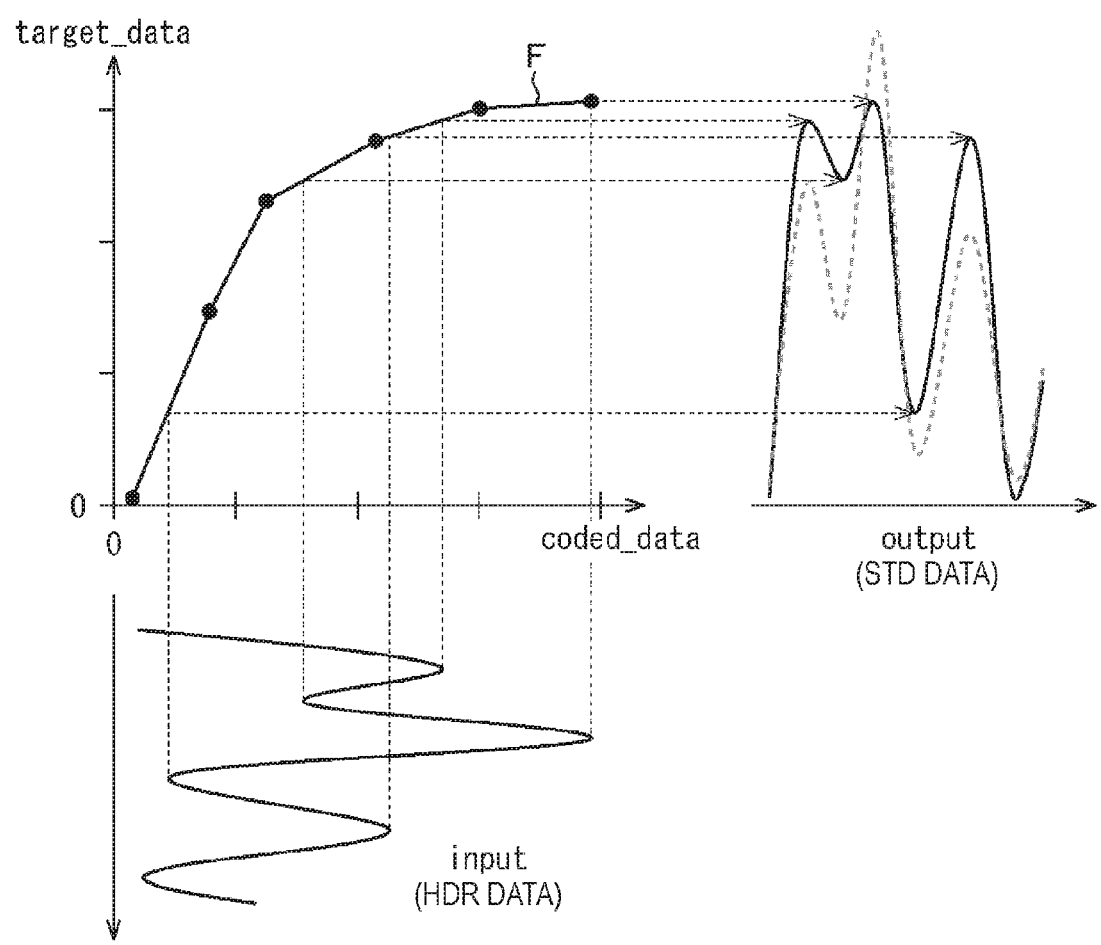
FIG. 21 is a diagram illustrating an example of tone mapping.

FIG. 21 is a diagram illustrating an example of tone mapping.

The RGB signals of the HDR data are converted into the RGB signals of the STD data, for example, as illustrated in FIG. 21, such that a high-luminance component is compressed and intermediate and low band luminance components are expanded. Information indicating a function F associating the RGB signals of the HDR data with the RGB signals of the STD data, as illustrated in FIG. 21, is generated by the definition information generation unit 34. The tone mapping definition information generated using the information indicating the function F illustrated in FIG. 21 is tone_mapping_info of tone_map_model_id=3 in which the relation between coded_data and target_data is indicated by the polygonal line function, as described with reference to FIG. 11.

Returning to the description of FIG. 19, when the recording mode is mode-ii, the HDR-STD conversion unit 33 outputs the STD video obtained by converting the HDR video to the HEVC encoder 32, and supplies the STD closed captions obtained by converting the HDR closed captions to the stream generation unit 35.

The definition information generation unit 34 generates the tone mapping definition information for HDR-STD conversion based on the information supplied from the HDR-STD conversion unit 33.

For example, when tone_map_model_id=0 is used, the definition information generation unit 34 generates tone_mapping_info including the values of min_value and max_value in FIG. 9 as the tone mapping definition information for HDR-STD conversion.

Further, when tone_map_model_id=2 is used, the definition information generation unit 34 generates tone_mapping_info including start_of_coded_interval[i] equal in number to max_target_data of FIG. 10 as the tone mapping definition information for HDR-STD conversion.

Further, when tone_map_model_id=3 is used, the definition information generation unit 34 generates tone_mapping_info including the number of pieces of coded_pivot_value[i] and the number of pieces of target_pivot_value[i] designated by num_pivots in FIG. 11 as the tone mapping definition information for HDR-STD conversion.

The stream generation unit 35 supplies the controller 21 in FIG. 18 with the number of pieces of tone_mapping_info including the HDR information of the video supplied from the HDR information generation unit 31 and the number of pieces of tone_mapping_info which is the tone mapping definition information of the video supplied from the definition information generation unit 34. The stream generation unit 35 supplies the controller 21 with tone_map_id of tone_mapping_info.

The stream generation unit 35 inserts tone_mapping_info of a video and closed captions into the encoded data as the tone mapping information SEI message. Further, when the recording mode is mode-i, the stream generation unit 35 inserts the input master HDR closed captions and the number of tone_mapping_info and tone_map_id of the closed captions into the encoded data as the user data unregistered SEI message. On the other hand, when the recording mode is mode-ii, the stream generation unit 35 inserts the STD closed captions supplied from the HDR-STD conversion unit 33 and the number of tone_mapping_info and tone_map_id of the closed captions into the encoded data as the user data unregistered SEI message.

As described above, the tone mapping information SEI message and the user data unregistered SEI message are inserted into the encoded data, and thus the video stream is generated. The stream generation unit 35 outputs the video stream to the disc drive 23 of FIG. 18.

(Configuration Example of Reproduction Device 2)

Figure 22:
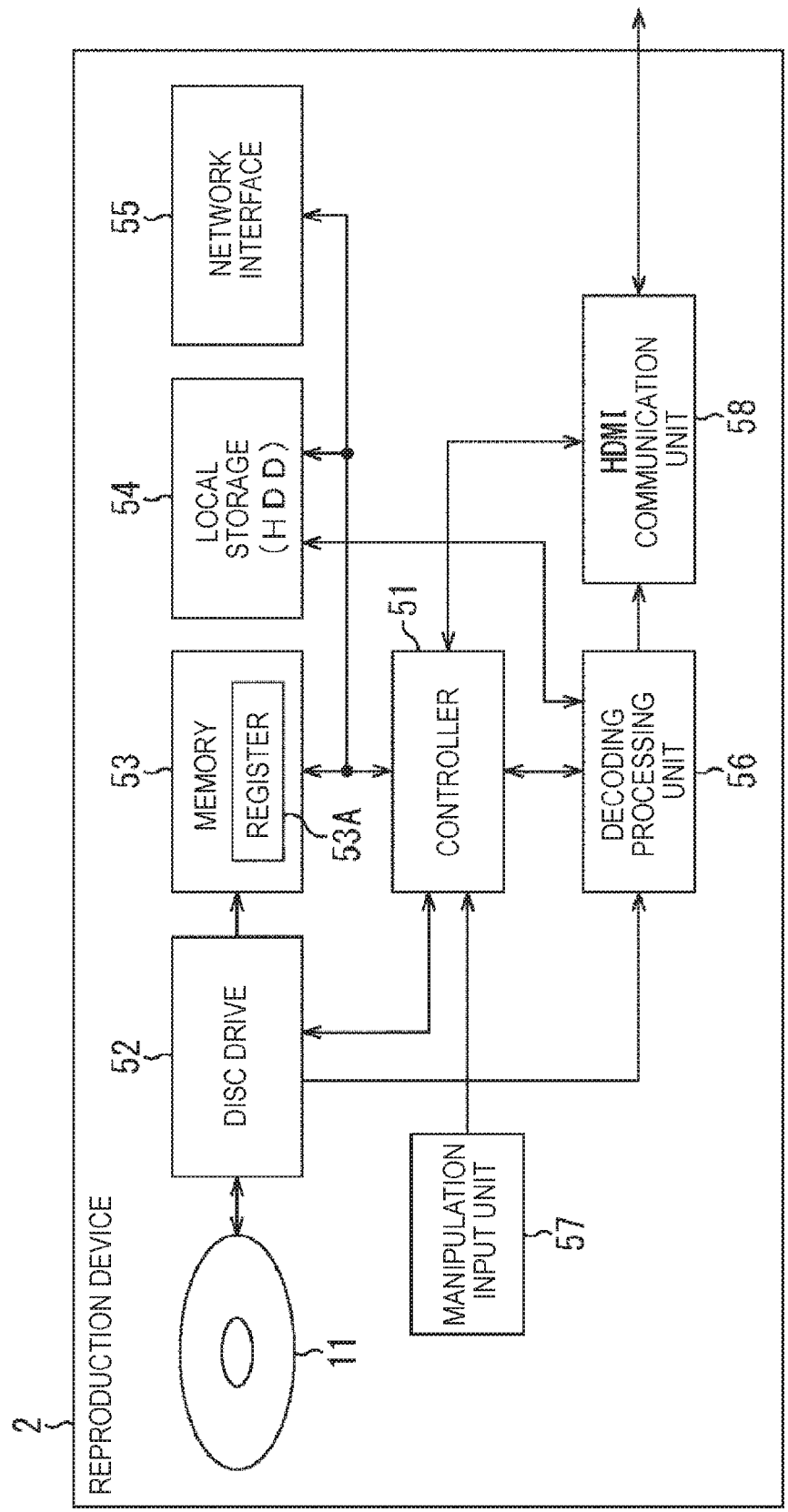
FIG. 22 is a block diagram illustrating a configuration example of a reproduction device of the first embodiment of the recording and reproduction system to which the present technology is applied.

FIG. 22 is a block diagram illustrating a configuration example of the reproduction device 2.

The reproduction device 2 is configured to include a controller 51, a disc drive 52, a memory 53, a local storage 54, a network interface 55, a decoding processing unit 56, a manipulation input unit 57, and an HDMI communication unit 58.

The controller 51 is configured to include a CPU, a ROM, and a RAM. The controller 51 executes a predetermined program to control an operation of the entire reproduction device 2. For example, the controller 51 supplies the decoding processing unit 56 with tone_mapping_info_ref of the video described in PlayList supplied from the disc drive 52.

The disc drive 52 functions as a reading unit that reads data from the optical disc 11 and outputs the read data to the controller 51, the memory 53, or the decoding processing unit 56. For example, the disc drive 52 outputs the Data Base information read from the optical disc 11 to the controller 51, and outputs the video stream and the like to the decoding processing unit 56.

The memory 53 stores data or the like necessary for the controller 51 to perform various processes. In the memory 53, a register 53A which is a player status register (PSR) is formed. The register 53A stores various kinds of information referred to at the time of reproduction of the optical disc 11 by the reproduction device 2 which is a BD player.

For example, the local storage 54 is configured with a Hard Disk Drive (HDD). Data downloaded from a server is recorded on the local storage 54.

The network interface 55 communicates with the server via a network such as the Internet and supplies data downloaded from the server to the local storage 54.

The decoding processing unit 56 extracts tone_mapping_info including the HDR information and tone_mapping_info serving as the tone mapping definition information from the SEI of the video stream supplied from the disc drive 52. The decoding processing unit 56 extracts either of the HDR closed captions and the STD closed captions and tone_mapping_info_ref from the SEI of the video stream.

The decoding processing unit 56 decodes the encoded data included in the video stream according to the HEVC scheme. The decoding processing unit 56 selects tone_mapping_info of a video based on tone_mapping_info_ref of a video supplied from the controller 51. The decoding processing unit 56 converts the HDR video or the STD video obtained as a result of decoding into the STD video or the HDR video with reference to the tone mapping definition information serving as selected tone_mapping_info as necessary, and outputs the STD video or the HDR video to the HDMI communication unit 58. When the HDR video is output, the decoding processing unit 56 outputs the HDR information included in selected tone_mapping_info to the HDMI communication unit 58 together with the HDR video.

The decoding processing unit 56 selects tone_mapping_info supplied from the decoding processing unit 56 based on tone_mapping_info_ref extracted from the SEI. The decoding processing unit 56 converts the HDR closed captions or the STD closed captions into the STD closed captions or the HDR closed captions with reference to the tone mapping definition information serving as selected tone_mapping_info as necessary, and outputs the STD closed captions or the HDR closed captions to the HDMI communication unit 58. When the HDR closed captions are output, the decoding processing unit 56 outputs the HDR information included in selected tone_mapping_info to the HDMI communication unit 58 together with the HDR closed captions.

The manipulation input unit 57 is configured to include an input device such as a button, a key, or a touch panel or a reception unit receiving a signal of infrared light or the like transmitted from a predetermined remote commander. The manipulation input unit 57 detects a manipulation of a user and supplies a signal indicating content of the detected manipulation to the controller 51.

The HDMI communication unit 58 communicates with the display device 3 via the HDMI cable 4. For example, the HDMI communication unit 58 acquires information related to the performance of the monitor with which the display device 3 is equipped, and outputs the acquired information to the controller 51. The HDMI communication unit 58 outputs the HDR data or the STD data supplied from the decoding processing unit 56 to the display device 3. The HDMI communication unit 58 outputs the HDR information supplied from the decoding processing unit 56 to the display device 3.

(Configuration Example of Decoding Processing Unit 56)

Figure 23:
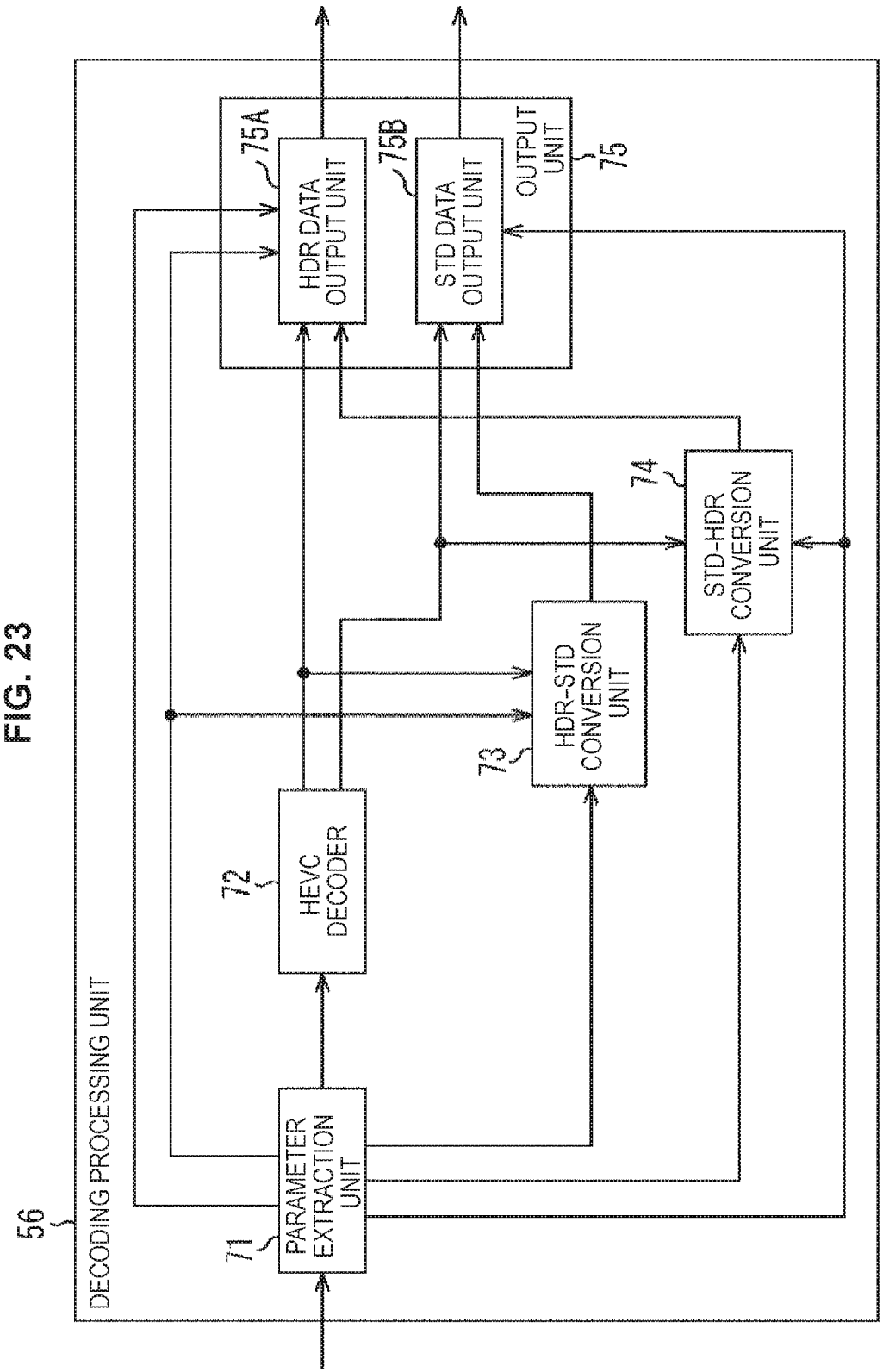
FIG. 23 is a block diagram illustrating a configuration example of a decoding processing unit in FIG. 22.

FIG. 23 is a block diagram illustrating a configuration example of the decoding processing unit 56 of FIG. 22.

The decoding processing unit 56 is configured with a parameter extraction unit 71, an HEVC decoder 72, an HDR-STD conversion unit 73, an STD-HDR conversion unit 74, and an output unit 75. The output unit 75 is configured with an HDR data output unit 75A and an STD data output unit 75B.

The video stream read from the disc drive 52 is input to the parameter extraction unit 71. For example, the recording mode indicated by mode_flag included in Clip Information and extended display identification data (EDID) that is acquired from the display device 3 and indicates the performance of the monitor with which the display device 3 is equipped are supplied from the controller 51 to the decoding processing unit 56. Further, for example, tone_mapping_info_ref of a video described in PlayList is supplied from the controller 51 to the decoding processing unit 56.

The parameter extraction unit 71 extracts the HDR information, the tone mapping definition information, either of the HDR closed captions or the STD closed captions, and tone_mapping_info_ref of the closed captions from the SEI of the video stream. When the recording mode is mode-i, and the HDR data is output to the display device 3, the parameter extraction unit 71 outputs the HDR information included in tone_mapping_info specified by tone_mapping_info_ref of the video and the closed captions to the HDR data output unit 75A. Further, when the recording mode is mode-i, and the STD data is output to the display device 3, the parameter extraction unit 71 outputs the tone mapping definition information for HDR-STD conversion specified by tone_mapping_info_ref of the video and the closed captions to the HDR-STD conversion unit 73.

On the other hand, when the recording mode is mode-ii, and the HDR data is output to the display device 3, the parameter extraction unit 71 outputs the HDR information included in tone_mapping_info specified by tone_mapping_info_ref of the video and the closed captions to the HDR data output unit 75A. In this case, the parameter extraction unit 71 outputs the tone mapping definition information for STD-HDR conversion specified by tone_mapping_info_ref of the video and the closed captions to the STD-HDR conversion unit 74. When the recording mode is mode-ii, and the STD data is output to the display device 3, the extracted HDR information and the tone mapping definition information are not used.

The parameter extraction unit 71 outputs the encoded data included in the video stream to the HEVC decoder 72. The parameter extraction unit 71 supplies the HDR closed captions to the HDR-STD conversion unit 73 and the HDR data output unit 75A. The parameter extraction unit 71 supplies the STD closed captions to the STD-HDR conversion unit 74 and the STD data output unit 75B.

The HEVC decoder 72 decodes the encoded data of the HEVC scheme supplied from the parameter extraction unit 71. When the recording mode is mode-i, the HEVC decoder 72 outputs the HDR video obtained by the decoding to the HDR-STD conversion unit 73 and the HDR data output unit 75A. Further, when the recording mode is mode-ii, the HEVC decoder 72 outputs the STD video obtained by the decoding to the STD-HDR conversion unit 74 and the STD data output unit 75B.

The HDR-STD conversion unit 73 converts the HDR video supplied from the HEVC decoder 72 and the HDR closed captions supplied from the parameter extraction unit 71 into the STD data based on the tone mapping definition information for HDR-STD conversion supplied from the parameter extraction unit 71. The HDR-STD conversion unit 73 outputs the STD data obtained by the converting to the STD data output unit 75B.

The STD-HDR conversion unit 74 converts the STD data supplied from the HEVC decoder 72 and the STD closed captions supplied from the parameter extraction unit 71 into the HDR data based on the tone mapping definition information for STD-HDR conversion supplied from the parameter extraction unit 71. The STD-HDR conversion unit 74 outputs the HDR data obtained by the converting to the HDR data output unit 75A.

When the HDR data is output to the display device 3, the HDR data output unit 75A of the output unit 75 outputs the HDR data supplied from the HEVC decoder 72 or the HDR data supplied from the STD-HDR conversion unit 74 together with the HDR information supplied from the parameter extraction unit 71.

When the STD data is output to the display device 3, the STD data output unit 75B outputs the STD data supplied from the HEVC decoder 72 or the STD data supplied from the HDR-STD conversion unit 73.

The data output from the HDR data output unit 75A and the STD data output unit 75B is transmitted to the display device 3 through the HDMI communication unit 58.

(Configuration Example of Display Device 3)

Figure 24:
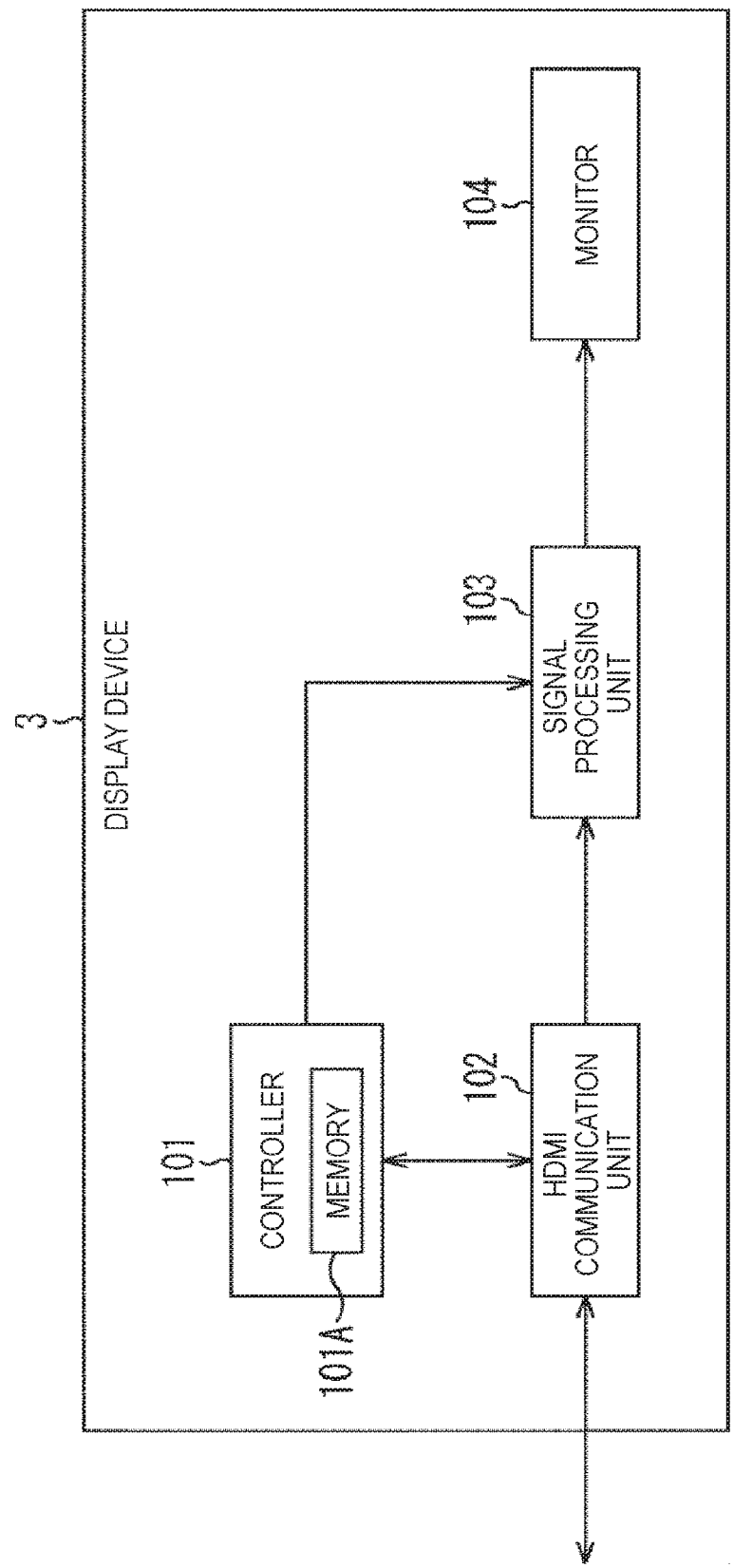
FIG. 24 is a block diagram illustrating a configuration example of a display device.

FIG. 24 is a block diagram illustrating a configuration example of the display device 3.

The display device 3 is configured to include a controller 101, an HDMI communication unit 102, a signal processing unit 103, and a monitor 104. The controller 101 includes a memory 101A.

The controller 101 is configured to include a CPU, a ROM, and a RAM. The controller 101 executes a predetermined program to control an operation of the entire display device 3.

For example, the controller 101 stores the EDID indicating the performance of the monitor 104 in the memory 101A, and manages the EDID. When authentication with the reproduction device 2 is performed, the controller 101 outputs the EDID stored in the memory 101A to the HDMI communication unit 102 so that the EDID is transmitted to the reproduction device 2. The reproduction device 2 specifies the performance of the monitor 104 of the display device 3 based on the EDID.

The HDMI communication unit 102 communicates with the reproduction device 2 via the HDMI cable 4. The HDMI communication unit 102 receives the HDR data and the HDR information or the STD data transmitted from the reproduction device 2, and outputs the HDR data and the HDR information or the STD data to the signal processing unit 103. The HDMI communication unit 102 transmits the EDID supplied from the controller 101 to the reproduction device 2.

The signal processing unit 103 causes a video of the HDR data to be displayed on the monitor 104 based on the HDR information supplied from the HDMI communication unit 102. The signal processing unit 103 causes a video of the STD data supplied from the HDMI communication unit 102 to be displayed on the monitor 104.

Here, operations of the respective devices having the above configurations will be described.

(Description of Recording Process)

First, a recording process of the recording device 1 will be described with reference to a flowchart of FIG. 25. The recording process of FIG. 25 starts when the master HDR data is input to the recording device 1.

In step S1, the controller 21 of the recording device 1 determines whether or not the recording mode is mode-i. The recording mode is set by, for example, an author.

When the recording mode is determined to be mode-i in step S1, in step S2, the encoding processing unit 22 performs the encoding process in mode-i. The video stream generated by the encoding process in mode-i is supplied to the disc drive 23.

On the other hand, when the recording mode is determined to be mode-ii in step S1, in step S3, the encoding processing unit 22 performs the encoding process in mode-ii. The video stream generated by the encoding process in mode-ii is supplied to the disc drive 23.

In step S4, the Data Base information generation unit 21A generates the Data Base information configured with PlayList including the number of tone_mapping_info and tone_map_id of the video supplied from the stream generation unit 35 and Clip Information including mode_flag. The Data Base information is supplied to the disc drive 23.

In step S5, the disc drive 23 records the file storing the video stream and the Data Base information on the optical disc 11. Thereafter, the process ends.

Next, the encoding process in mode-i performed in step S2 of FIG. 25 will be described with reference to a flowchart of FIG. 26.

In step S11, the HDR information generation unit 31 of the encoding processing unit 22 detects the luminance of the master HDR data and generates the HDR information.

In step S12, the HEVC encoder 32 encodes the master HDR video in accordance with the HEVC scheme to generate the encoded data of the HDR video.

In step S13, the HDR-STD conversion unit 33 converts the input master HDR data into the STD data. The definition information generation unit 34 is supplied with the information indicating the correspondence relation between the input data and the output data in which the RGB signals of the HDR data are set as the input data and the RGB signals of the STD data are set as the output data.

In step S14, the definition information generation unit 34 generates the tone mapping definition information for HDR-STD conversion based on the information supplied from the HDR-STD conversion unit 33.

In step S15, the stream generation unit 35 inserts tone_mapping_info including the HDR information and tone_mapping_info serving as the tone mapping definition information into the encoded data as the tone mapping information SEI message of the encoded data. The stream generation unit 35 inserts the master HDR closed captions and the number of tone_mapping_info and tone_map_id of the HDR closed captions into the encoded data as the user data unregistered SEI message of the encoded data. As a result, the video stream is generated.

The stream generation unit 35 supplies tone_mapping_info including the HDR information and the number of tone_mapping_info serving as the tone mapping definition information of the video and tone_map_id of tone_mapping_info thereof to the controller 21. Thereafter, the process returns to step S2 of FIG. 25, and the subsequent process is performed.

Next, the encoding process in mode-ii performed in step S3 of FIG. 25 will be described with reference to a flowchart of FIG. 27.

In step S21, the HDR information generation unit 31 of the encoding processing unit 22 detects the luminance of the master HDR data and generates the HDR information.

In step S22, the HDR-STD conversion unit 33 converts the input master HDR data into the STD data. The definition information generation unit 34 is supplied with the information indicating the correspondence relation between the input data and the output data in which the RGB signals of the HDR data are set as the input data and the RGB signals of the STD data are set as the output data.

In step S23, the definition information generation unit 34 generates the tone mapping definition information for STD-HDR conversion based on the information supplied from the HDR-STD conversion unit 33.

In step S24, the HEVC encoder 32 encodes the STD video obtained by converting the master HDR video in accordance with the HEVC scheme to generate the encoded data of the STD video.

In step S25, the stream generation unit 35 inserts tone_mapping_info including the HDR information and tone_mapping_info serving as the tone mapping definition information as the tone mapping information SEI message of the encoded data. The stream generation unit 35 inserts the STD closed captions and the number of tone_mapping_info and tone_map_id of the STD closed captions into the encoded data as the user data unregistered SEI message of the encoded data. As a result, the video stream is generated. Thereafter, the process returns to step S3 of FIG. 25, and the subsequent process is performed.

(Description of Reproduction Process)

Next, the reproduction process of the reproduction device 2 will be described with reference to a flowchart of FIG. 28.

At a predetermined timing, for example, before reproduction of the optical disc 11 starts, the controller 51 of the reproduction device 2 controls the HDMI communication unit 58, communicates with the display device 3, and reads the EDID from the memory 101A of the display device 3. The controller 51 stores the EDID in the register 53A and manages the EDID.

In step S41, the controller 51 controls the disc drive 52 such that PlayList and Clip Information serving as the Data Base information are read from the optical disc 11. The controller 51 specifies a video stream to be reproduced based on information included in PlayList, and reads the specified video stream from the optical disc 11 by controlling the disc drive 52.

In step S42, the controller 51 refers to mode_flag included in Clip Information.

In step S43, the controller 51 determines whether the recording mode is mode-i based on the value of mode_flag.

When it is determined in step S43 that the recording mode is mode-i, the decoding processing unit 56 performs the decoding process of mode-i in step S44.

On the other hand, when it is determined in step S43 that the recording mode is mode-ii, the decoding processing unit 56 performs the decoding process of mode-ii in step S45.

In step S44 or step S45, the decoding process is performed, and then the process ends.

Next, the decoding process in mode-i performed in step S44 of FIG. 28 will be described with reference to a flowchart of FIG. 29.

In step S61, the parameter extraction unit 71 of the decoding processing unit extracts tone_mapping_info, the HDR closed captions, and tone_mapping_info_ref of the HDR closed captions from the SEI of the video stream. The parameter extraction unit 71 supplies the HDR closed captions to the HDR-STD conversion unit 73 and the HDR data output unit 75A. The parameter extraction unit 71 extracts the encoded data of the HDR video from the video stream, and supplies the encoded data of the HDR video to the HEVC decoder 72.

In step S62, the HEVC decoder 72 decodes the encoded data of the HDR video supplied from the parameter extraction unit 71 according to the HEVC scheme, and generates the HDR video. The HEVC decoder 72 supplies the HDR video to the HDR-STD conversion unit 73 and the HDR data output unit 75A.

In step S63, the controller 51 determines whether or not the monitor with which the display device 3 is equipped is the HDR monitor based on the EDID stored in the register 53A. When the monitor with which the display device 3 is equipped is determined to be the HDR monitor in step S63, the process proceeds to step S64.

In step S64, the parameter extraction unit 71 selects tone_mapping_info including the HDR information in which tone_mapping_info_ref of the video described in PlayList supplied from the controller 51 is included as tone_map_id from tone_mapping_info extracted from the SEI. The parameter extraction unit 71 selects tone_mapping_info including the HDR information in which tone_mapping_info_ref of the HDR closed captions extracted from the SEI is included as tone_map_id from tone_mapping_info extracted from the SEI. The parameter extraction unit 71 supplies the HDR information included in selected tone_mapping_info to the HDR data output unit 75A.

In step S65, the HDR data output unit 75A outputs the HDR data supplied from the HEVC decoder 72 together with the HDR information supplied from the parameter extraction unit 71.

On the other hand, when the monitor with which the display device 3 is equipped is determined to be the STD monitor rather than the HDR monitor in step S63, the process proceeds to step S66.

In step S66, the parameter extraction unit 71 selects tone_mapping_info serving as the tone mapping definition information for HDR-STD conversion including tone_mapping_info_ref of the video described in PlayList supplied from the controller 51 as tone_map_id from extracted tone_mapping_info. The parameter extraction unit 71 selects tone_mapping_info serving as the tone mapping definition information for HDR-STD conversion including tone_mapping_info_ref of the closed captions extracted from the SEI as tone_map_id from extracted tone_mapping_info. The parameter extraction unit 71 supplies the tone mapping definition information serving as selected tone_mapping_info for HDR-STD conversion to the HDR-STD conversion unit 73.

In step S67, the HDR-STD conversion unit 73 converts the HDR data into the STD data based on the tone mapping definition information for HDR-STD conversion supplied from the parameter extraction unit 71. The HDR-STD conversion unit 73 supplies the STD data to the HDR data output unit 75A.

In step S68, the STD data output unit 75B outputs the STD data supplied from the HDR-STD conversion unit 73.

After the HDR data is output in step S65 or after the STD data is output in step S68, in step S69, the controller 51 determines whether or not the reproduction ends.

When the reproduction is determined not to end in step S69, the controller 51 returns to step S61 and executes the above-described process repeatedly. When the reproduction is determined to end in step S69, the process returns to step S44 of FIG. 28, and the process ends.

Next, the decoding process in mode-ii performed in step S45 of FIG. 28 will be described with reference to a flowchart of FIG. 30.

In step S81, the parameter extraction unit 71 of the decoding processing unit 56 extracts tone_mapping_info, the STD closed captions, and tone_mapping_info_ref of the STD closed captions from the SEI of the video stream. The parameter extraction unit 71 supplies the STD closed captions to the STD-HDR conversion unit 74 and the STD data output unit 75B. The parameter extraction unit 71 extracts the encoded data of the STD video from the video stream, and supplies the encoded data of the STD video to the HEVC decoder 72.

In step S82, the HEVC decoder 72 decodes the encoded data of the STD video supplied from the parameter extraction unit 71 according to the HEVC scheme, and generates the STD video. The HEVC decoder 72 supplies the STD video to the STD-HDR conversion unit 74 and the STD data output unit 75B.

In step S83, the controller 51 determines whether or not the monitor with which the display device 3 is equipped is the HDR monitor based on the EDID stored in the register 53A.

When the monitor with which the display device 3 is equipped is determined to be the HDR monitor in step S83, the process proceeds to step S84.

In step S84, the parameter extraction unit 71 selects tone_mapping_info including tone_mapping_info_ref of the video described in PlayList supplied from the controller 51 as tone_map_id from tone_mapping_info extracted from the SEI. As a result, tone_mapping_info including the HDR information of the video and tone_mapping_info serving as the tone mapping definition information for STD-HDR conversion are selected.

The parameter extraction unit 71 selects tone_mapping_info including tone_mapping_info_ref of the closed captions extracted from the SEI as tone_map_id from tone_mapping_info extracted from the SEI. As a result, tone_mapping_info including the HDR information of the closed captions and tone_mapping_info serving as the tone mapping definition information for STD-HDR conversion are selected. The parameter extraction unit 71 supplies the HDR information included in selected tone_mapping_info to the HDR data output unit 75A, and supplies the tone mapping definition information serving as selected tone_mapping_info for STD-HDR conversion to the STD-HDR conversion unit 74.

In step S85, the STD-HDR conversion unit 74 converts the STD data into the HDR data based on the tone mapping definition information for STD-HDR conversion supplied from the parameter extraction unit 71, and supplies the HDR data to the HDR data output unit 75A.

In step S86, the HDR data output unit 75A outputs the HDR data supplied from the STD-HDR conversion unit 74 together with the HDR information supplied from the parameter extraction unit 71.

On the other hand, when the monitor with which the display device 3 is equipped is determined to be the STD monitor in step S83, the process proceeds to step S87. In step S87, the STD data output unit 75B outputs the STD video supplied from the HEVC decoder 72 and the STD closed captions supplied from the parameter extraction unit 71.

After the HDR data is output in step S86 or after the STD data is output in step S87, in step S88, the controller 51 determines whether or not the reproduction ends.

When the reproduction is determined not to end in step S88, the controller 51 returns to step S81 and executes the above-described process repeatedly. When the reproduction is determined to end in step S88, the process returns to step S45 of FIG. 28, and the process ends.

(Description of Display Process)

Figure 31:
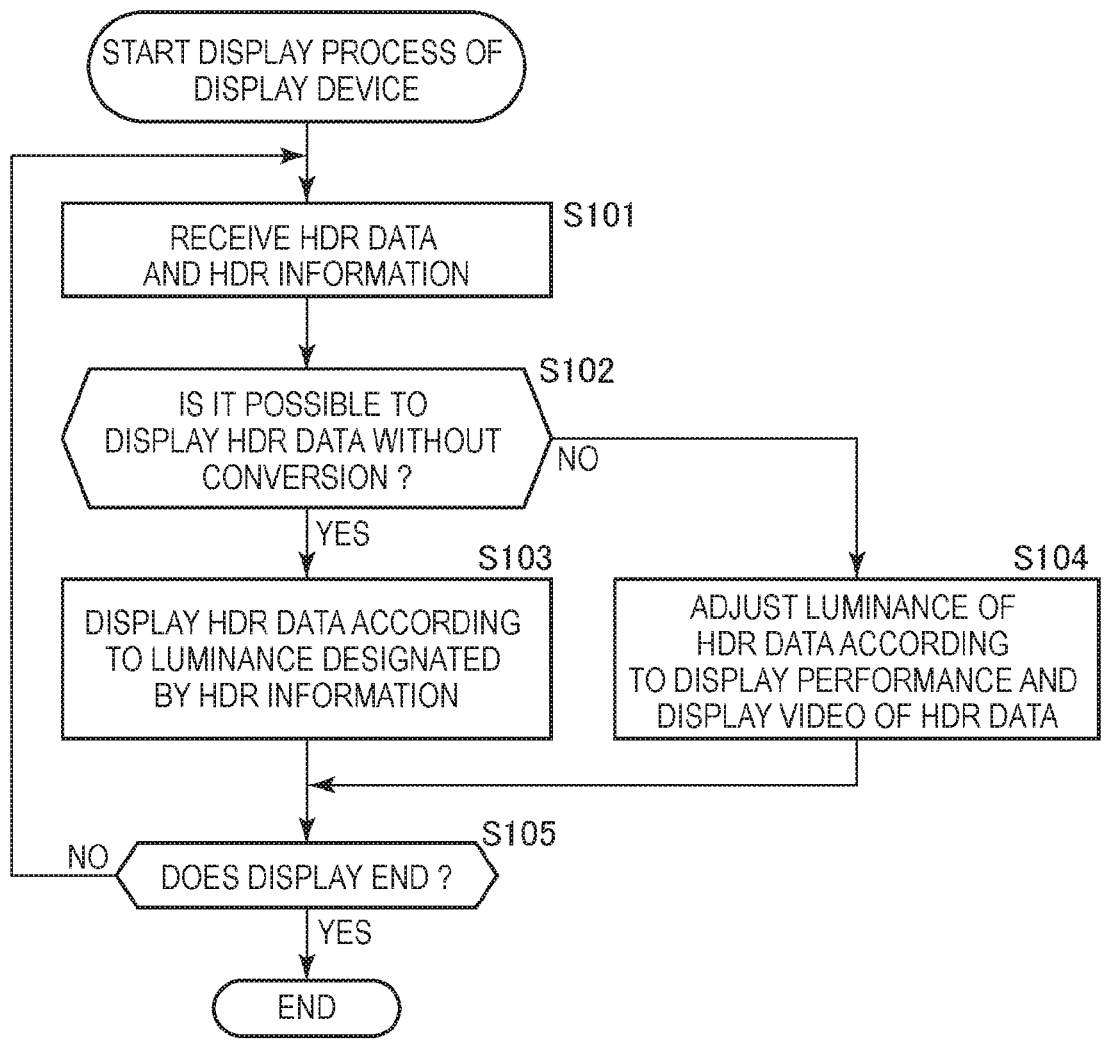
FIG. 31 is a flowchart for describing a display process of the display device in FIG. 24.

Next, the display process of the display device 3 will be described with reference to a flowchart of FIG. 31.

Here, a case in which the monitor 104 included in the display device 3 is the HDR monitor will be described. The HDR data to which the HDR information is added is transmitted from the reproduction device 2 to the display device 3 including the HDR monitor.

In step S101, the HDMI communication unit 102 of the display device 3 receives the HDR data and the HDR information transmitted from the reproduction device 2.

In step S102, referring to the HDR information, the controller 101 determines whether the HDR data transmitted from the reproduction device 2 can be displayed without conversion. The HDR information includes the information indicating the luminance feature of the master HDR data, that is, the HDR data transmitted from the reproduction device 2. The determination of step S102 is performed by comparing the luminance feature of the HDR data specified by the HDR information to the display performance of the monitor 104.

For example, when the dynamic range of the HDR data specified by the HDR information is a range of 0% to 400% and the dynamic range of the monitor 104 is a range of 0% to 500% (for example, 500 cd/m$^2$ when the brightness of 100% is assumed to be 100 cd/m$^2$), it is determined that the HDR data can be displayed without conversion. On the other hand, when the dynamic range of the HDR data specified by the HDR information is a range of 0% to 400% and the dynamic range of the monitor 104 is a range of 0% to 300%, it is determined that the HDR data cannot be displayed without conversion.

When it is determined in step S102 that the HDR data can be displayed without conversion, the signal processing unit 103 allows the monitor 104 to display the video of the HDR data according to the luminance designated by the HDR information in step S103. For example, when the luminance feature indicated by the curved line L12 in FIG. 12 is designated by the HDR information, each luminance value indicates the brightness in the range of 0% to 400% indicated by the curved line L12.

Conversely, when it is determined in step S102 that the HDR data cannot be displayed without conversion, the signal processing unit 103 adjusts the luminance according to the display performance of the monitor 104 and displays the video of the HDR data with the adjusted luminance in step S104. For example, when the luminance feature indicated by the curved line L12 in FIG. 12 is designated by the HDR information and the dynamic range of the monitor 104 is in the range of 0% to 300%, each luminance value is compressed so that the brightness of the range of 0% to 300% is indicated.

After the video of the HDR data is displayed in step S103 or step S104, the controller 101 determines in step S105 whether the display ends. When it is determined that the display does not end, the processes subsequent to step S101 are repeated. When it is determined in step S105 that the display ends, the controller 101 ends the process.

Through the series of processes described above, the recording device 1 can record the master HDR data on the optical disc 11 in the form of the HDR data without change, cause the reproduction device 2 to reproduce the master HDR data, and cause the video of the HDR data to be displayed on the display device 3. Since the recording device 1 records the tone mapping definition information for HDR-STD conversion on the optical disc 11 together with the HDR data, the reproduction device 2 can convert the HDR data into the STD data based on the tone mapping definition information for HDR-STD conversion and cause the video of the STD data to be displayed on the display device 3 configured to display only the STD data.

Further, the recording device 1 converts the master HDR data into the STD data, records the STD data on the optical disc 11, and records the tone mapping definition information for STD-HDR conversion on the optical disc 11, and thus the recording device 1 can cause the reproduction device 2 to restore the HDR data and cause the video of the HDR data to be displayed on the display device 3.

The luminance feature of the master HDR data can be set to be designated by the HDR information when the HDR data is reproduced. Thus, a content author can display the video of the HDR data with the intended luminance.

The recording device 1 describes tone_map_id identifying tone_mapping_info of the closed captions in the user data unregistered SEI message together with the closed captions. Thus, the reproduction device 2 can specify tone_mapping_info of the closed captions in tone_mapping_info arranged in the tone mapping information SEI message based on tone_map_id.

Second Embodiment (Configuration Example of AV Stream)

Figure 32:
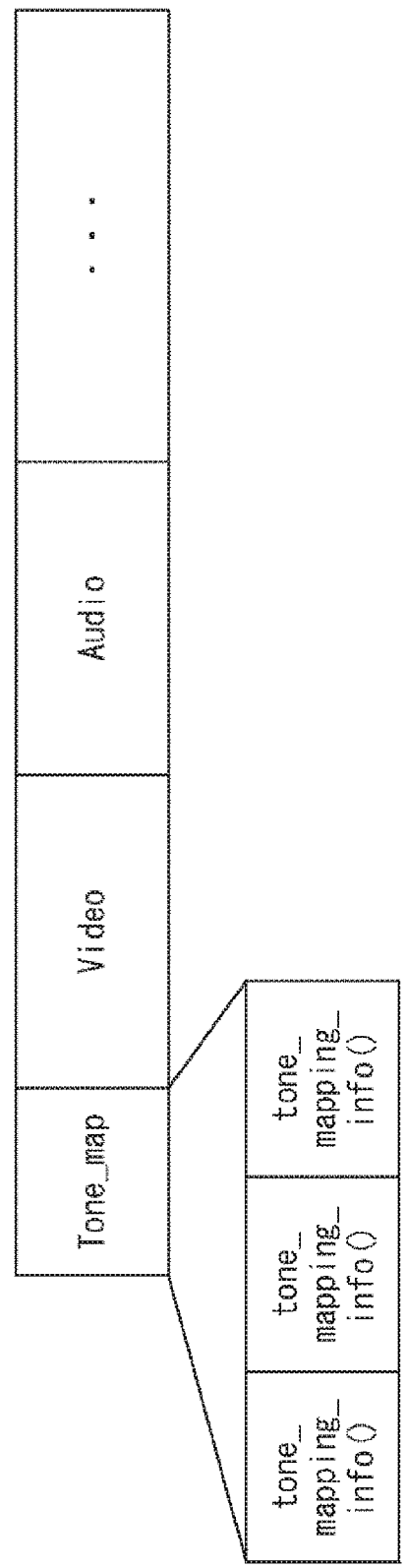
FIG. 32 is a diagram illustrating a configuration example of an AV stream in a second embodiment of the recording and reproduction system to which the present technology is applied.

FIG. 32 is a diagram illustrating a configuration example of an AV stream in a second embodiment of the recording and reproduction system to which the present technology is applied.

As illustrated in FIG. 32, in the second embodiment, tone_mapping_info is not included in a video stream but is included in an AV stream that is a stream other than a video stream. In other words, a video stream of a main video, an audio stream reproduced in synchronization with the video stream, and a stream of tone_mapping_info are multiplexed in the AV stream of the second embodiment.

One or more of tone_mapping_info are included in a Tone_map stream serving as a stream of tone_mapping_info. tone_mapping_info included in the Tone_map stream is used when the video stream multiplexed into the Tone_map stream is reproduced.

(Syntax of Tone_Map Stream)

FIG. 33 is a diagram illustrating a syntax of the Tone_map stream.

As illustrated in a 4th line of FIG. 33, number_of_tone_mapping_info indicating the number of tone_mapping_info included in the Tone_map stream is described in the Tone_map stream. As illustrated in 6th to 9th lines, one or more of tone_mapping_info are described in the Tone_map stream. A syntax of tone_mapping_info is the same as that illustrated in FIG. 7.

A syntax of STN_table of a PlayList file in the second embodiment is the same as the syntax of STN_table of FIG. 17.

(Configuration Example of Encoding Processing Unit 22)

Figure 34:
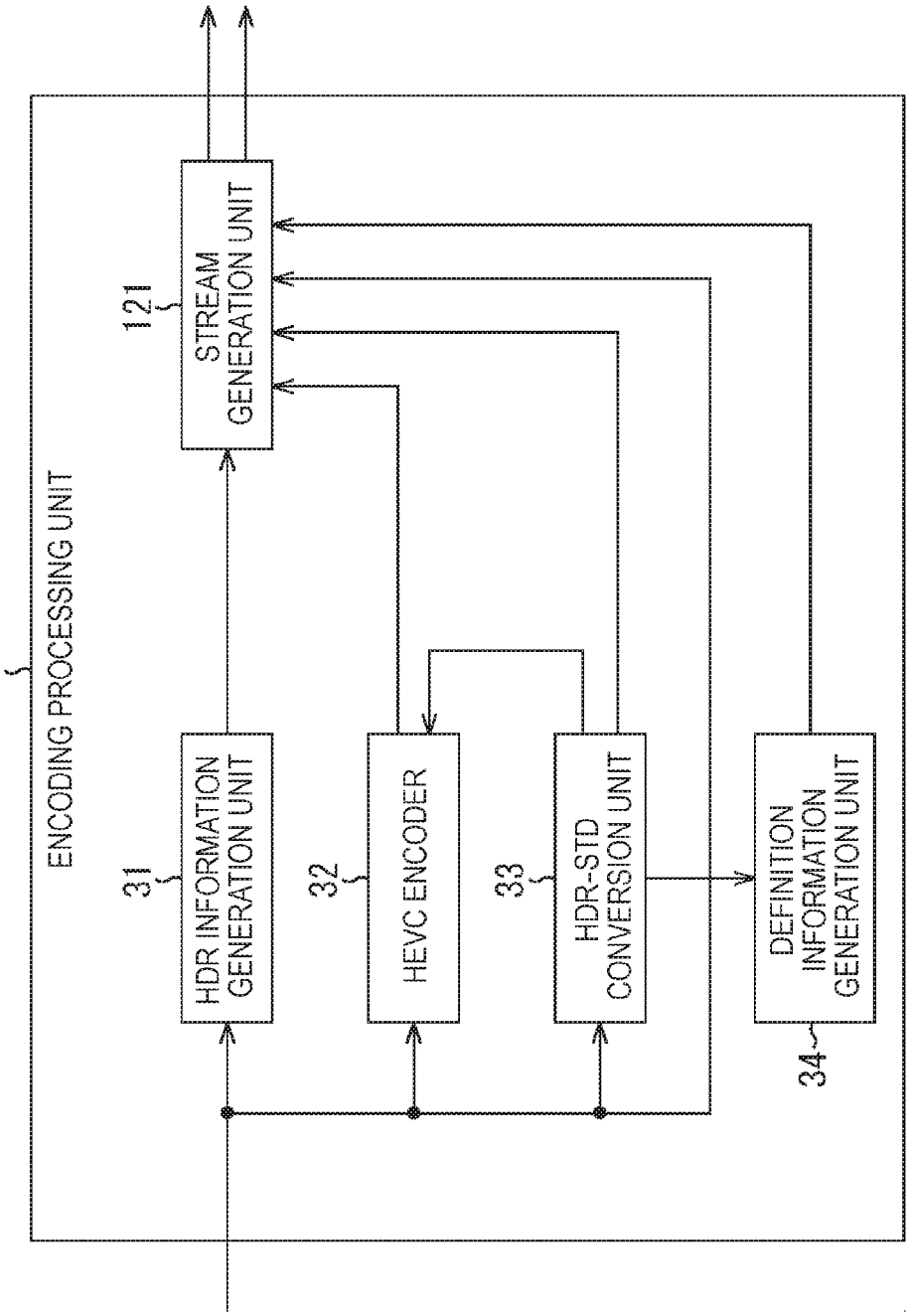
FIG. 34 is a diagram illustrating a configuration example of an encoding processing unit in the second embodiment of the recording and reproduction system to which the present technology is applied.

FIG. 34 is a diagram illustrating a configuration example of the encoding processing unit 22 of the recording device 1 in the second embodiment of the recording and reproduction system to which the present technology is applied.

Among components illustrated in FIG. 34, the same components as the components of FIG. 19 are denoted by the same reference numerals. Duplicate description will appropriately be omitted.

A configuration of the encoding processing unit 22 of FIG. 34 differs from the configuration of FIG. 19 in that a stream generation unit 121 is arranged instead of the stream generation unit 35.

The stream generation unit 121 supplies tone_mapping_info including the HDR information of the video supplied from the HDR information generation unit 31 and the number of tone_mapping_info serving as the tone mapping definition information of the video supplied from the definition information generation unit 34 to the controller 21. The stream generation unit 121 supplies tone_map_id of tone_mapping_info to the controller 21.

The Data Base information generation unit 21A describes the number of tone_mapping_info of the video as number_of_tone_mapping_info_ref of the video of the main video of STN_table (FIG. 17) of the PlayList file. The Data Base information generation unit 21A describes tone_map_id of the video stream as tone_mapping_info_ref of the video of STN_table.

The stream generation unit 121 generates the Tone_map stream including tone_mapping_info of the video and the closed captions. The stream generation unit 121 generates the video stream by inserting either of the HDR closed captions and the STD closed captions and the number of corresponding tone_mapping_info and tone_map_id into the encoded data supplied from the HEVC encoder 32 as the user data unregistered SEI message. The stream generation unit 121 outputs the generated Tone_map stream and the video stream to the disc drive 23.

As a result, a stream file storing the Tone_map stream and the video stream is recorded on the optical disc 11 according to the directory structure of FIG. 16.

(Configuration Example of Decoding Processing Unit 56)

Figure 35:
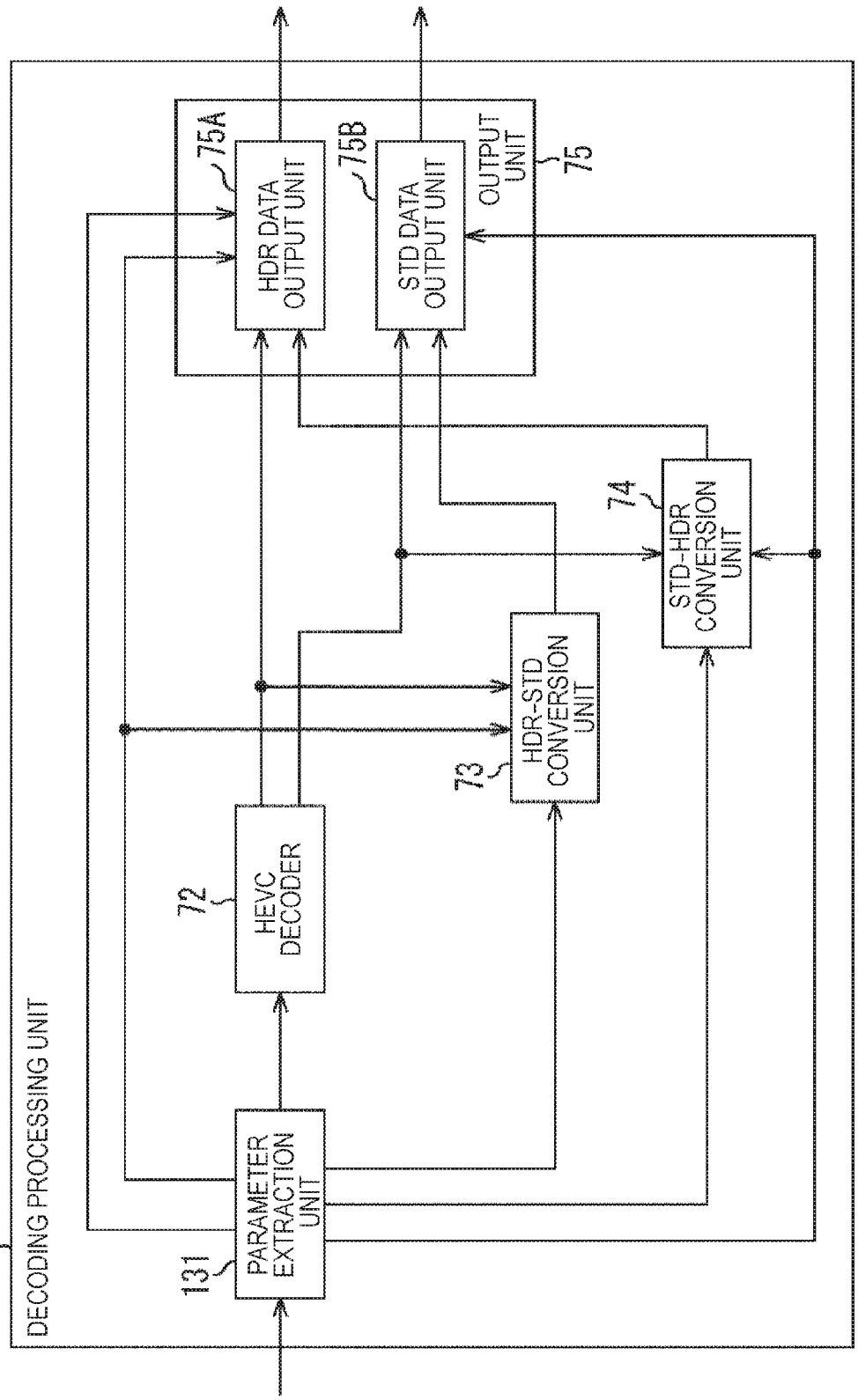
FIG. 35 is a block diagram illustrating a configuration example of a decoding processing unit of a second embodiment of a recording and reproduction system to which the present technology is applied.

FIG. 35 is a diagram illustrating a configuration example of the decoding processing unit 56 of the reproduction device 2 in the second embodiment of the recording and reproduction system to which the present technology is applied.

Among components illustrated in FIG. 35, the same components as the components of FIG. 23 are denoted by the same reference numerals. Duplicate description will appropriately be omitted.

A configuration of the decoding processing unit 56 of FIG. 35 differs from the configuration of FIG. 23 in that a parameter extraction unit 131 is arranged instead of the parameter extraction unit 71.

The Tone_map stream and the video stream read from the disc drive 52 are supplied to the parameter extraction unit 131. The parameter extraction unit 131 extracts the HDR information and the tone mapping definition information from the Tone_map stream. The parameter extraction unit 131 extracts either of the HDR closed captions and the STD closed captions and tone_mapping_info_ref of the closed captions from the user data unregistered SEI message of the video stream.

When the recording mode is mode-i and the HDR data is output to the display device 3, the parameter extraction unit 131 outputs the HDR information included in tone_mapping_info specified by tone_mapping_info_ref of the video and the closed captions to the HDR data output unit 75A. Further, when the recording mode is mode-i, and the STD data is output to the display device 3, the parameter extraction unit 131 outputs the tone mapping definition information for HDR-STD conversion specified by tone_mapping_info_ref of the video and the closed captions to the HDR-STD conversion unit 73.

On the other hand, when the recording mode is mode-ii and the HDR data is output to the display device 3, the parameter extraction unit 131 outputs the HDR information included in tone_mapping_info specified by tone_mapping_info_ref of the video and the closed captions to the HDR data output unit 75A. In this case, the parameter extraction unit 131 outputs the tone mapping definition information for STD-HDR conversion specified by tone_mapping_info_ref of the video and the closed captions to the STD-HDR conversion unit 74. When the recording mode is mode-ii, and the STD data is output to the display device 3, the extracted HDR information and the tone mapping definition information are not used.

The parameter extraction unit 131 outputs the encoded data included in the video stream to the HEVC decoder 72. The parameter extraction unit 131 supplies the HDR closed captions to the HDR-STD conversion unit 73 and the HDR data output unit 75A. The parameter extraction unit 131 supplies the STD closed captions to the STD-HDR conversion unit 74 and the STD data output unit 75B.

(Description of Recording Process)

Figure 36:
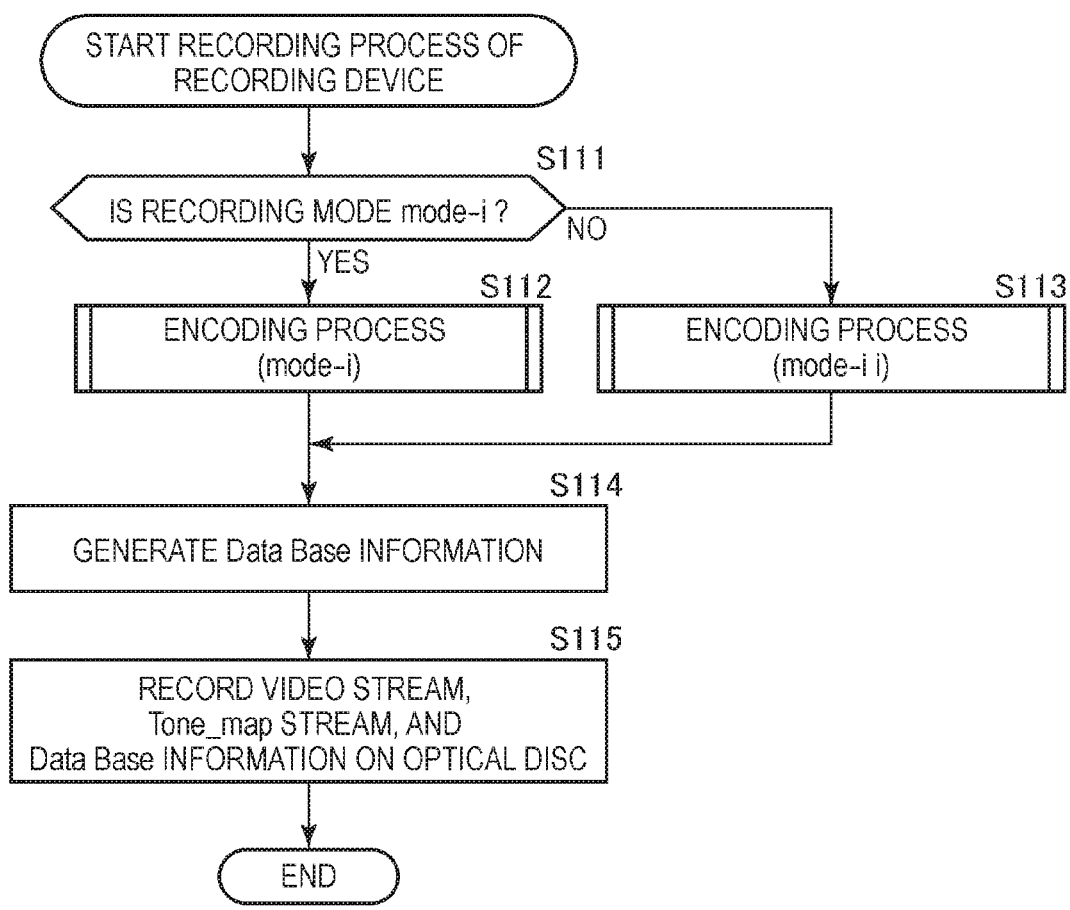
FIG. 36 is a flowchart for describing a recording process according to the second embodiment of the recording device.

FIG. 36 is a flowchart for describing a recording process performed by the recording device 1 of the second embodiment. The recording process of FIG. 36 starts when the master HDR data is input to the recording device 1.

Figure 25:
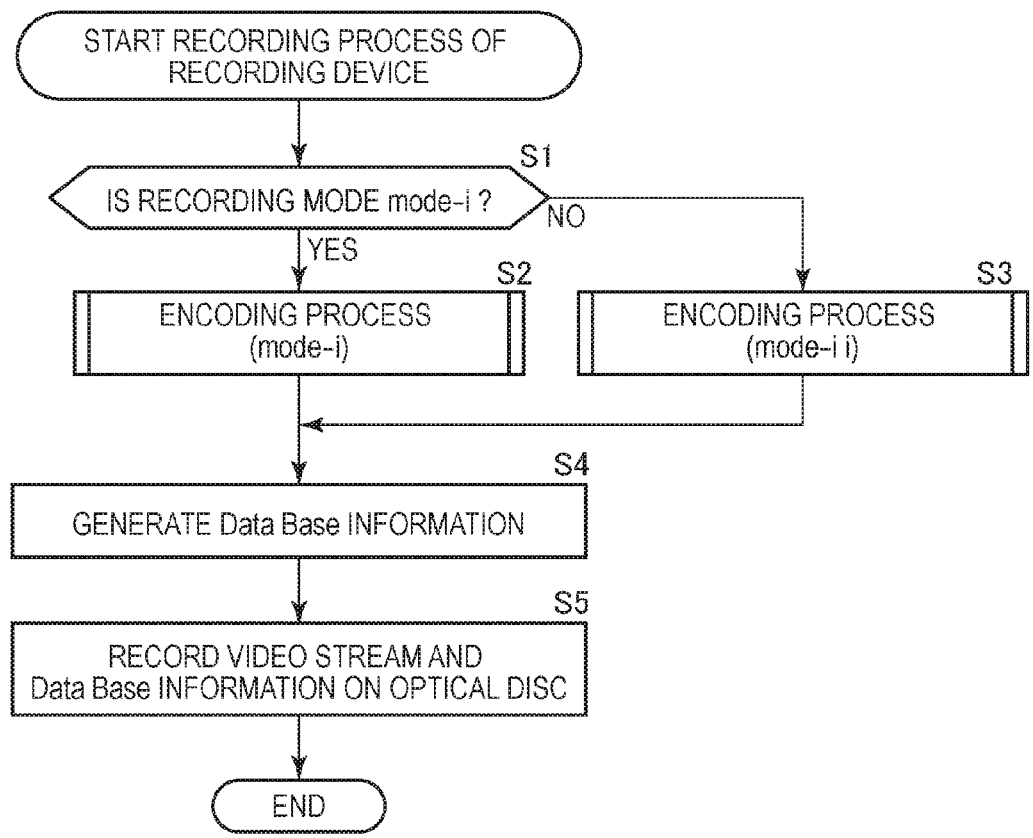
FIG. 25 is a flowchart for describing a recording process of the recording device in FIG. 18.

In step S111, the controller 21 of the recording device 1 determines whether or not the recording mode is mode-i, similarly to the process of step S1 of FIG. 25.

When the recording mode is determined to be mode-i in step S111, in step S112, the encoding processing unit 22 performs the encoding process in mode-i. The video stream and the Tone_map stream generated by the encoding process in mode-i are supplied to the disc drive 23.

On the other hand, when the recording mode is determined to be mode-ii in step S111, in step S113, the encoding processing unit 22 performs the encoding process in mode-ii. The video stream and the Tone_map stream generated in the encoding process in mode-ii are supplied to the disc drive 23.

In step S114, the Data Base information generation unit 21A generates Data Base information configured with PlayList including the number of tone_mapping_info of the video and tone_map_id supplied from the stream generation unit 35 and Clip Information including mode_flag. The Data Base information is supplied to the disc drive 23.

In step S115, the disc drive 23 records a file storing the video stream, the Tone_map stream, and the Data Base information on the optical disc 11. Thereafter, the process ends.

Figure 37:
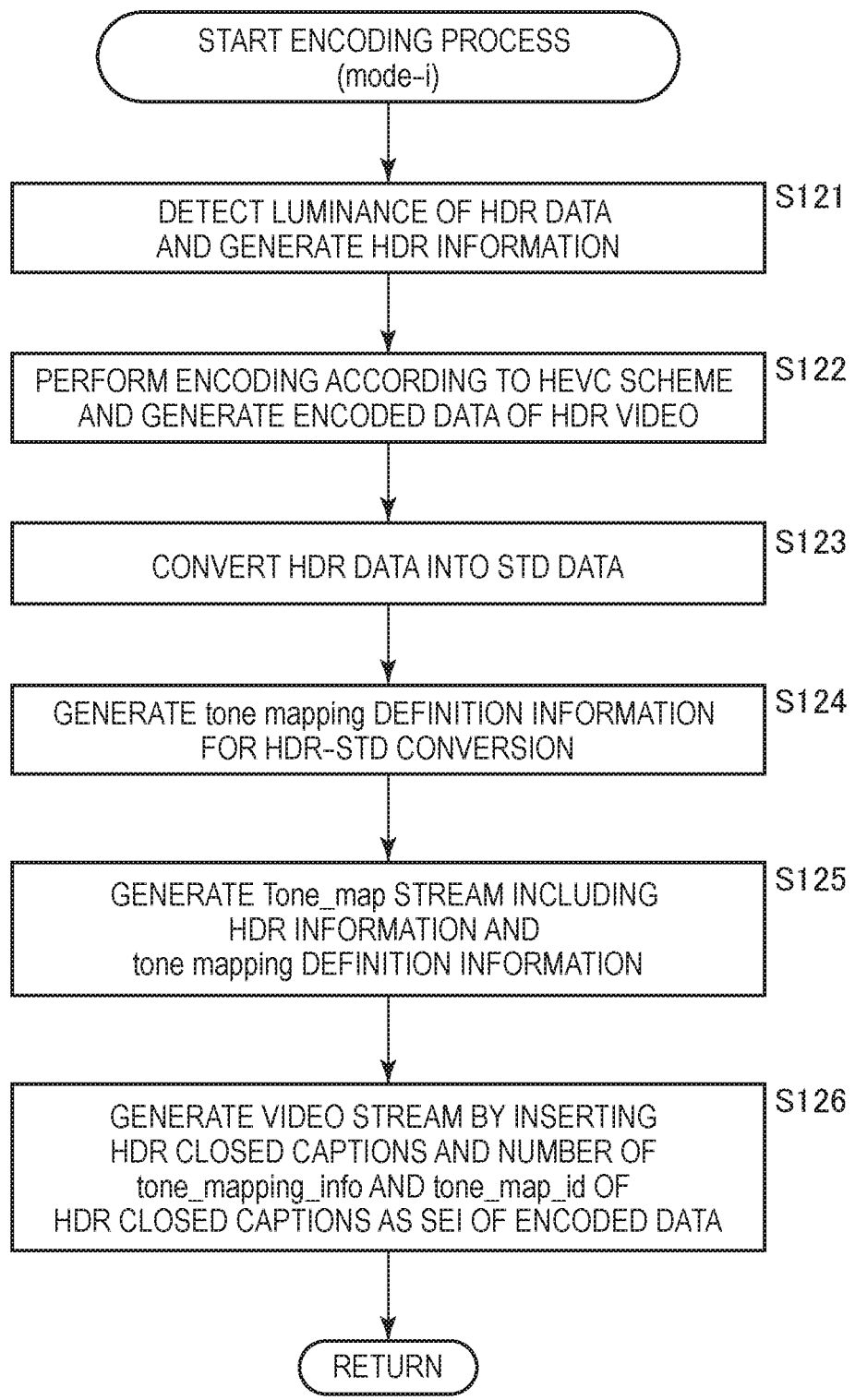
FIG. 37 is a flowchart for describing an encoding process of mode-i in FIG. 36.

FIG. 37 is a flowchart for describing the encoding process in mode-i performed in step S112 of FIG. 36.

Figure 26:
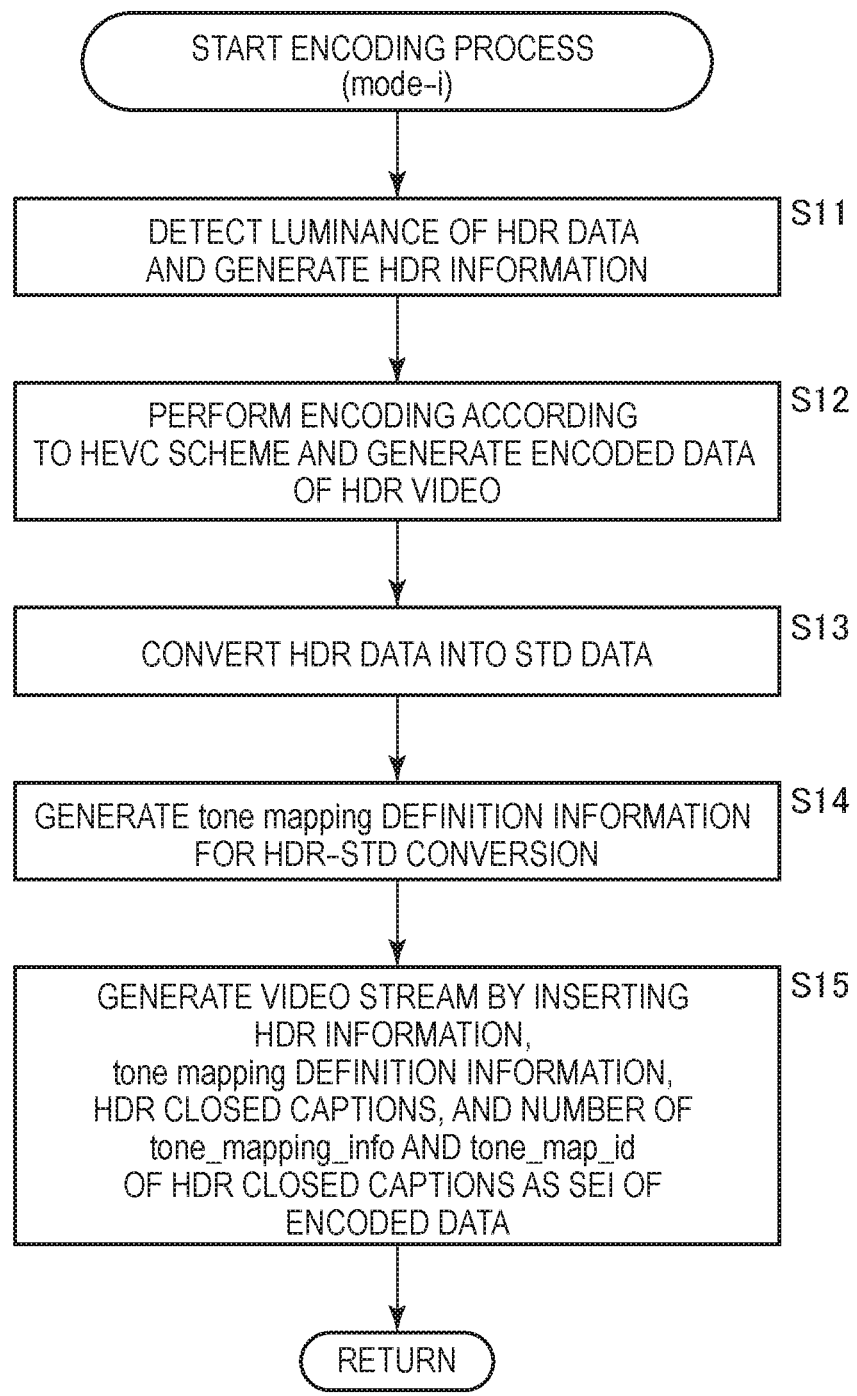
FIG. 26 is a flowchart for describing an encoding process of mode-i in FIG. 25.

A process of steps S121 to S124 of FIG. 37 is the same as the process of steps S11 to S14 of FIG. 26, and a description thereof is omitted.

In step S125, the stream generation unit 121 generates the Tone_map stream including tone_mapping_info including the HDR information generated by the HDR information generation unit 31 and tone_mapping_info serving as the tone mapping definition information for HDR-STD conversion generated by the definition information generation unit 34.

The stream generation unit 121 supplies tone_mapping_info including the HDR information of the video, the number of tone_mapping_info serving as the tone mapping definition information for HDR-STD conversion, and tone_map_id of tone_mapping_info thereof to the controller 21.

In step S126, the stream generation unit 121 generates the video stream by inserting the HDR closed captions and the number of tone_mapping_info and tone_map_id of the HDR closed captions into the encoded data as the user data unregistered SEI message of the encoded data. Thereafter, the process returns to step S112 of FIG. 36, and the subsequent process is performed.

Figure 38:
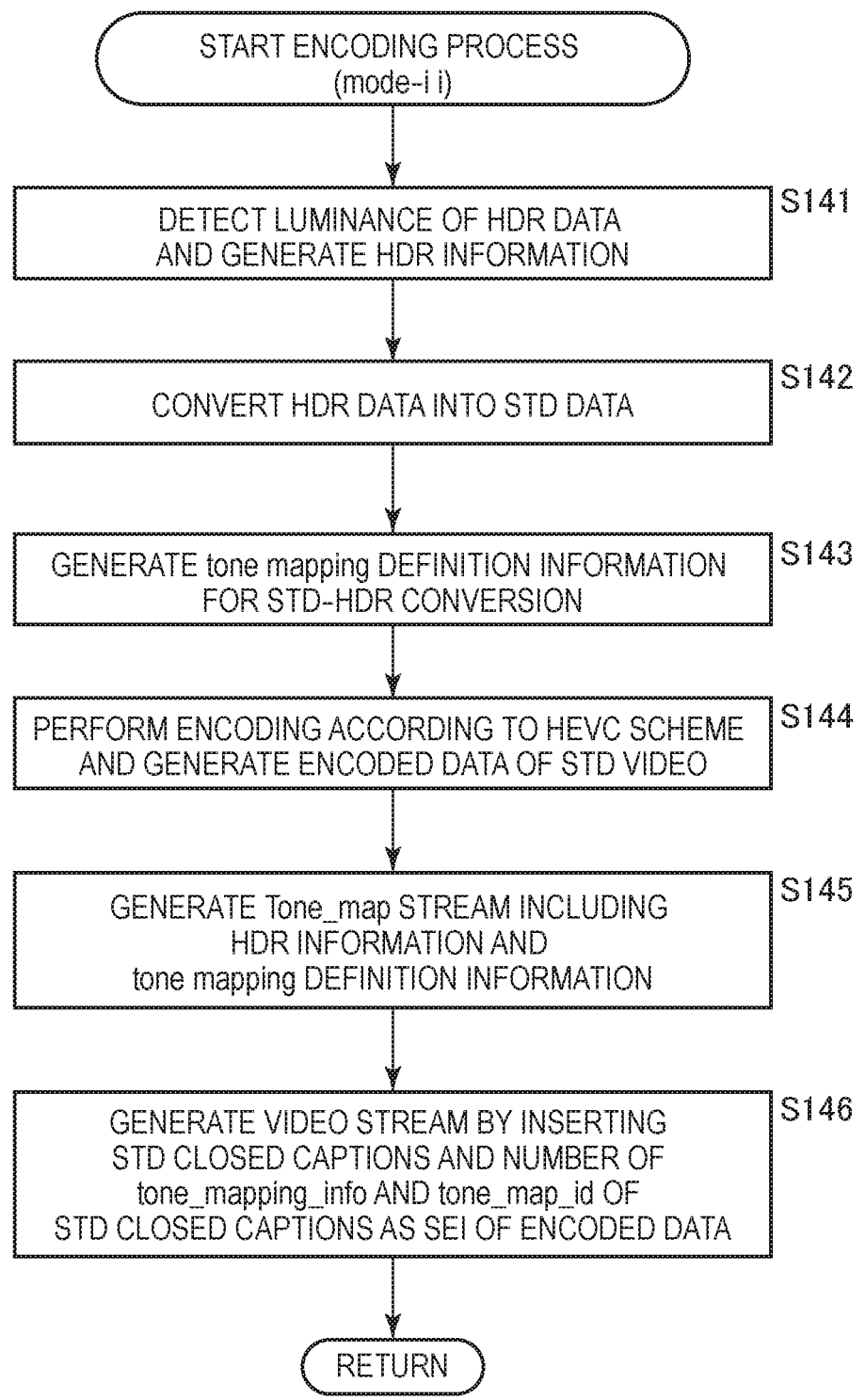
FIG. 38 is a flowchart for describing an encoding process of mode-ii in FIG. 36.

FIG. 38 is a flowchart for describing the encoding process in mode-ii performed in step S113 of FIG. 36.

Figure 27:
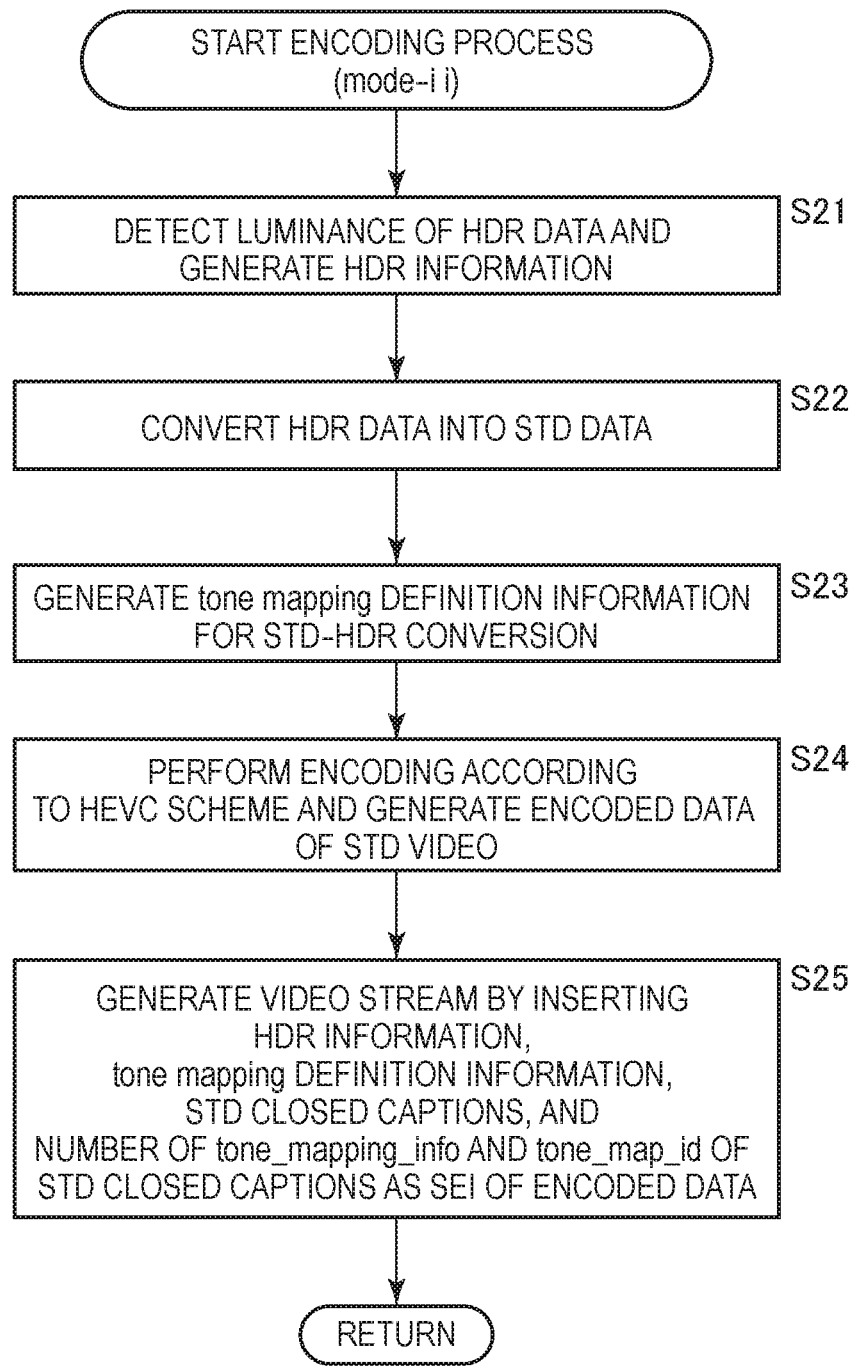
FIG. 27 is a flowchart for describing an encoding process of mode-ii in FIG. 25.

The process of steps S141 to S144 of FIG. 38 is the same as the process of steps S21 to S24 of FIG. 27, and a description thereof is omitted.

In step S145, the stream generation unit 121 generates the Tone_map stream including tone_mapping_info including the HDR information generated by the HDR information generation unit 31 and tone_mapping_info serving as the tone mapping definition information for STD-HDR conversion generated by the definition information generation unit 34.

The stream generation unit 121 supplies tone_mapping_info including the HDR information of the video, the number of tone_mapping_info serving as the tone mapping definition information for STD-HDR conversion, and tone_map_id of tone_mapping_info thereof to the controller 21.

In step S146, the stream generation unit 121 generates the video stream by inserting the STD closed captions and the number of tone_mapping_info and tone_map_id of the STD closed captions into the encoded data as the user data unregistered SEI message of the encoded data. Thereafter, the process returns to step S112 of FIG. 36, and the subsequent process is performed.

(Description of Reproduction Process)

Figure 39:
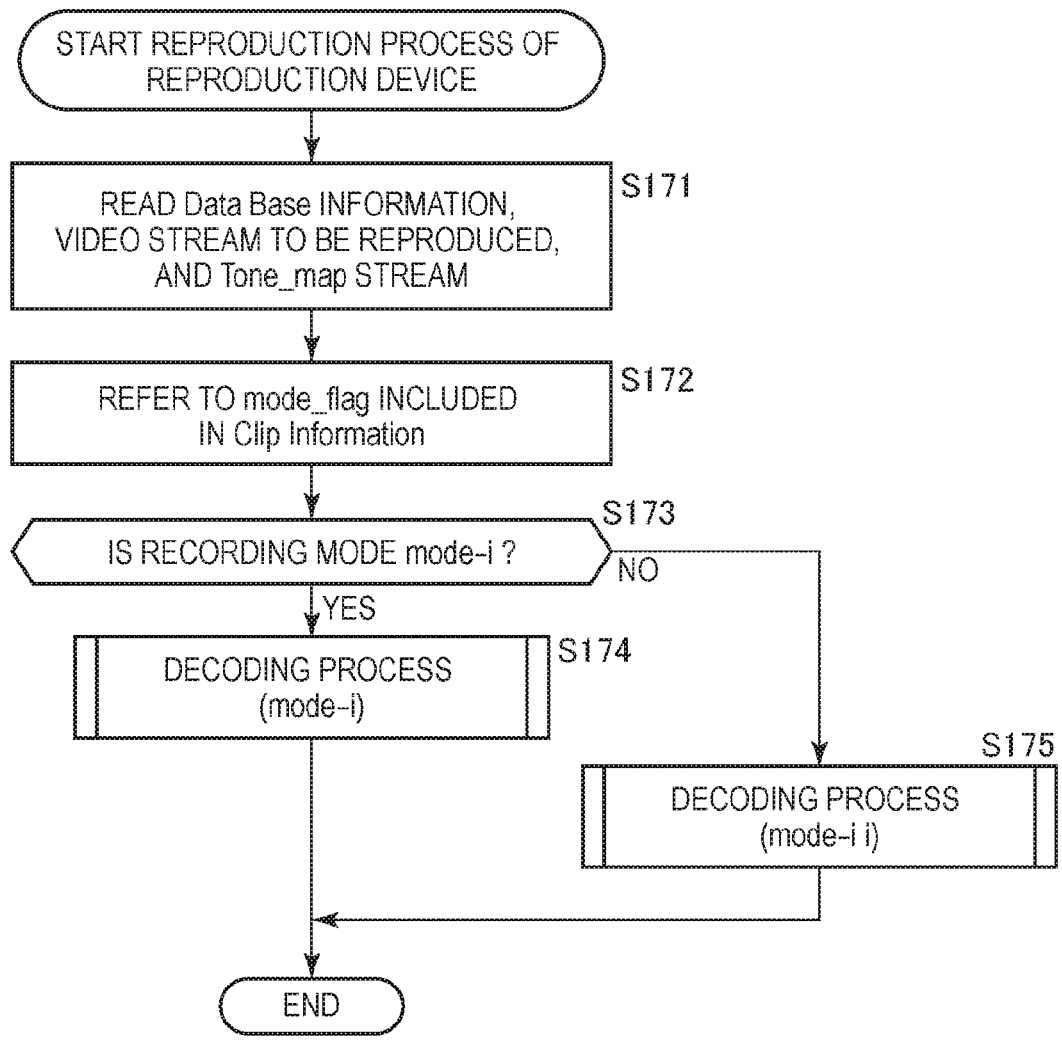
FIG. 39 is a flowchart for describing a reproduction process according to the second embodiment of the reproduction device.

FIG. 39 is a flowchart for the reproduction process performed by the reproduction device 2 of the second embodiment.

At a predetermined timing, for example, before reproduction of the optical disc 11 starts, the controller 51 of the reproduction device 2 controls the HDMI communication unit 58, communicates with the display device 3, and reads the EDID from the memory 101A of the display device 3. The controller 51 stores the EDID in the register 53A and manages the EDID.

In step S171, the controller 51 controls the disc drive 52 such that PlayList and Clip Information serving as the Data Base information are read from the optical disc 11. The controller 51 specifies a video stream to be reproduced and the Tone_map stream based on information included in PlayList. The controller 51 reads the specified video stream and the Tone_map stream from the optical disc 11 by controlling the disc drive 52.

Figure 28:
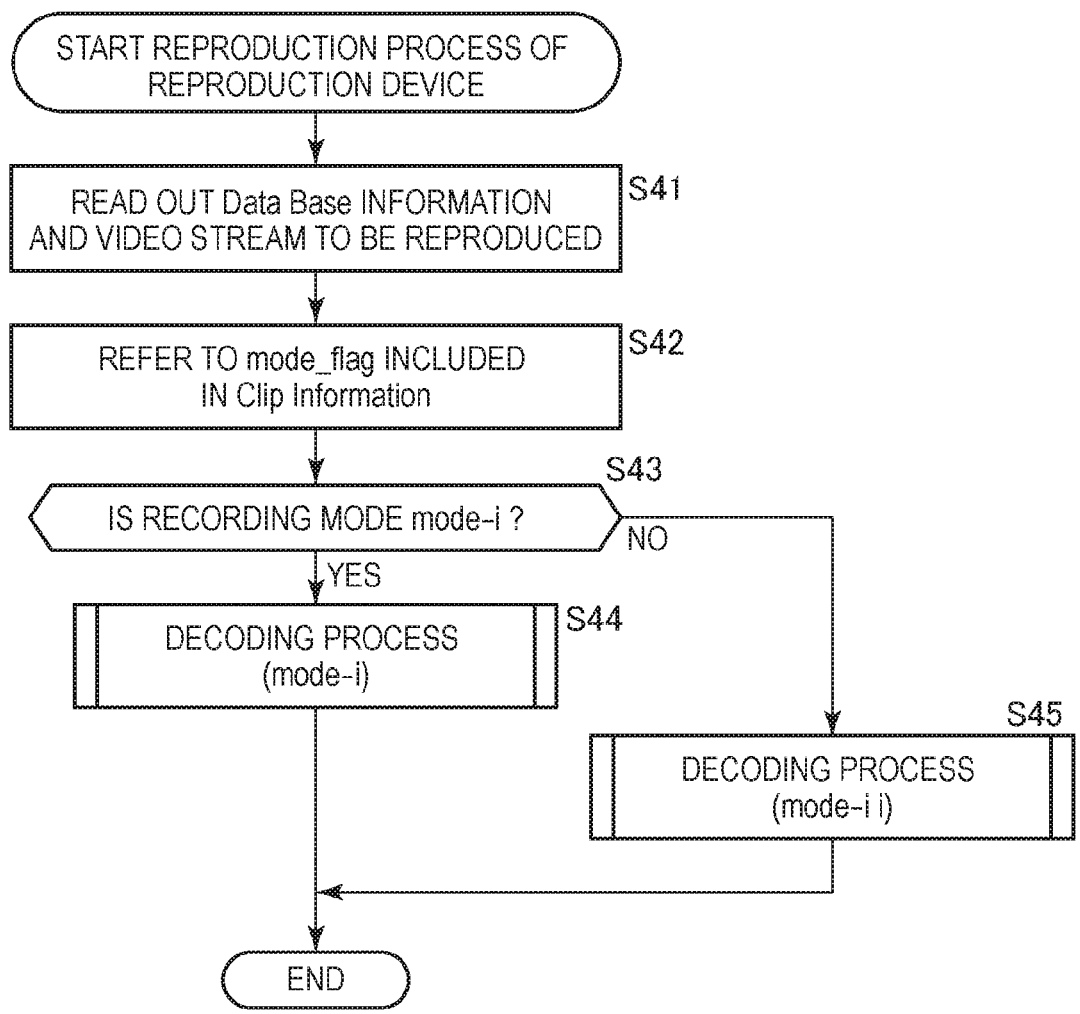
FIG. 28 is a flowchart for describing a reproduction process of the reproduction device in FIG. 22.

The process of steps S172 and S173 is the same as steps S42 and S43 of FIG. 28, and a description thereof is omitted.

When the recording mode is determined to be mode-i in step S173, in step S174, the decoding processing unit 56 performs the decoding process in mode-i. The details of the decoding process in mode-i will be described with reference to FIG. 40 which will be described later.

On the other hand, when the recording mode is determined to be mode-ii in step S173, in step S175, the decoding processing unit 56 performs the decoding process in mode-ii. The details of the decoding process in mode-ii will be described with reference to FIG. 41 which will be described later.

In step S174 or step S175, the decoding process is performed, and then the process ends.

Figure 40:
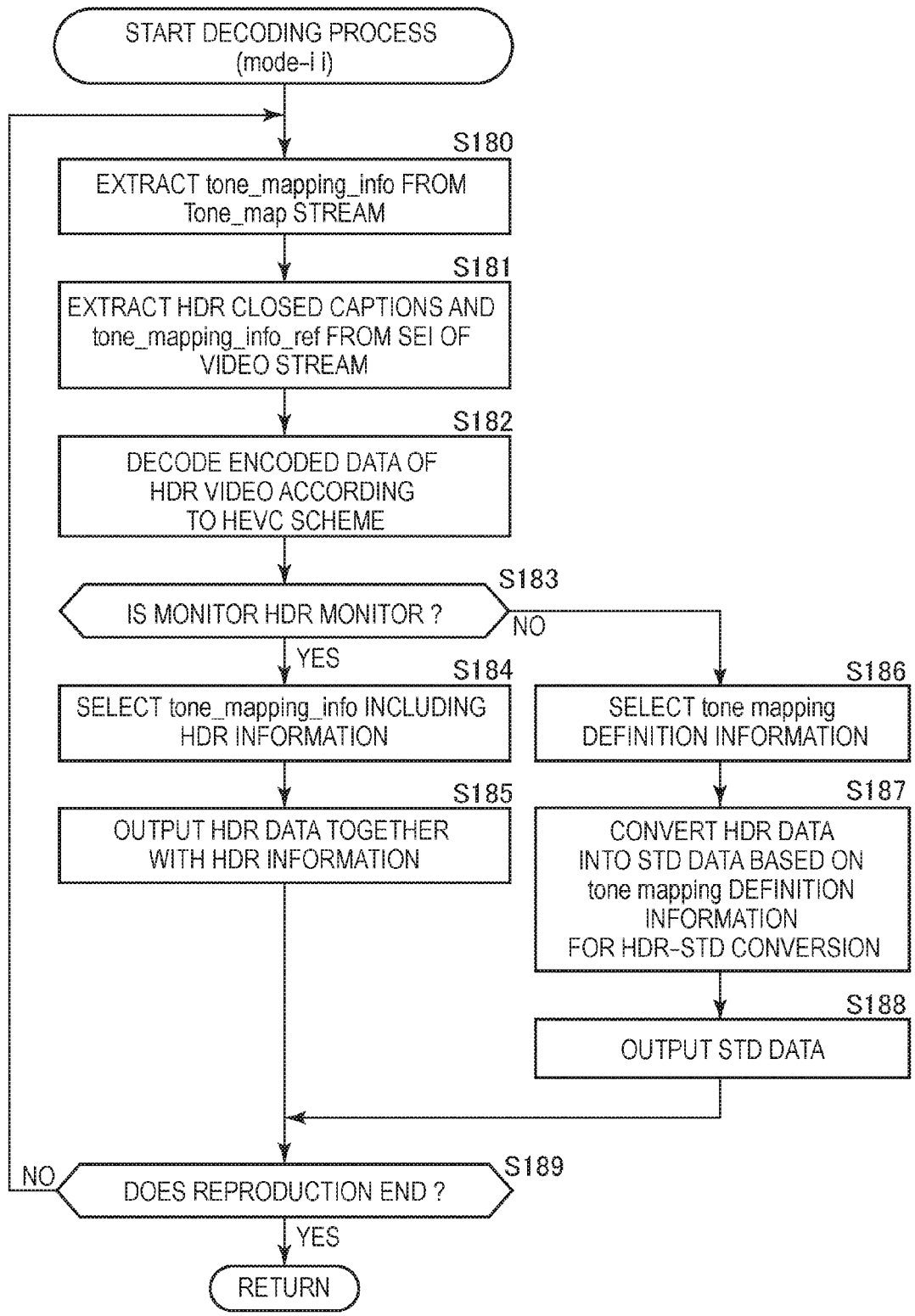
FIG. 40 is a flowchart for describing a decoding process of mode-i in FIG. 39.

FIG. 40 is a flowchart for describing the decoding process in mode-i of step S174 of FIG. 39.

In step S180, the parameter extraction unit 131 of the decoding processing unit 56 extracts tone_mapping_info from the Tone_map stream supplied from the disc drive 52.

In step S181, the parameter extraction unit 131 extracts the HDR closed captions and tone_mapping_info_ref of the HDR closed captions from the user data unregistered SEI message of the video stream. The parameter extraction unit 131 supplies the HDR closed captions to the HDR-STD conversion unit 73 and the HDR data output unit 75A. The parameter extraction unit 131 extracts the encoded data of the HDR video from the video stream, and supplies the encoded data of the HDR video to the HEVC decoder 72.

Figure 29:
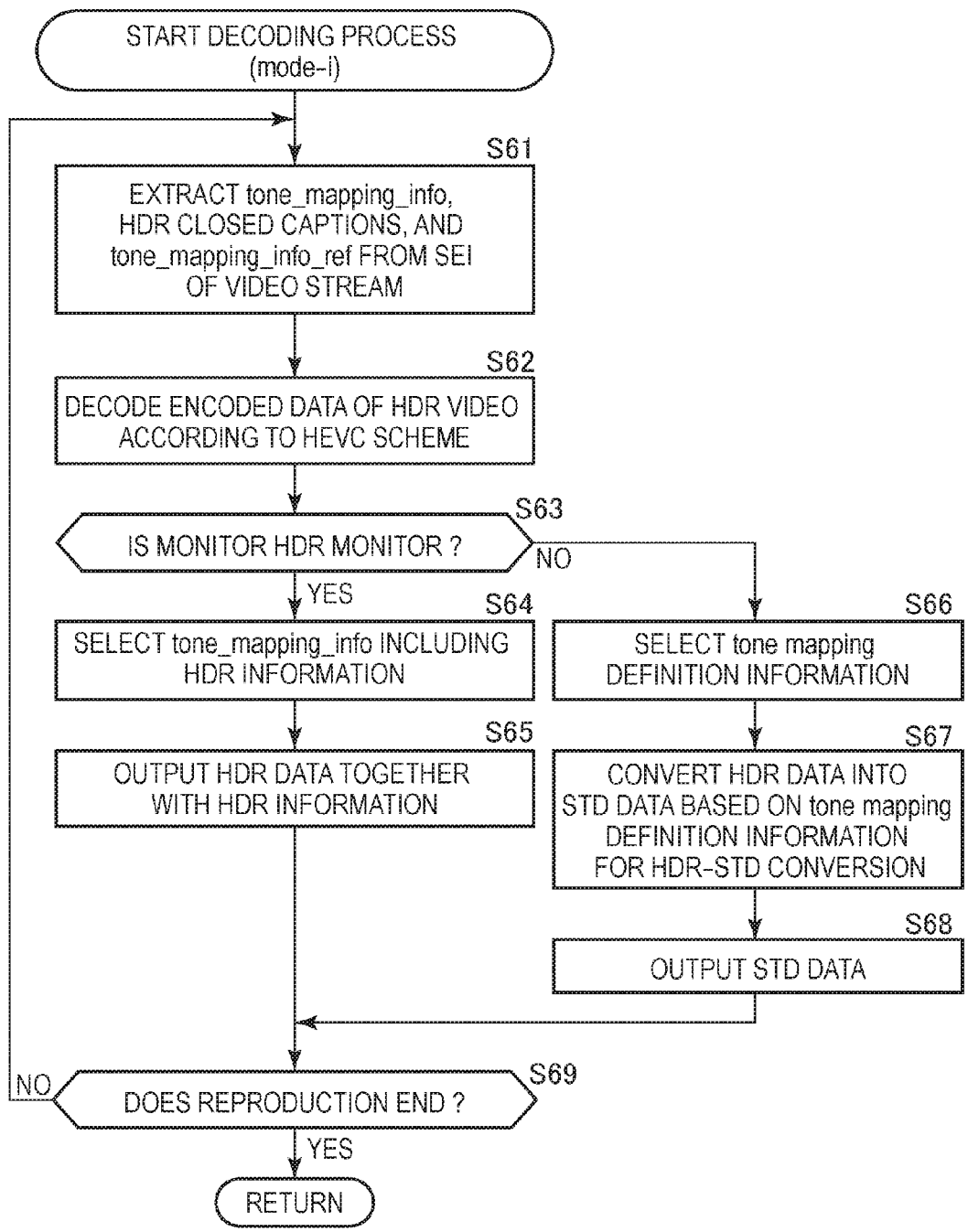
FIG. 29 is a flowchart for describing a decoding process of mode-i in FIG. 28.

The process of steps S182 to S189 is the same as the process of steps S62 to S69 of FIG. 29, and a description thereof is omitted. After the process of step S189, the process returns to step S174 of FIG. 39, and the process ends.

Figure 41:
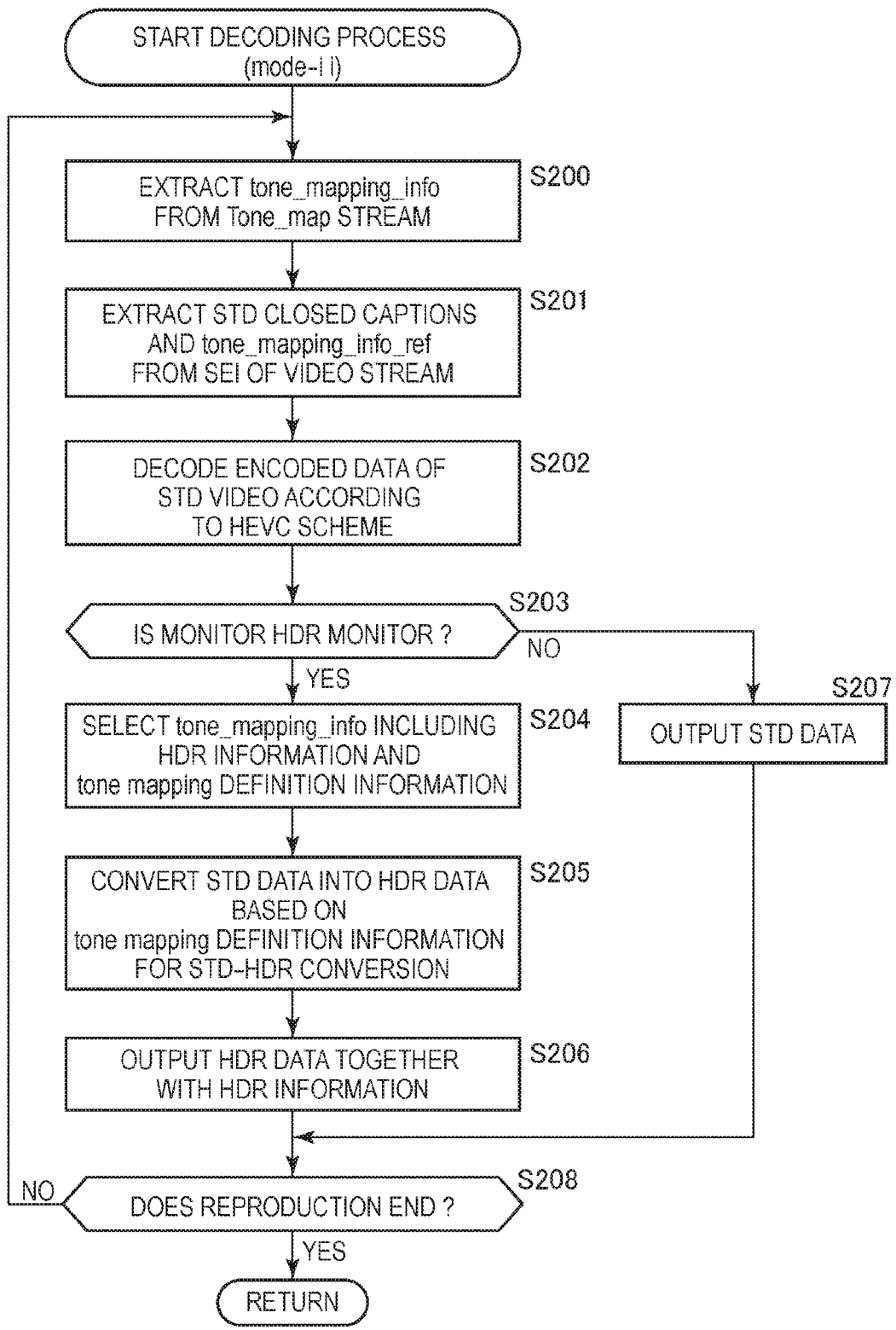
FIG. 41 is a flowchart for describing the details of the decoding process of mode-ii in FIG. 39.

FIG. 41 is a flowchart for describing the details of the decoding process in mode-ii of step S175 of FIG. 39.

The process of step S200 is the same as the process of step S180 of FIG. 40.

In step S201, the parameter extraction unit 131 extracts the STD closed captions and tone_mapping_info_ref of the STD closed captions from the user data unregistered SEI message of the video stream. The parameter extraction unit 131 supplies the STD closed captions to the STD-HDR conversion unit 74 and the STD data output unit 75B. The parameter extraction unit 131 extracts the encoded data of the STD video from the video stream, and supplies the encoded data of the STD video to the HEVC decoder 72.

Figure 30:
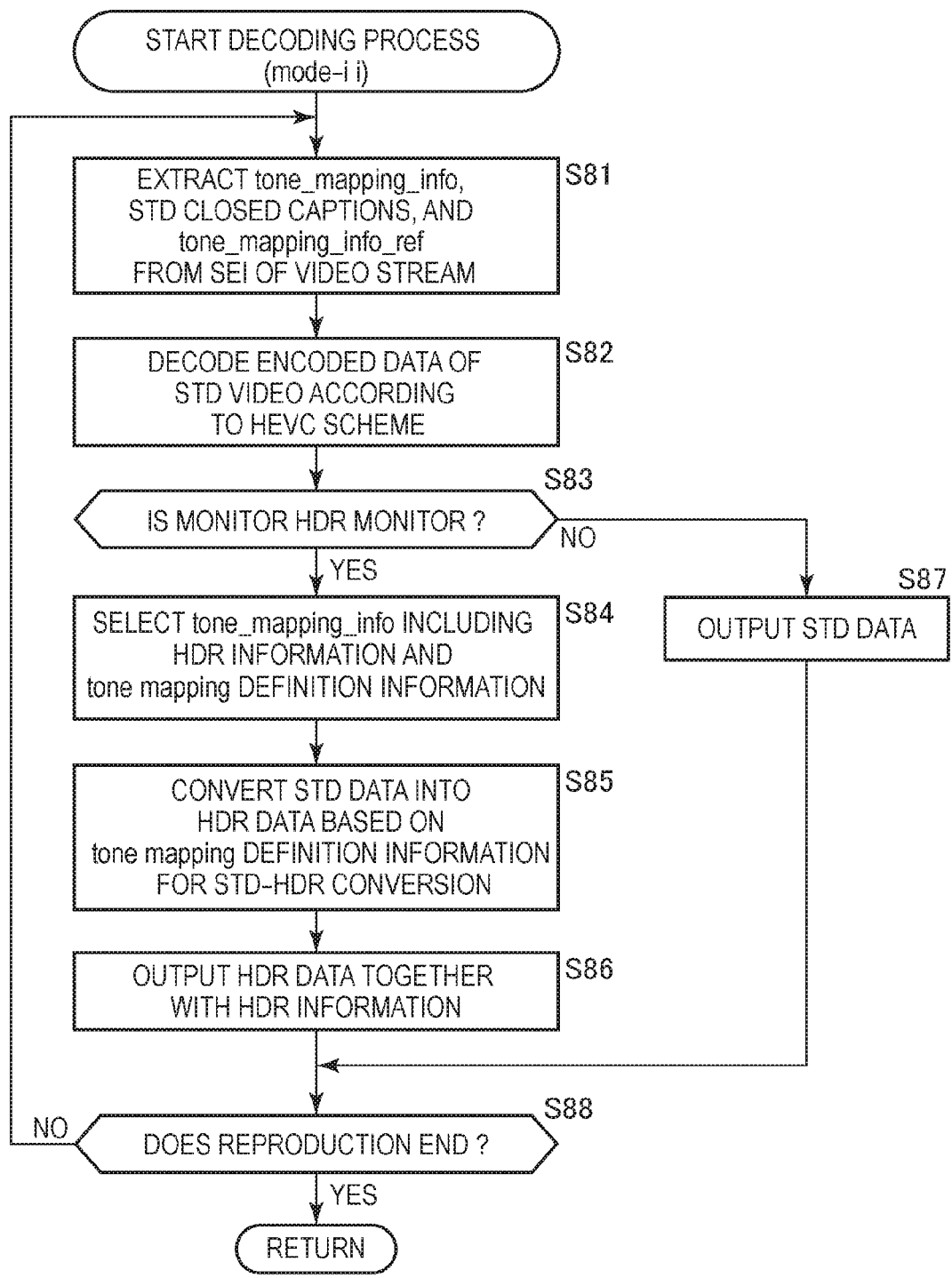
FIG. 30 is a flowchart for describing a decoding process of mode-ii in FIG. 28.

The process of steps S202 to S208 is the same as the process of steps S82 to S88 of FIG. 30, and a description thereof is omitted. After the process of step S208, the process returns to step S175 of FIG. 39, and the process ends.

Third Embodiment (Configuration Example of Computer)

The processes by the encoding processing unit 22, the decoding processing unit 56, and the signal processing unit 103 may be executed by hardware or may be executed by software. When the processes are executed by software, a program configuring the software is installed on, for example, a computer into which dedicated hardware is incorporated or a general-purpose personal computer from a program recording medium.

Figure 42:
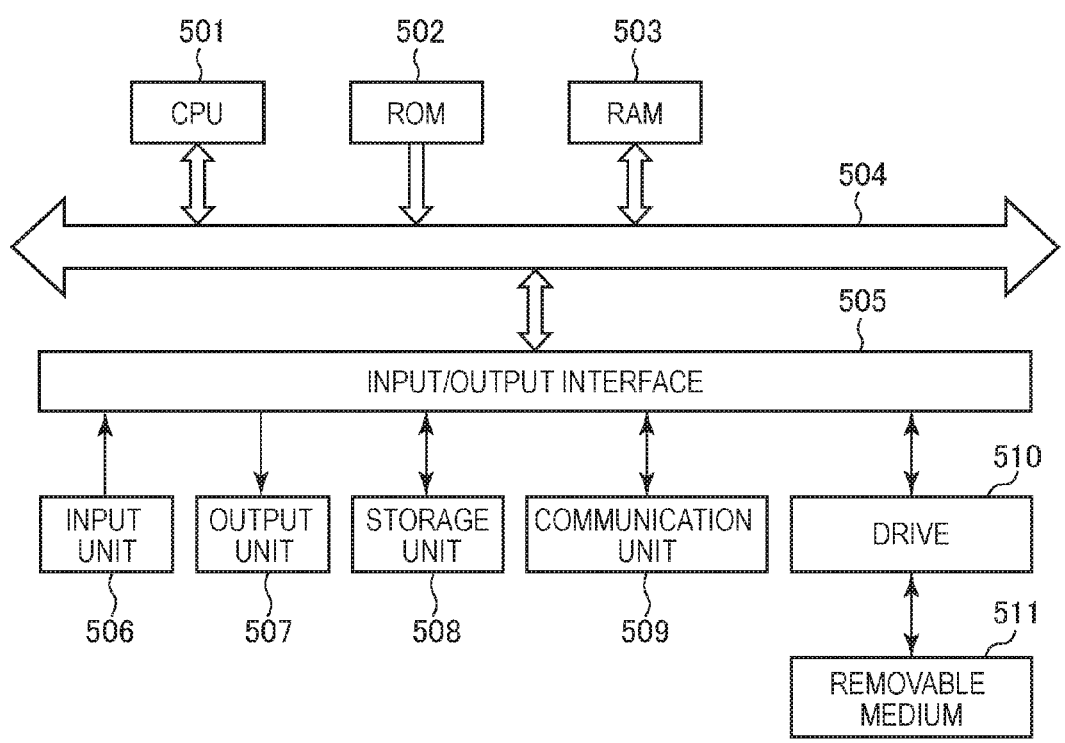
FIG. 42 is a block diagram illustrating a configuration example of a computer.

FIG. 42 is a block diagram illustrating a hardware configuration example of a computer that executes the processes by the encoding processing unit 22, the decoding processing unit 56, and the signal processing unit 103 through a program.

A CPU 501, a ROM 502, and a RAM 503 are connected with one another via a bus 504.

An input/output interface 505 is further connected to the bus 504. An input unit 506 such as a keyboard or a mouse and an output unit 507 such as a display or a speaker are connected to the input/output interface 505. Further, a storage unit 508 such as a hard disk or a non-volatile memory, a communication unit 509 such as a network interface, and a drive 510 that drives a removable medium 511 are connected to the input/output interface 505.

In the computer having the above configuration, the process by the encoding processing unit 22, the decoding processing unit 56, and the signal processing unit 103 are performed, for example, by loading the program stored in the storage unit 508 through the input/output interface 505 and the bus 504 and executing the program through the CPU 501.

Programs to be executed by the CPU 501 may be recorded in the removable medium 511, or may be provided via a wired or wireless transmission medium, such as a local area network, the Internet or digital satellite broadcasting, and may be installed to the Storage medium 533

It should be noted that the program executed by a computer may be a program that is processed in time series according to the sequence described in this specification or a program that is processed in parallel or at necessary timing such as upon calling.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, mode_flag may be set independently in the video and the closed captions. Further, when mode_flag is fixed in advance, mode_flag may not be recorded on the optical disc 11. Even when the HDR data is transmitted to the display device 3, the reproduction device 2 may not transmit the HDR information to the display device 3. The reproduction device 2 may be configured with a mobile terminal.

In the present specification, a system means a collective of a plurality of constituent elements (devices, modules (components), or the like) and all of the constituent elements may not be present in the same casing. Accordingly, a plurality of devices accommodated in separate casings and connected via networks and a single device in which a plurality of modules are accommodated in a single casing are all systems.

The present technology can also be applied to a recording and reproduction system in which Moving Picture Experts Group phase 4 (MPEG4) is adopted as the encoding scheme.

Additionally, the present technology may also be configured as below.

(1)

A reproduction device including:

a reading unit configured to read an extended closed caption serving as a closed caption of a second luminance range that is different from and larger than a first luminance range, HDR information indicating a characteristic of luminance of the extended closed caption, and luminance conversion definition information used when luminance conversion from the extended closed caption to a standard closed caption serving as a closed caption of the first luminance range is performed from a recording medium on which the extended closed caption, the HDR information, and the luminance conversion definition information are recorded;

a conversion unit configured to convert the extended closed caption into the standard closed caption based on the luminance conversion definition information; and an output unit configured to output the extended closed caption and the HDR information to a display device capable of displaying the extended closed caption and output the standard closed caption converted by the conversion unit to a display device incapable of displaying the extended closed caption.

(2)

The reproduction device according to (1), wherein a video stream of a High Efficiency Video Coding (HEVC) scheme, and as an SEI of the video stream, the extended closed caption are recorded on the recording medium.

(3)

The reproduction device according to (2), wherein information identifying the HDR information and the luminance conversion definition information is recorded as the SEI of the video stream on the recording medium.

(4)

The reproduction device according to (2) or (3), wherein the HDR information and the luminance conversion definition information are recorded as the SEI of the video stream on the recording medium.

(5)

The reproduction device according to (2) or (3), wherein a stream different from the video stream including the HDR information and the luminance conversion definition information is recorded on the recording medium.

(6)

The reproduction device according to any of (1) to (5), wherein the luminance conversion definition information is first tone_mapping_info in which any one of 0, 2, and 3 is set as a value of tone_map_model_id, and the HDR information is second tone_mapping_info in which 4 is set as a value of tone_map_model_id.

(7)

A reproduction method including:

a reading step of reading, by a reproduction device, an extended closed caption serving as a closed caption of a second luminance range that is different from and larger than a first luminance range, HDR information indicating a characteristic of luminance of the extended closed caption, and luminance conversion definition information used when luminance conversion from the extended closed caption to a standard closed caption serving as a closed caption of the first luminance range is performed from a recording medium on which the extended closed caption, the HDR information, and the luminance conversion definition information are recorded;

a conversion step of converting, by the reproduction device, the extended closed caption into the standard closed caption based on the luminance conversion definition information; and an output step of outputting, by the reproduction device, the extended closed caption and the HDR information to a display device capable of displaying the extended closed caption and outputting the standard closed caption converted in the process of the conversion step to a display device incapable of displaying the extended closed caption.

(8)

A recording medium on which are recorded:

an extended closed caption serving as a closed caption of a second luminance range that is different from and larger than a first luminance range;

HDR information indicating a characteristic of luminance of the extended closed caption; and luminance conversion definition information used when luminance conversion from the extended closed caption to a standard closed caption serving as a closed caption of the first luminance range is performed, wherein a reproduction device configured to reproduce the recording medium performs a process of
  reading the extended closed caption, the HDR information, and the luminance conversion definition information from the recording medium,
  converting the extended closed caption into the standard closed caption based on the luminance conversion definition information, and
  outputting the extended closed caption and the HDR information to a display device capable of displaying the extended closed caption and outputting the converted standard closed caption to a display device incapable of displaying the extended closed caption.

(9)
  A reproduction device including:
    a reading unit configured to read a standard closed caption serving as a closed caption of a first luminance range, HDR information indicating a characteristic of luminance of an extended closed caption serving as a closed caption of a second luminance range that is different from and larger than the first luminance range, and luminance conversion definition information used when luminance conversion from the standard closed caption to the extended closed caption is performed from a recording medium on which the standard closed caption, the HDR information, and the luminance conversion definition information are recorded;
    a conversion unit configured to convert the standard closed caption into the extended closed caption based on the luminance conversion definition information; and
    an output unit configured to output the extended closed caption converted by the conversion unit and the HDR information to a display device capable of displaying the extended closed caption and output the standard closed caption to a display device incapable of displaying the extended closed caption.

(10)
  The reproduction device according to (9),
    wherein a video stream of a High Efficiency Video Coding (HEVC) scheme, and as an SEI of the video stream, the standard closed caption are recorded on the recording medium.

(11)
  The reproduction device according to (10),
    wherein information identifying the HDR information and the luminance conversion definition information is recorded as the SEI of the video stream on the recording medium.

(12)
  The reproduction device according to (10) or (11),
    wherein the HDR information and the luminance conversion definition information are recorded as the SEI of the video stream on the recording medium.

(13)
  The reproduction device according to (10) or (11),
    wherein a stream different from the video stream including the HDR information and the luminance conversion definition information is recorded on the recording medium.

(14)
  The reproduction device according to any of (9) to (13),
    wherein the luminance conversion definition information is first tone_mapping_info in which any one of 0, 2, and 3 is set as a value of tone_map_model_id, and
    the HDR information is second tone_mapping_info in which 4 is set as a value of tone_map_model_id.

(15)
  A reproduction method including:
    a reading step of reading, by a reproduction device, a standard closed caption serving as a closed caption of a first luminance range, HDR information indicating a characteristic of luminance of an extended closed caption serving as a closed caption of a second luminance range that is different from and larger than the first luminance range, and luminance conversion definition information used when luminance conversion from the standard closed caption to the extended closed caption is performed from a recording medium on which the standard closed caption, the HDR information, and the luminance conversion definition information are recorded;
    a conversion step of converting, by the reproduction device, the standard closed caption into the extended closed caption based on the luminance conversion definition information; and
    an output step of outputting, by the reproduction device, the extended closed caption converted in the process of the conversion step and the HDR information to a display device capable of displaying the extended closed caption and outputting the standard closed caption to a display device incapable of displaying the extended closed caption.

(16)
  A recording medium on which are recorded:
    a standard closed caption serving as a closed caption of a first luminance range;
    HDR information indicating a characteristic of luminance of an extended closed caption serving as a closed caption of a second luminance range that is different from and larger than the first luminance range; and
    luminance conversion definition information used when luminance conversion from the standard closed caption to the extended closed caption is performed,
    wherein a reproduction device configured to reproduce the recording medium performs a process of
      reading the standard closed caption, the HDR information, and the luminance conversion definition information from the recording medium,
      converting the standard closed caption into the extended closed caption based on the luminance conversion definition information, and
      outputting the converted extended closed caption and the HDR information to a display device capable of displaying the extended closed caption and outputting the standard closed caption to a display device incapable of displaying the extended closed caption.

REFERENCE SIGNS LIST

2 reproduction device
11 optical disc
52 disc drive
73 HDR-STD conversion unit
75 output unit

The invention claimed is:
1. A reproduction device, comprising:
  one or more processors configured to:
    read an extended closed caption that serves as a closed caption of a second luminance range that is different from and larger than a first luminance range, High Dynamic Range (HDR) information indicating a characteristic of luminance of the extended closed caption, and luminance conversion definition information,
    wherein luminance conversion from the extended closed caption to a standard closed caption that serves as a closed caption of the first luminance range is executed from a recording medium based on the luminance conversion definition information, and wherein a video stream of a High Efficiency Video Coding (HEVC) scheme and as Supplemental Enhancement Information (SEI) of the video stream, the extended closed caption, and information identifying the HDR information and the luminance conversion definition information are recorded on the recording medium;

convert the extended closed caption into the standard closed caption based on the luminance conversion definition information; and output the extended closed caption and the HDR information to a display device that displays extended closed caption and output the standard closed caption to the display device that restricts display of the extended closed caption.

2. The reproduction device according to claim 1, wherein the HDR information and the luminance conversion definition information are recorded as the SEI of the video stream on the recording medium.

3. The reproduction device according to claim 1, wherein a stream different from the video stream including the HDR information and the luminance conversion definition information is recorded on the recording medium.

4. The reproduction device according to claim 1, wherein the luminance conversion definition information is first tone_mapping_info in which one of 0, 2, and 3 is set as a value of tone_map_model_id, and the HDR information is second tone_mapping_info in which 4 is set as a value of the tone_map_model_id.

5. A reproduction method, comprising:
reading, by a reproduction device, an extended closed caption serving as a closed caption of a second luminance range that is different from and larger than a first luminance range, High Dynamic Range (HDR) information indicating a characteristic of luminance of the extended closed caption, and luminance conversion definition information, wherein luminance conversion from the extended closed caption to a standard closed caption serving as a closed caption of the first luminance range is executed from a recording medium based on the luminance conversion definition information, and wherein a video stream of a High Efficiency Video Coding (HEVC) scheme and as Supplemental Enhancement Information (SEI) of the video stream, the extended closed caption, and information identifying the HDR information and the luminance conversion definition information are recorded on the recording medium;

converting, by the reproduction device, the extended closed caption into the standard closed caption based on the luminance conversion definition information; and outputting, by the reproduction device, the extended closed caption and the HDR information to a display device that displays the extended closed caption and outputting the standard closed caption to the display device that restricts display of the extended closed caption.

6. A computer-readable medium having stored thereon computer-readable instructions, which when executed by a computer, cause the computer to execute operations, the operations comprising:

reading, an extended closed caption serving as a closed caption of a second luminance range that is different from and larger than a first luminance range, High Dynamic Range (HDR) information indicating a characteristic of luminance of the extended closed caption, and luminance conversion definition information, from a recording medium, wherein luminance conversion from the extended closed caption to a standard closed caption serving as a closed caption of the first luminance range is executed based on the luminance conversion definition information, and wherein a video stream of a High Efficiency Video Coding (HEVC) scheme and as Supplemental Enhancement Information (SEI) of the video stream, the extended closed caption, and information identifying the HDR information and the luminance conversion definition information are recorded on the recording medium;

converting the extended closed caption into the standard closed caption based on the luminance conversion definition information; and outputting the extended closed caption and the HDR information to a display device that displays the extended closed caption and outputting the converted standard closed caption to the display device that restricts display of the extended closed caption.

7. A reproduction device, comprising:
one or more processors configured to:
read a standard closed caption that serves as a closed caption of a first luminance range, High Dynamic Range (HDR) information indicating a characteristic of luminance of an extended closed caption that serves as a closed caption of a second luminance range that is different from and larger than the first luminance range, and luminance conversion definition information, wherein luminance conversion from the standard closed caption to the extended closed caption is executed from a recording medium based on the luminance conversion definition information, and wherein a video stream of a High Efficiency Video Coding (HEVC) scheme, and as Supplemental Enhancement Information (SEI) of the video stream, the standard closed caption, and information identifying the HDR information and the luminance conversion definition information are recorded on the recording medium;

convert the standard closed caption into the extended closed caption based on the luminance conversion definition information; and output the extended closed caption and the HDR information to a display device that displays the extended closed caption and output the standard closed caption to the display device that restricts display of the extended closed caption.

8. The reproduction device according to claim 7, wherein the HDR information and the luminance conversion definition information are recorded as the SEI of the video stream on the recording medium.

9. The reproduction device according to claim 7, wherein a stream different from the video stream including the HDR information and the luminance conversion definition information is recorded on the recording medium.

10. The reproduction device according to claim 7,
wherein the luminance conversion definition information is first tone_mapping_info in which one of 0, 2, and 3 is set as a value of tone_map_model_id, and
the HDR information is second tone_mapping_info in which 4 is set as a value of the tone_map_model_id.

11. A reproduction method, comprising:
reading, by a reproduction device, a standard closed caption serving as a closed caption of a first luminance range, High Dynamic Range (HDR) information indicating a characteristic of luminance of an extended closed caption serving as a closed caption of a second luminance range that is different from and larger than the first luminance range, and luminance conversion definition information,
wherein luminance conversion from the standard closed caption to the extended closed caption is executed from a recording medium based on the luminance conversion definition information, and
wherein a video stream of a High Efficiency Video Coding (HEVC) scheme, and as Supplemental Enhancement Information (SEI) of the video stream, the standard closed caption, and information identifying the HDR information and the luminance conversion definition information are recorded on the recording medium;
converting, by the reproduction device, the standard closed caption into the extended closed caption based on the luminance conversion definition information; and
outputting, by the reproduction device, the extended closed caption and the HDR information to a display device that displays the extended closed caption and outputting the standard closed caption to the display device that restricts display of the extended closed caption.

12. A non-transitory computer-readable medium having stored thereon computer-readable instructions, which when executed by a computer, cause the computer to execute operations, the operations comprising:
reading a standard closed caption serving as a closed caption of a first luminance range High Dynamic Range (HDR) information indicating a characteristic of luminance of an extended closed caption serving as a closed caption of a second luminance range that is different from and larger than the first luminance ranged, and luminance conversion definition information,
wherein luminance conversion from the standard closed caption to the extended closed caption is executed from a recording medium based on the luminance conversion definition information,
and wherein a video stream of a High Efficiency Video Coding (HEVC) scheme, and as Supplemental Enhancement Information (SEI) of the video stream, the standard closed caption, and information identifying the HDR information and the luminance conversion definition information are recorded on the recording medium;
converting the standard closed caption into the extended closed caption based on the luminance conversion definition information,
and outputting the converted extended closed caption and the HDR information to a display device that displays the extended closed caption and outputting the standard closed caption to the display device that restricts display of the extended closed caption.

13. A reproduction device, comprising:
one or more processors configured to:
read an extended closed caption that serves as a closed caption of a second luminance range that is different from and larger than a first luminance range, High Dynamic Range (HDR) information that indicates a characteristic of luminance of the extended closed caption, and luminance conversion definition information,
wherein luminance conversion from the extended closed caption to a standard closed caption that serves as a closed caption of the first luminance range is executed, based on the luminance conversion definition information, from a recording medium on which the extended closed caption, the HDR information, and the luminance conversion definition information are recorded,
wherein the luminance conversion definition information is first tone_mapping_info in which one of 0, 2, and 3 is set as a value of tone_map_model_id, and
wherein the HDR information is second tone_mapping_info in which 4 is set as a value of the tone_map_model_id;
convert the extended closed caption into the standard closed caption based on the luminance conversion definition information; and
output the extended closed caption and the HDR information to a display device that displays the extended closed caption and output the standard closed caption to the display device that restricts display of the extended closed caption.

14. A reproduction device, comprising:
one or more processors configured to:
read a standard closed caption that serves as a closed caption of a first luminance range, High Dynamic Range (HDR) information that indicates a characteristic of luminance of an extended closed caption that serves as a closed caption of a second luminance range that is different from and larger than the first luminance range, and luminance conversion definition information,
wherein luminance conversion from the standard closed caption to the extended closed caption is executed, based on the luminance conversion definition information, from a recording medium on which the standard closed caption, the HDR information, and the luminance conversion definition information are recorded,
wherein the luminance conversion definition information is first tone_mapping_info in which one of 0, 2, and 3 is set as a value of tone_map_model_id, and
wherein the HDR information is second tone_mapping_info in which 4 is set as a value of the tone_map_model_id;
convert the standard closed caption into the extended closed caption based on the luminance conversion definition information; and
output the extended closed caption and the HDR information to a display device that displays the extended closed caption and output the standard closed caption to the display device that restricts display of the extended closed caption.

* * * * *